Sept. 10, 1940.         H. P. MIXER              2,214,029
                   CALCULATING MACHINE
                   Filed April 25, 1936        36 Sheets-Sheet 1

INVENTOR
H. P. MIXER
BY *N. A. Sparks*
HIS ATTORNEY

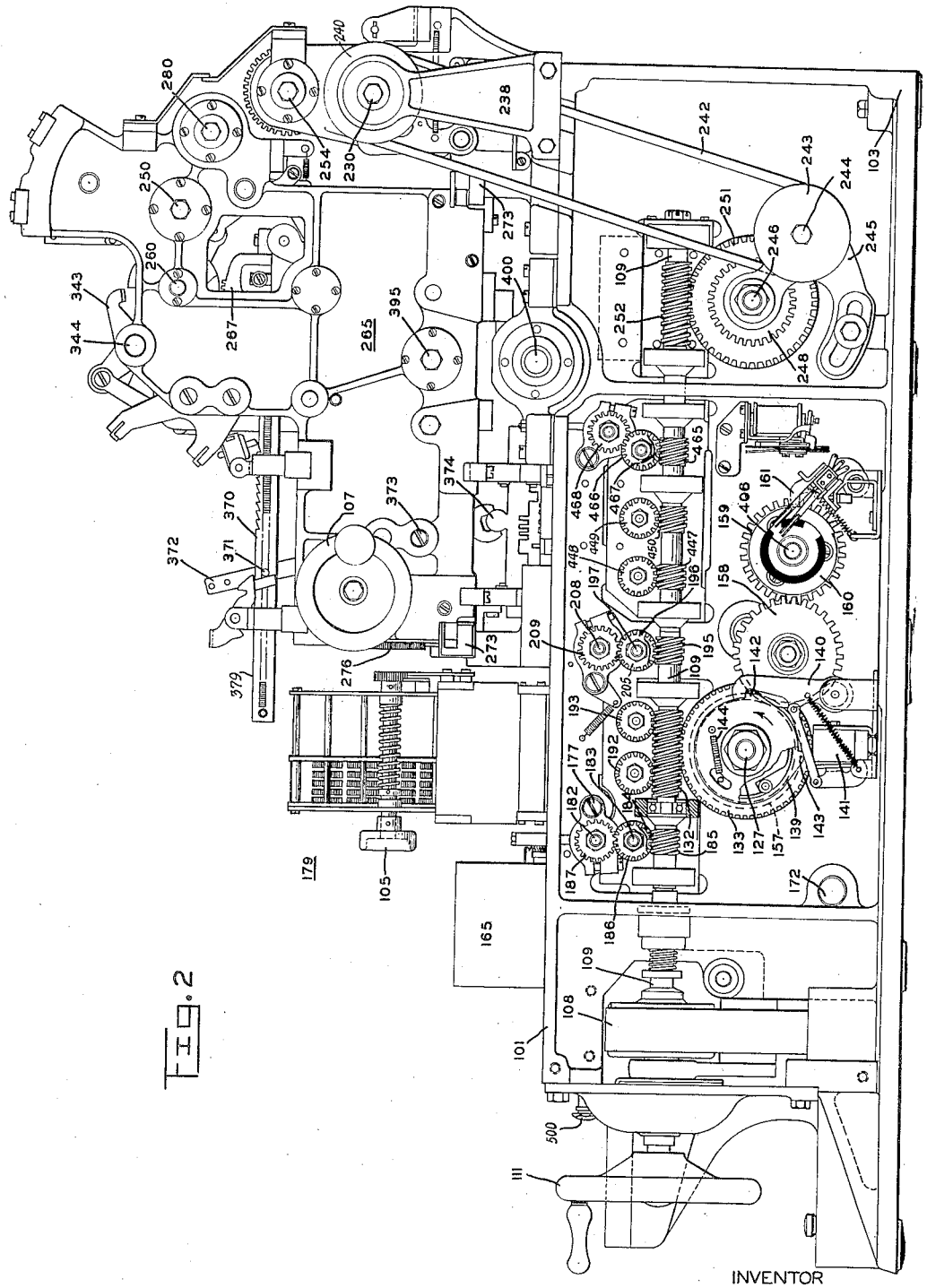

Sept. 10, 1940.   H. P. MIXER   2,214,029
CALCULATING MACHINE
Filed April 25, 1936    36 Sheets-Sheet 3
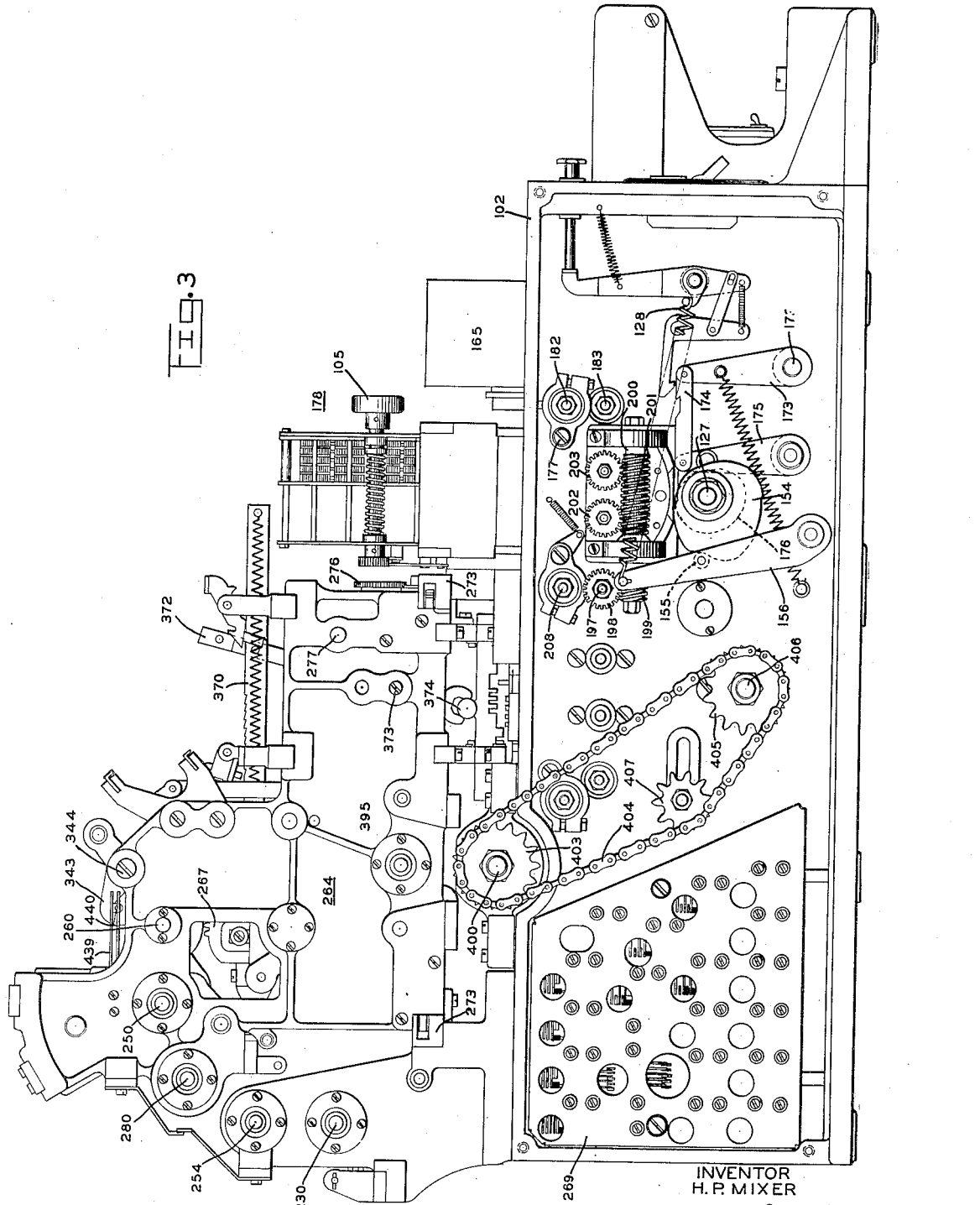
INVENTOR
H. P. MIXER
BY *H. A. Spark*
HIS ATTORNEY

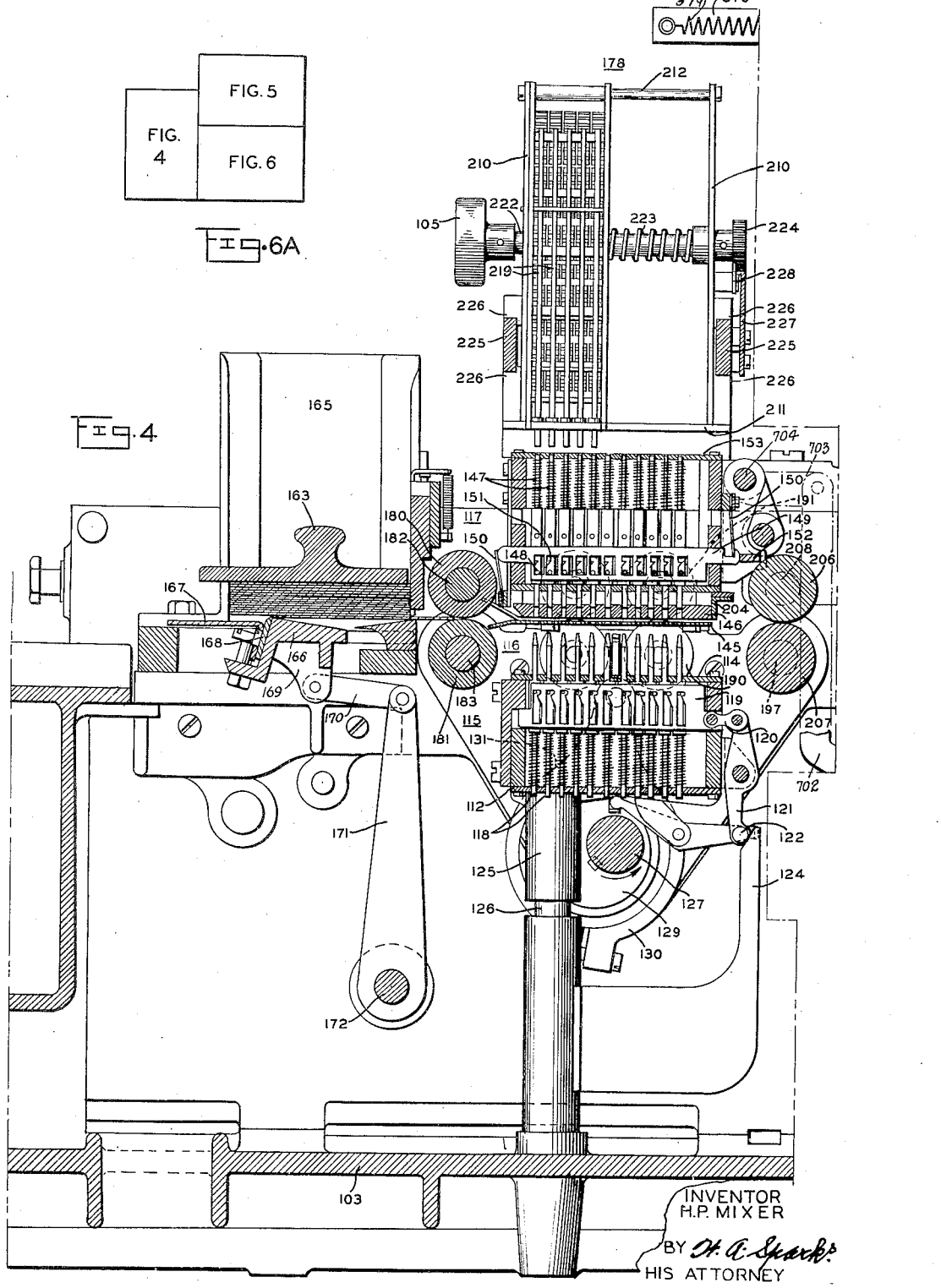

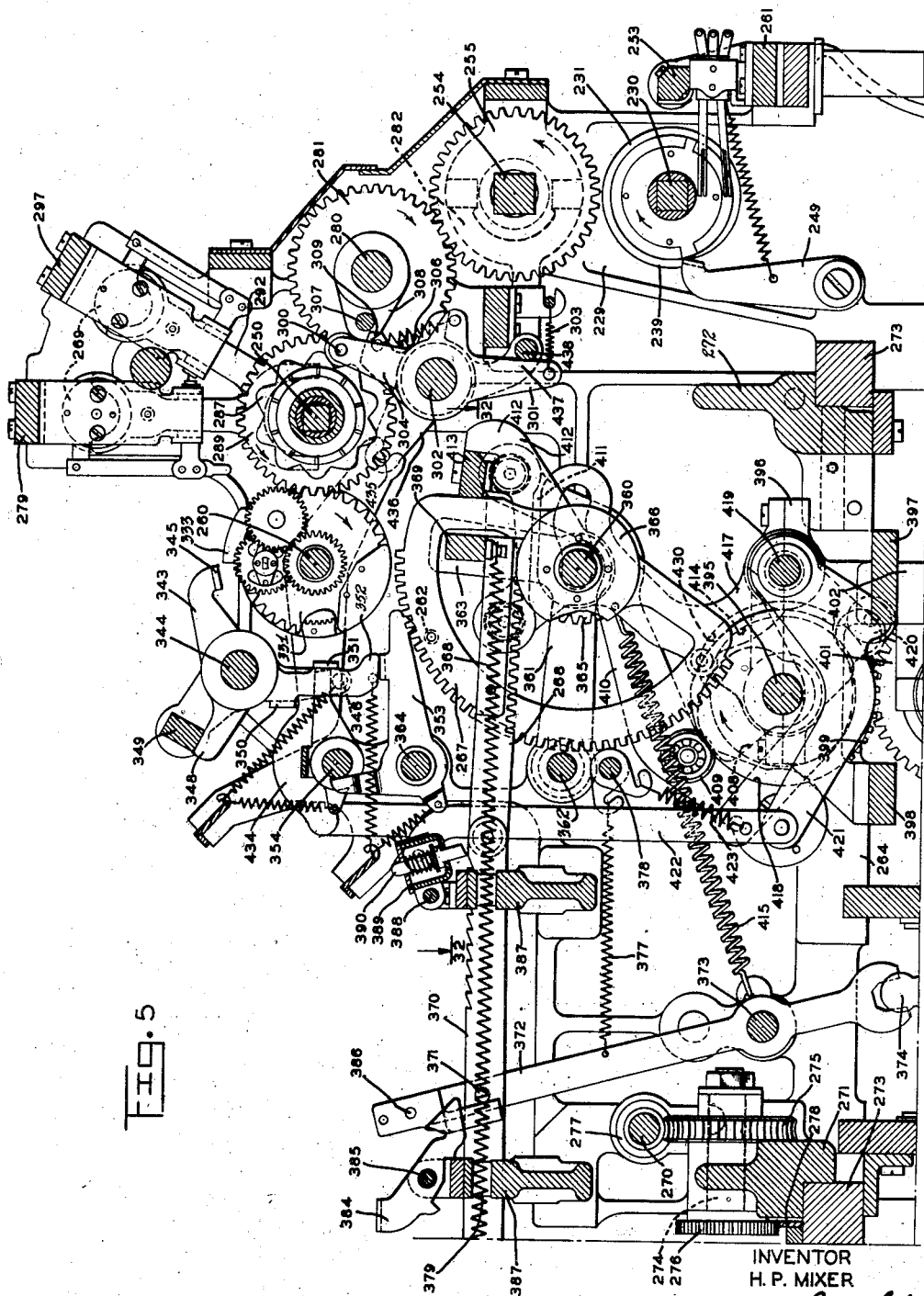

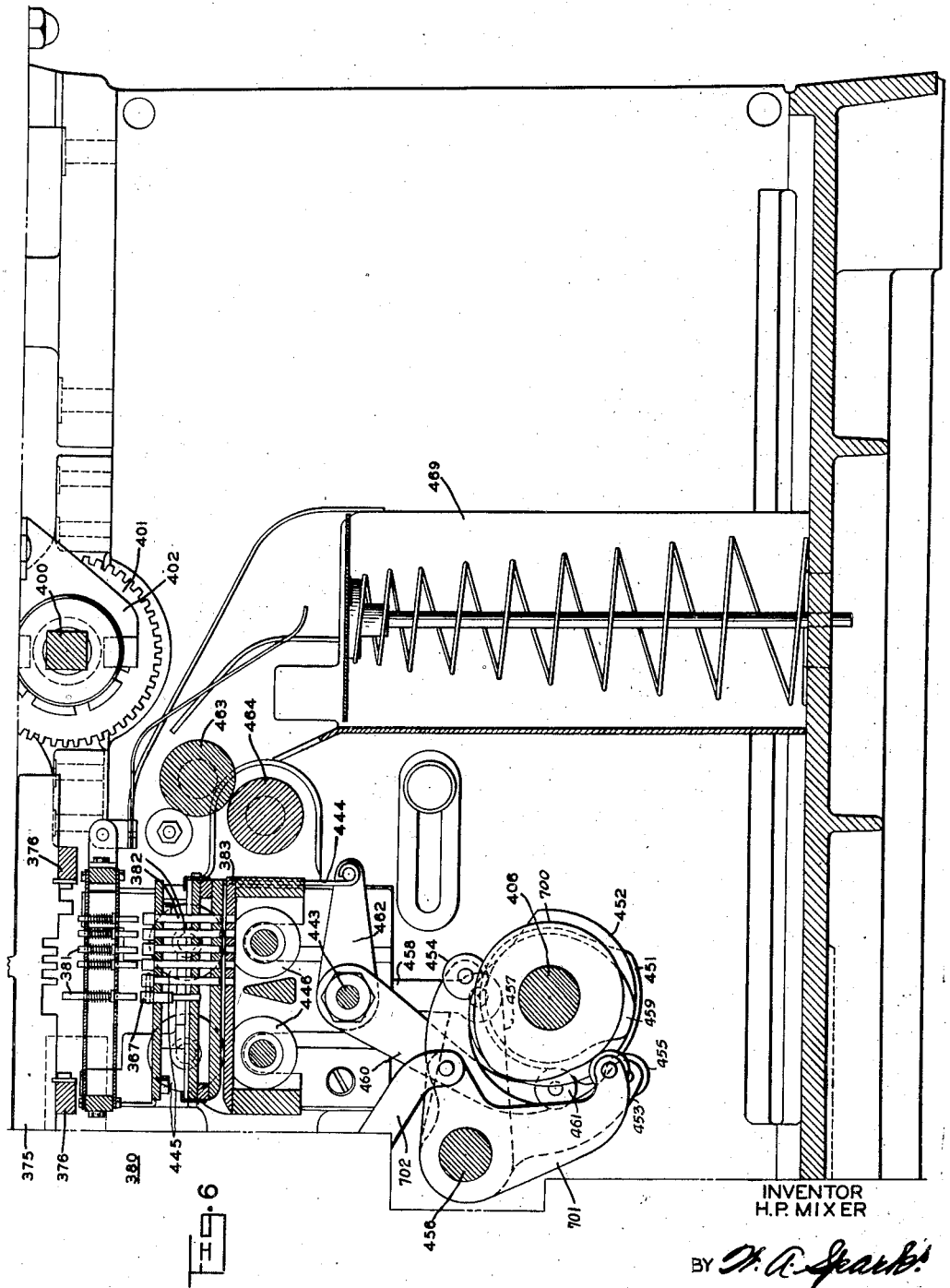

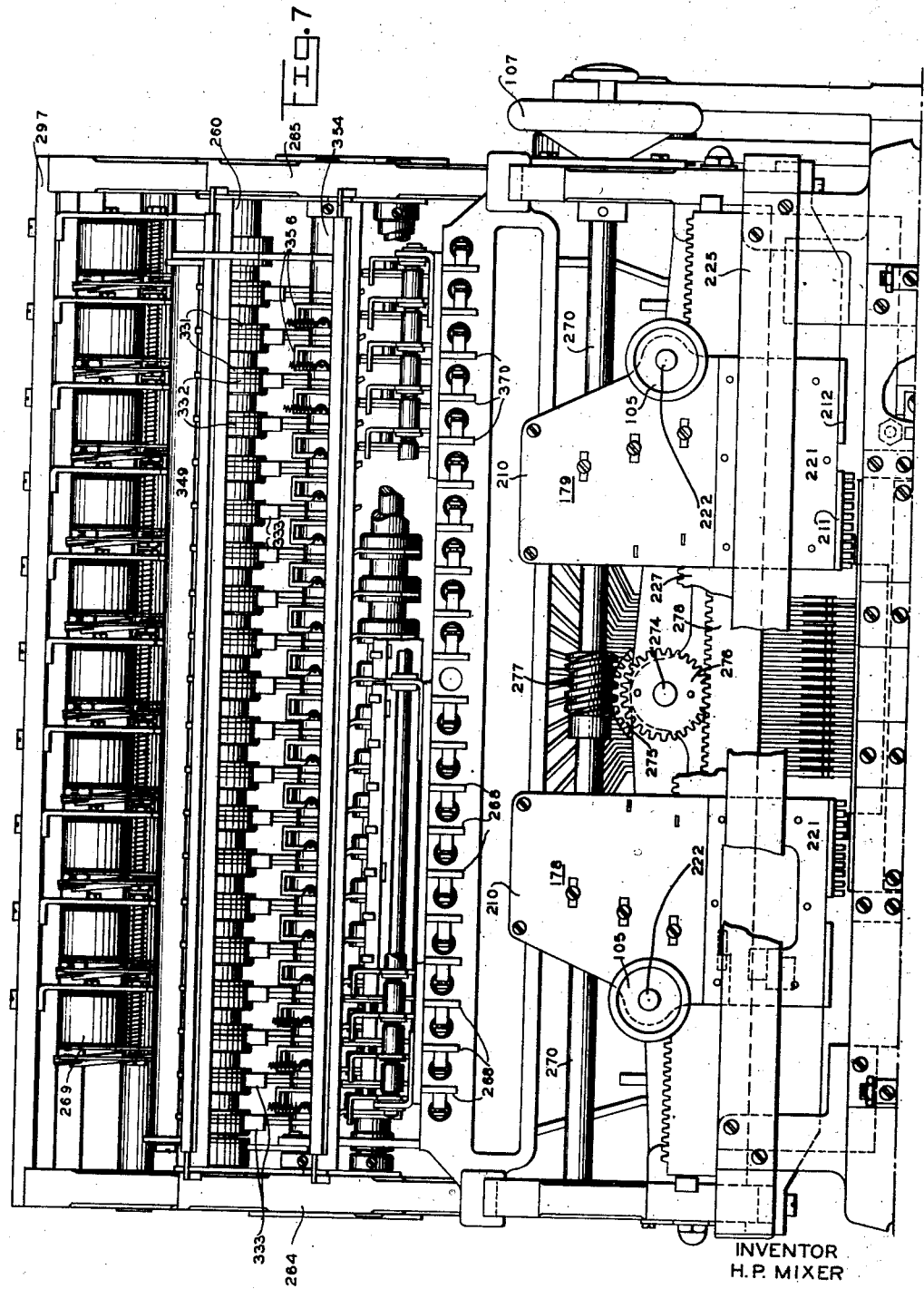

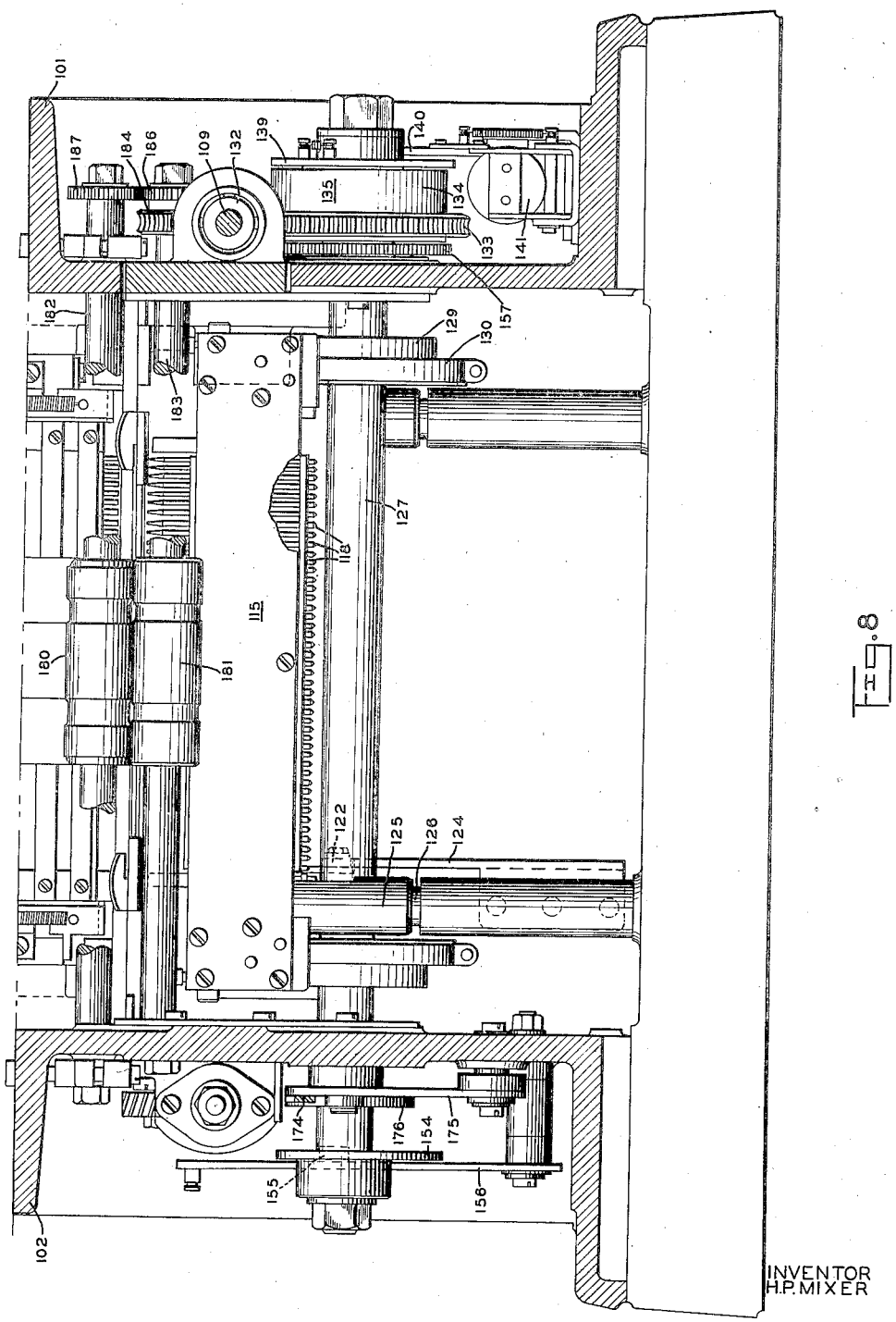

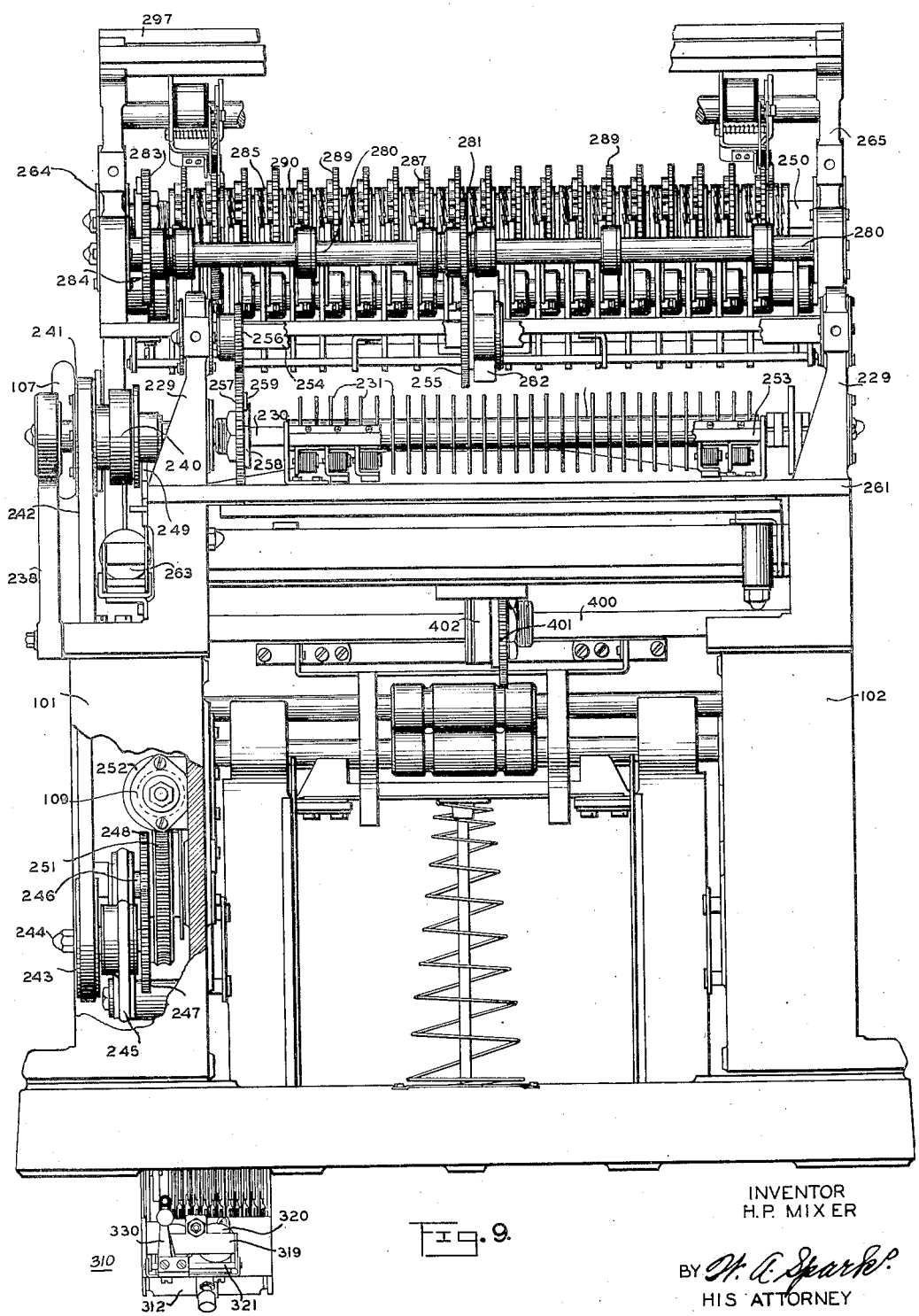

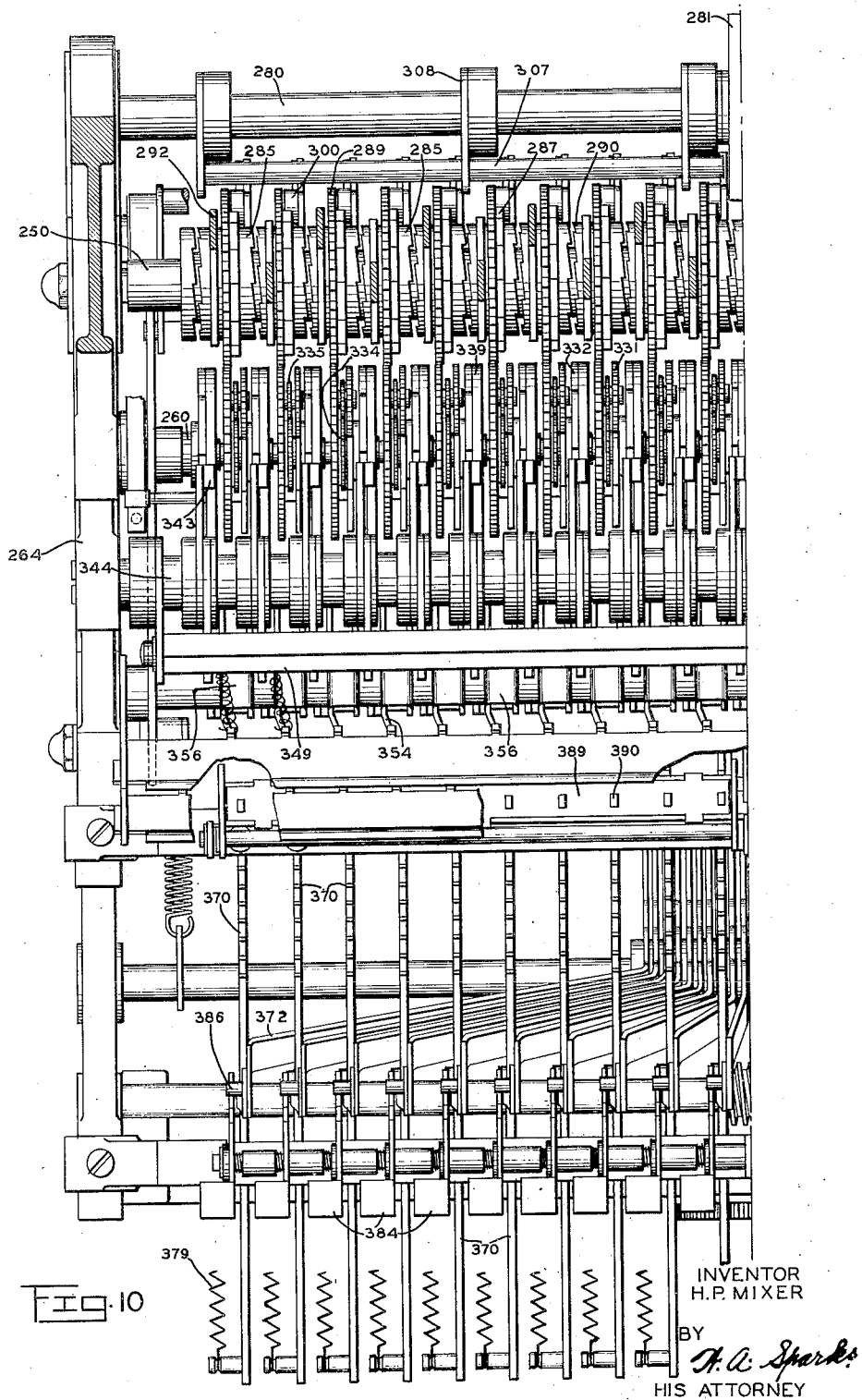

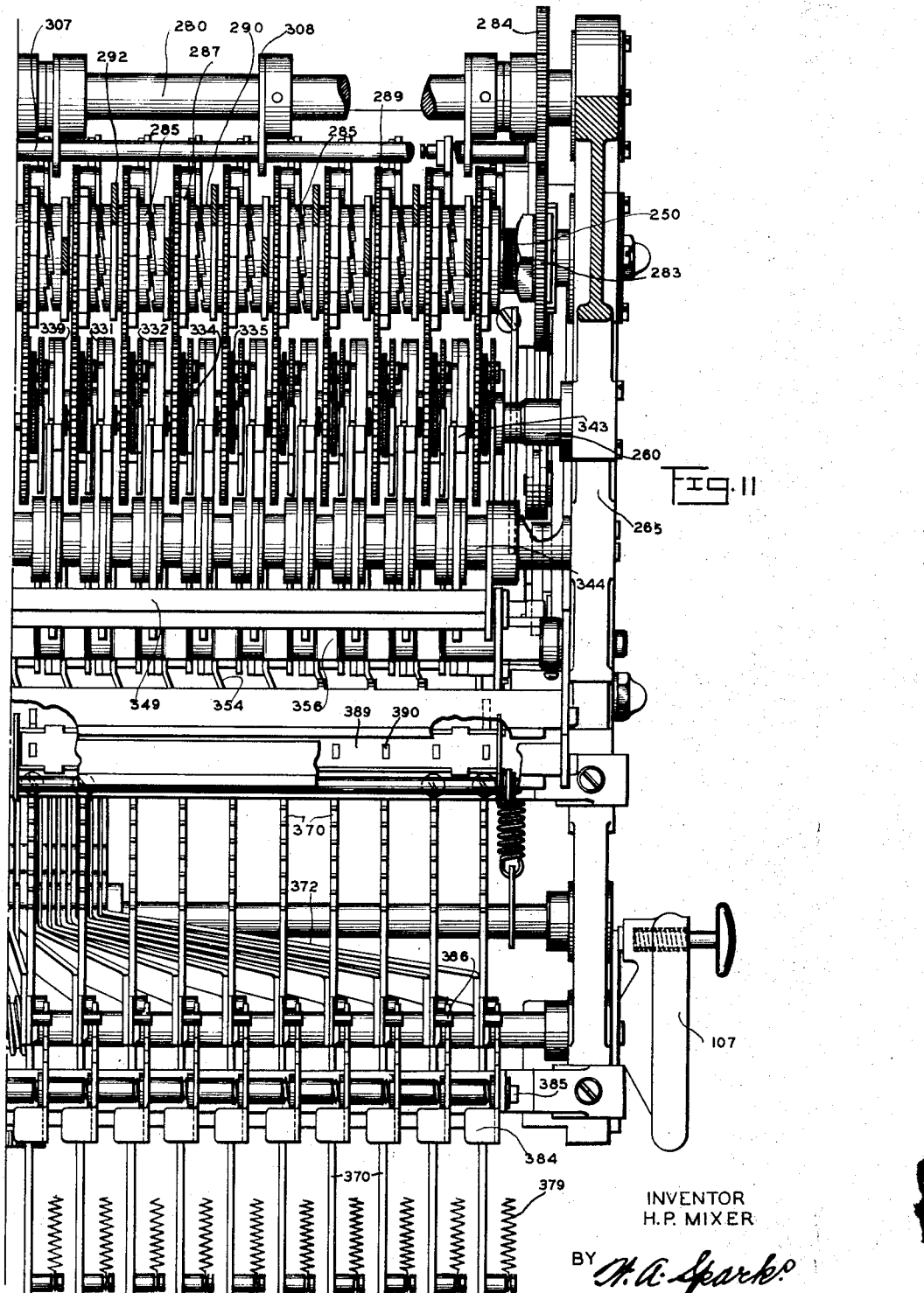

Sept. 10, 1940.    H. P. MIXER    2,214,029
CALCULATING MACHINE
Filed April 25, 1936    36 Sheets-Sheet 12
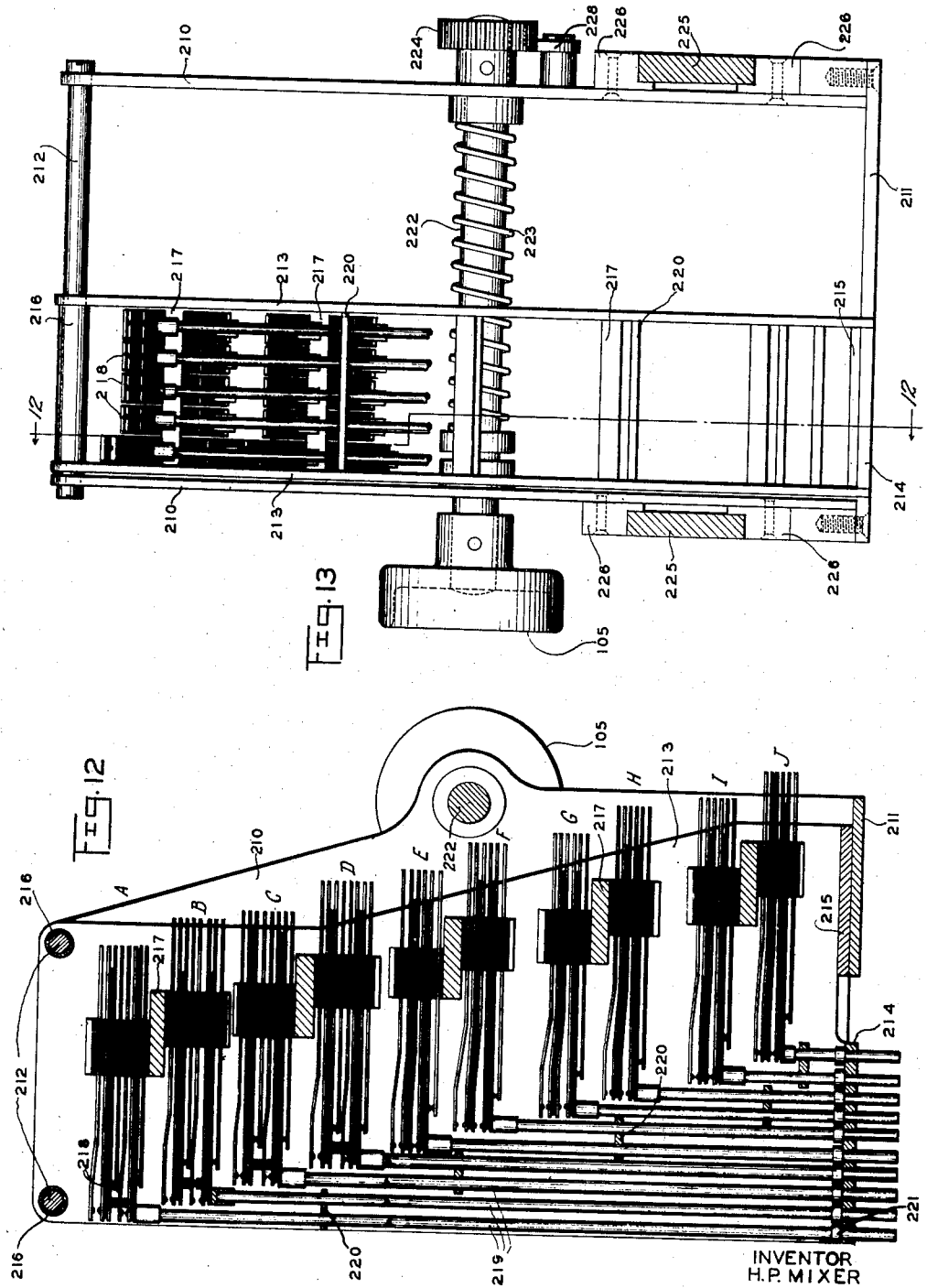

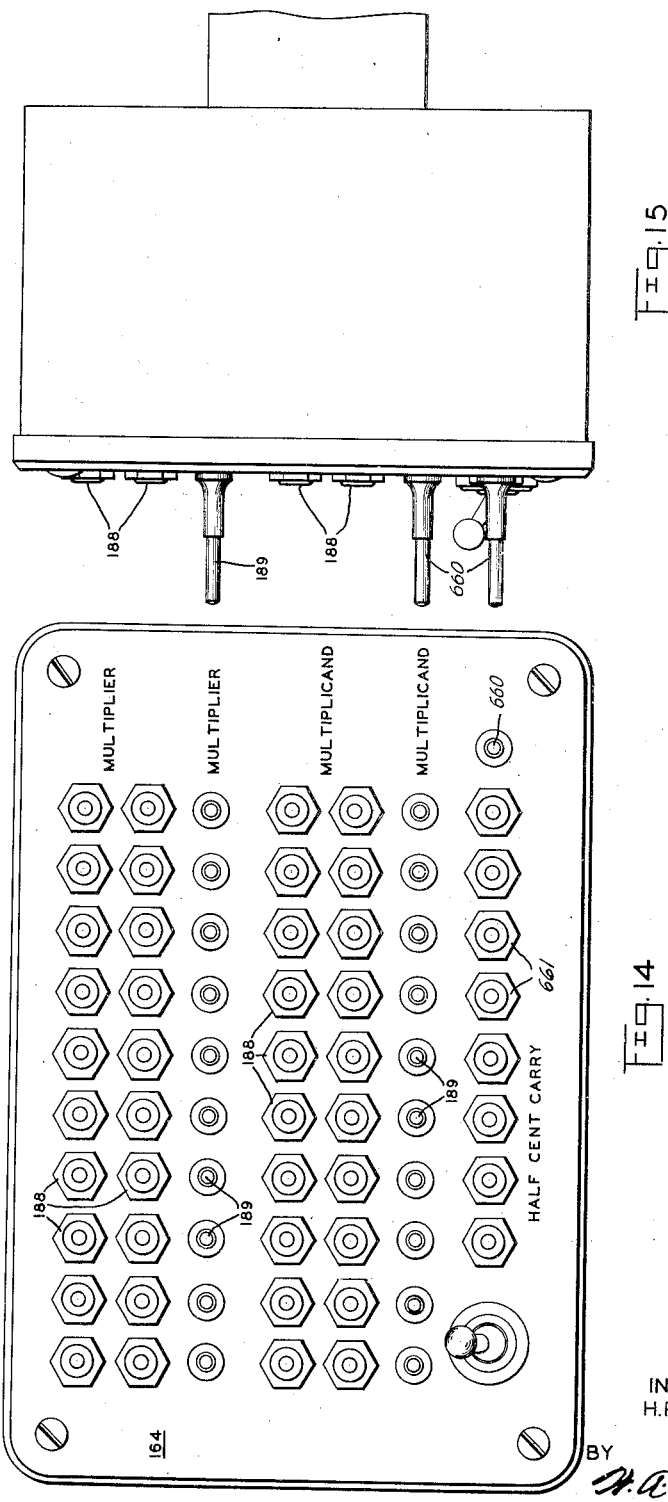

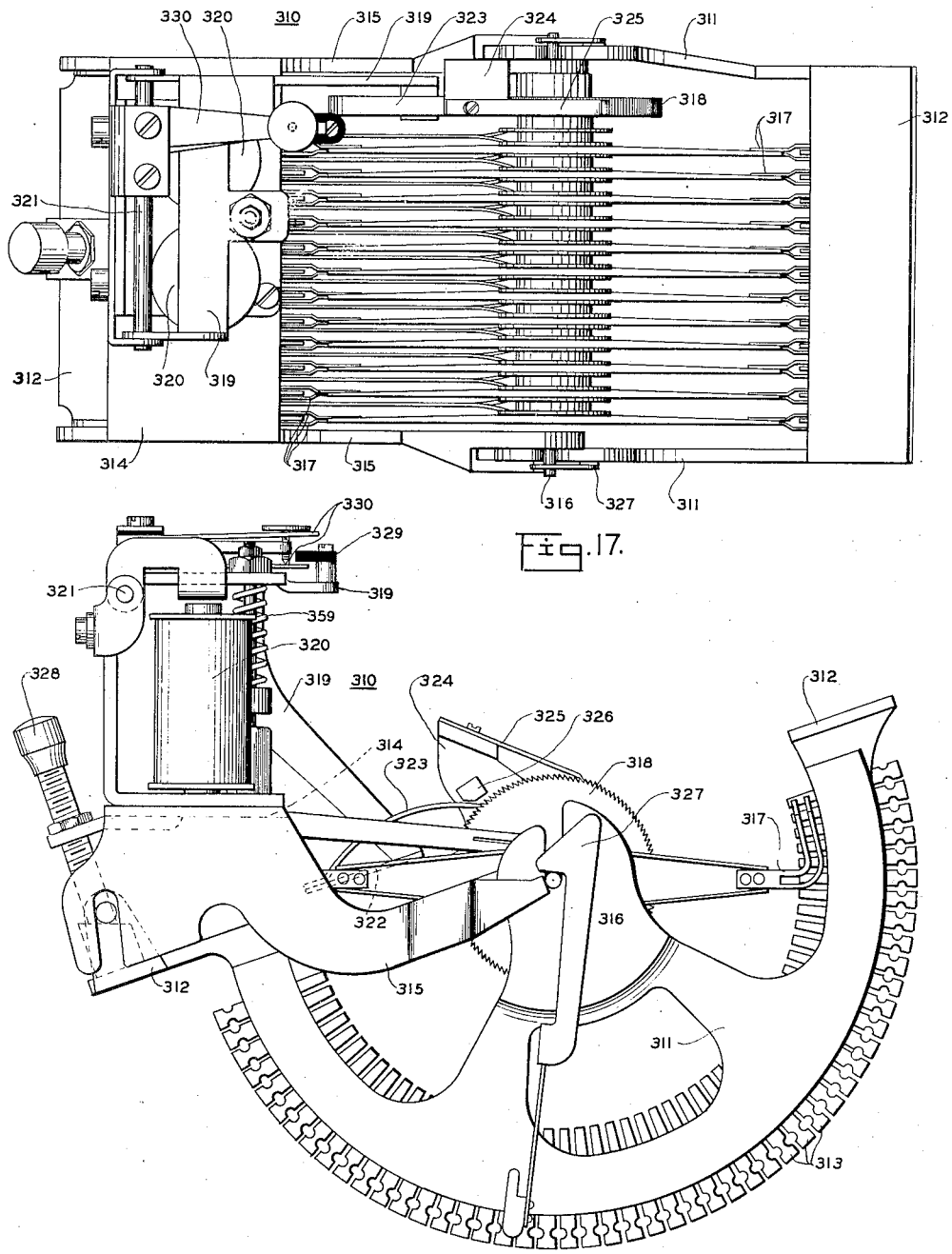

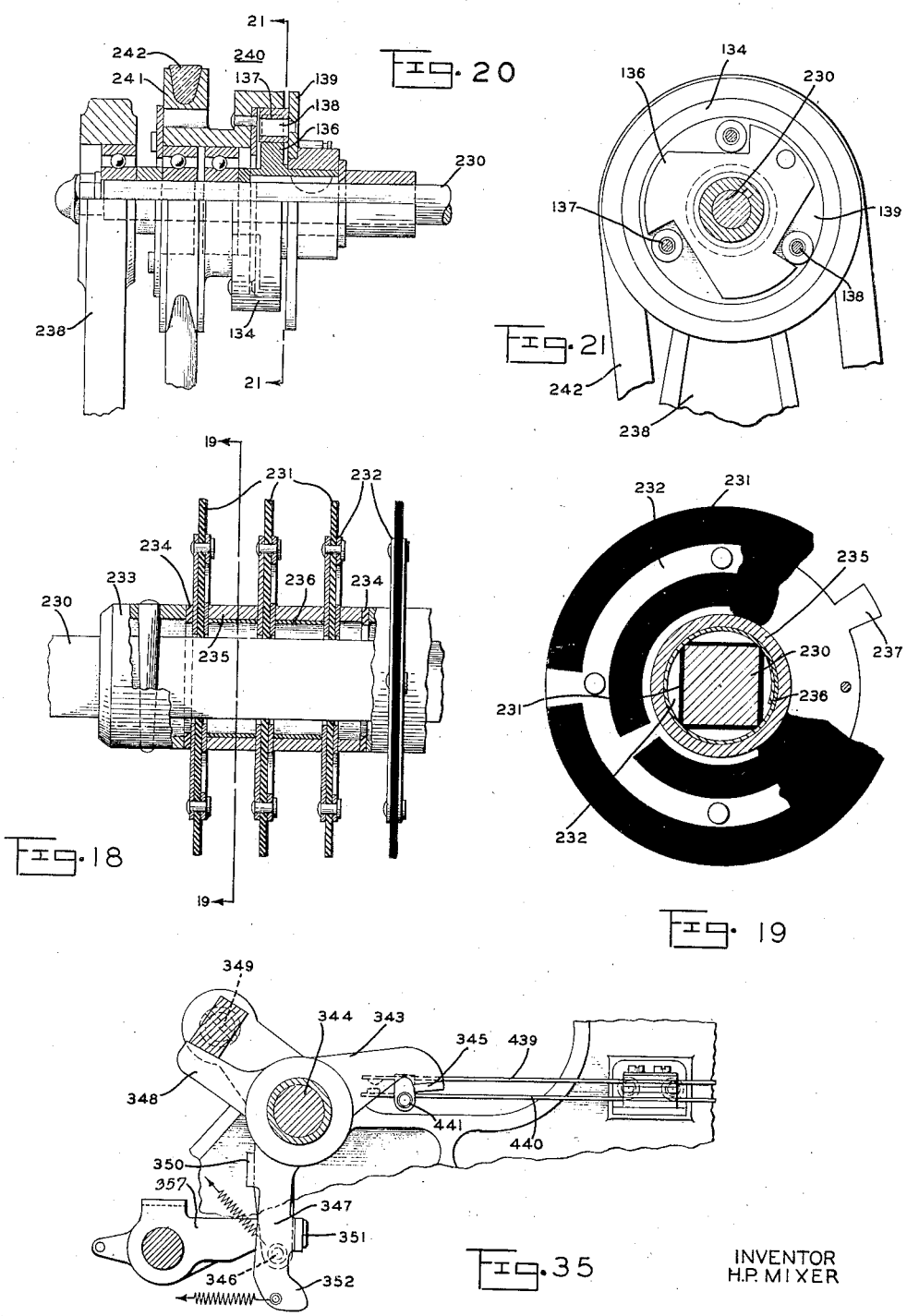

Sept. 10, 1940.   H. P. MIXER   2,214,029
CALCULATING MACHINE
Filed April 25, 1936    36 Sheets-Sheet 16
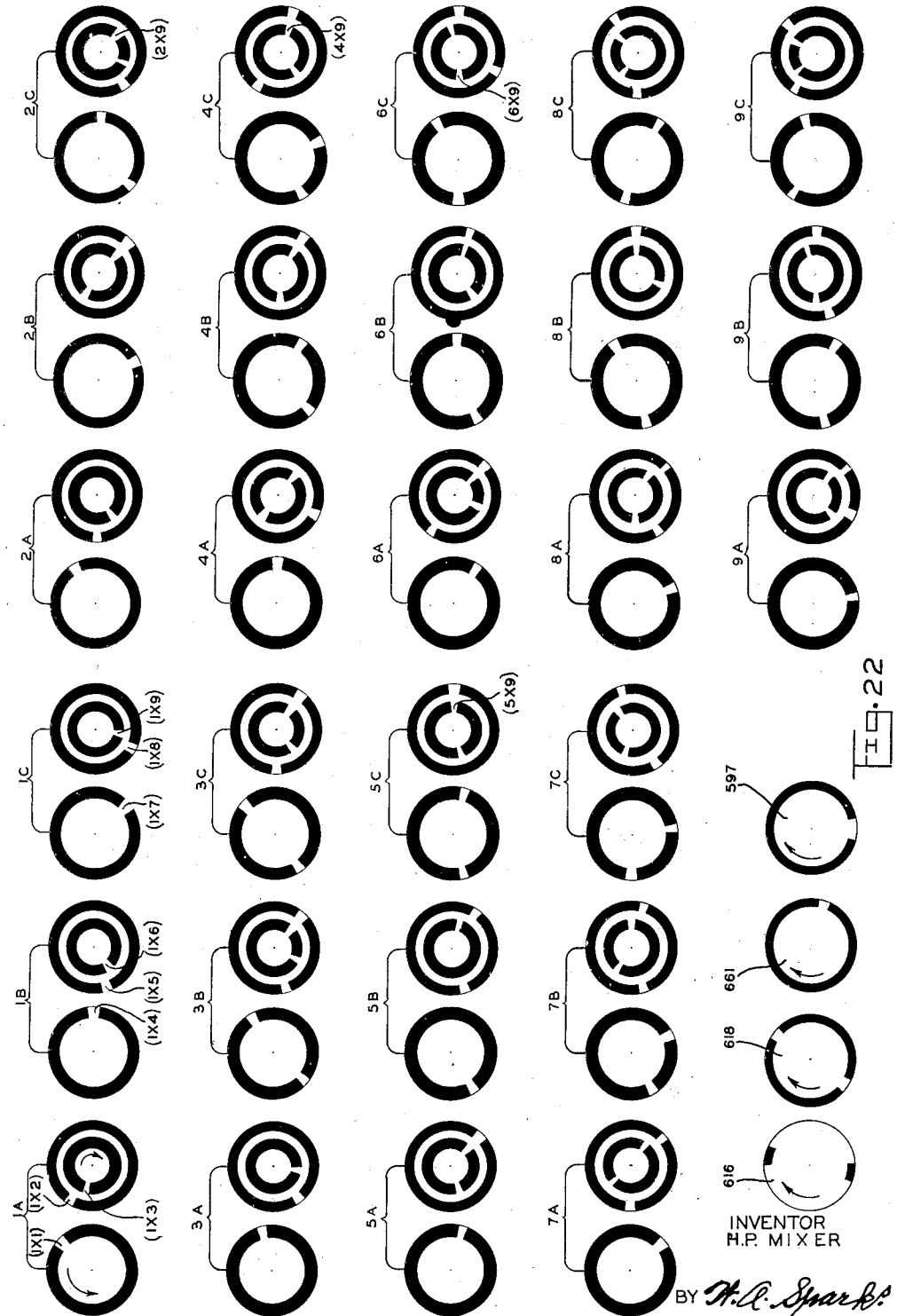
INVENTOR
H.P. MIXER
HIS ATTORNEY

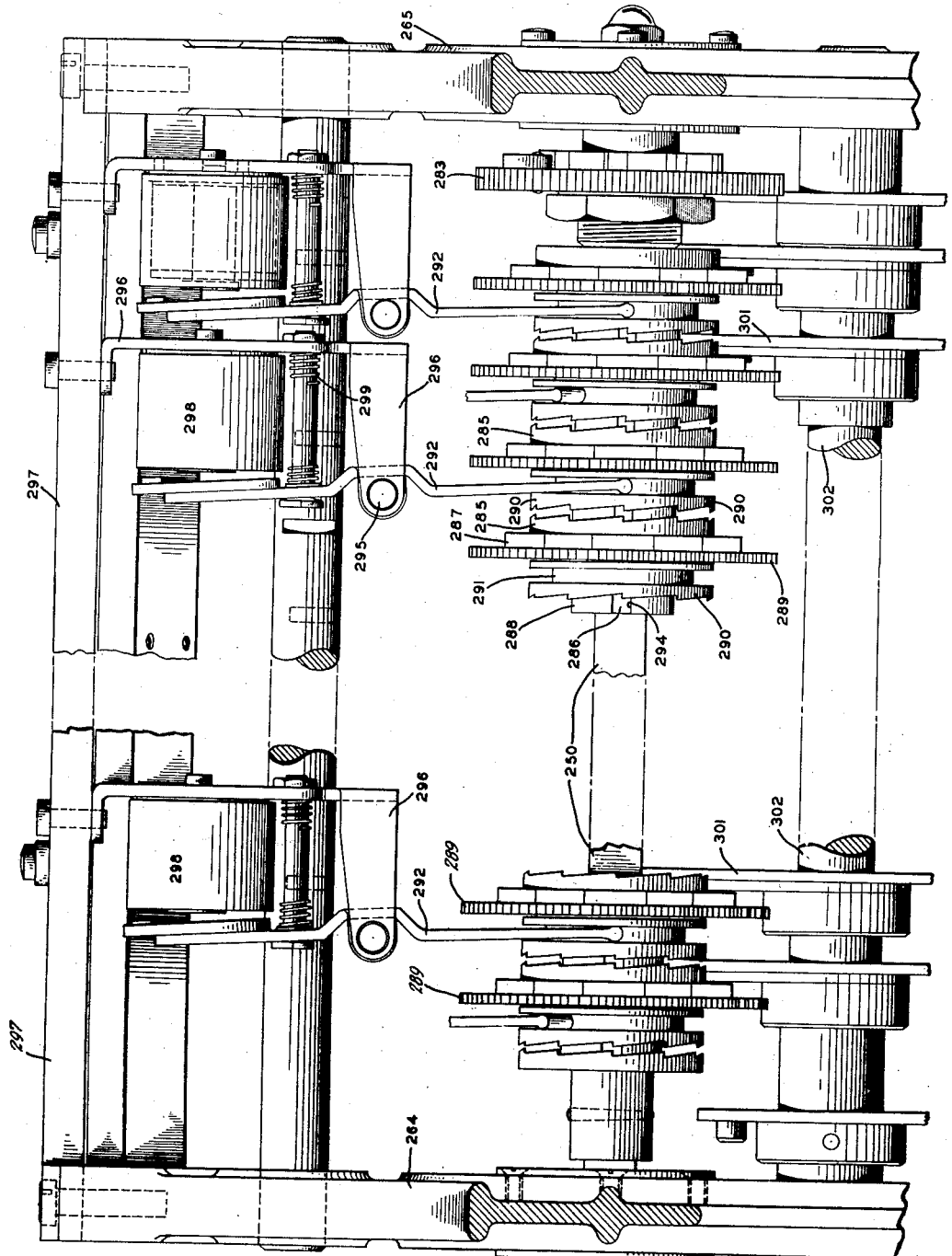

Sept. 10, 1940.   H. P. MIXER   2,214,029
CALCULATING MACHINE
Filed April 25, 1936   36 Sheets-Sheet 18
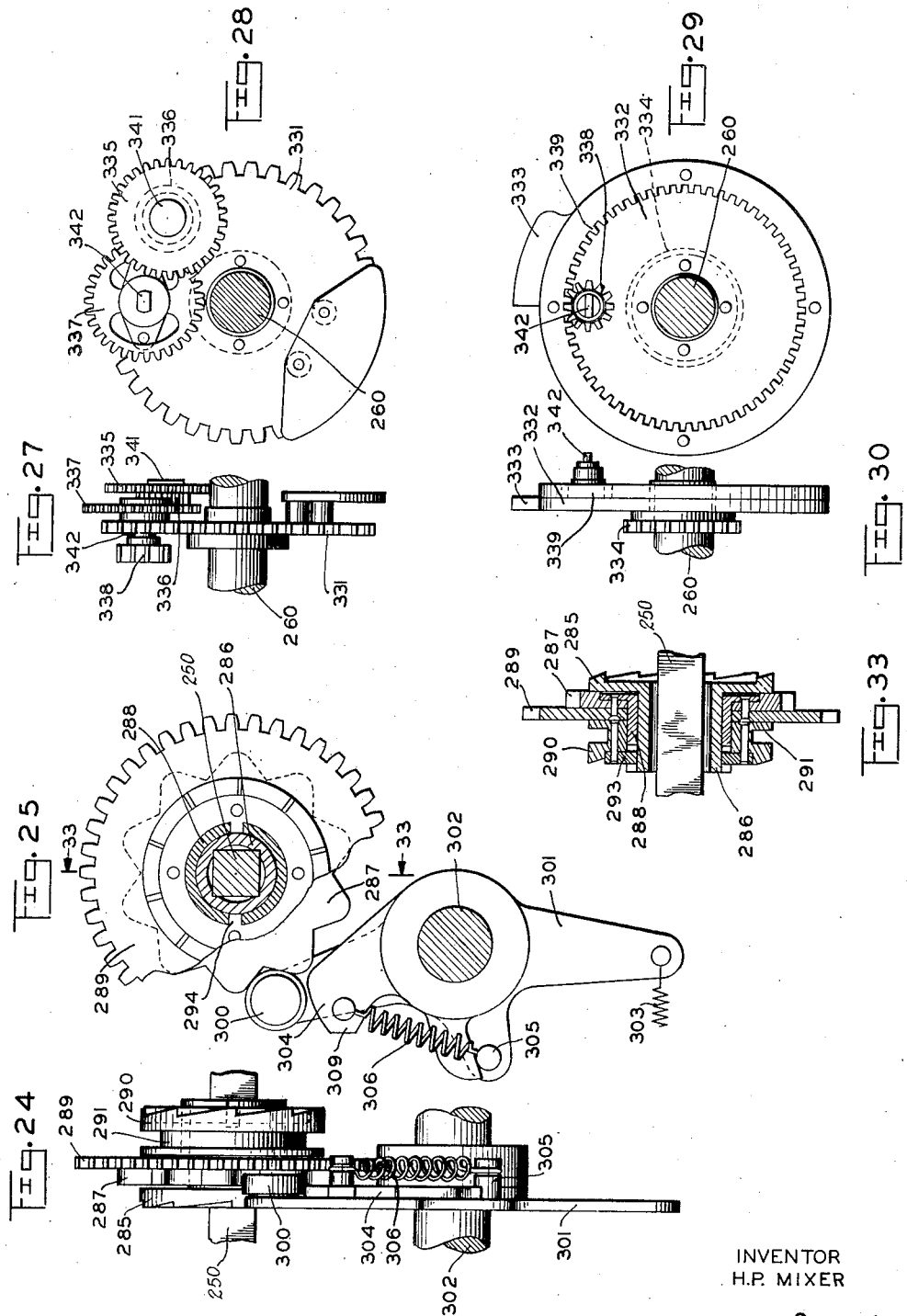
INVENTOR
H.P. MIXER
BY *H.A. Sparks*
HIS ATTORNEY Sept. 10, 1940.  H. P. MIXER  2,214,029
CALCULATING MACHINE
Filed April 25, 1936  36 Sheets-Sheet 19

INVENTOR
H.P. MIXER
BY H. A. Sparks
HIS ATTORNEY

Sept. 10, 1940.  H. P. MIXER  2,214,029
CALCULATING MACHINE
Filed April 25, 1936   36 Sheets-Sheet 20
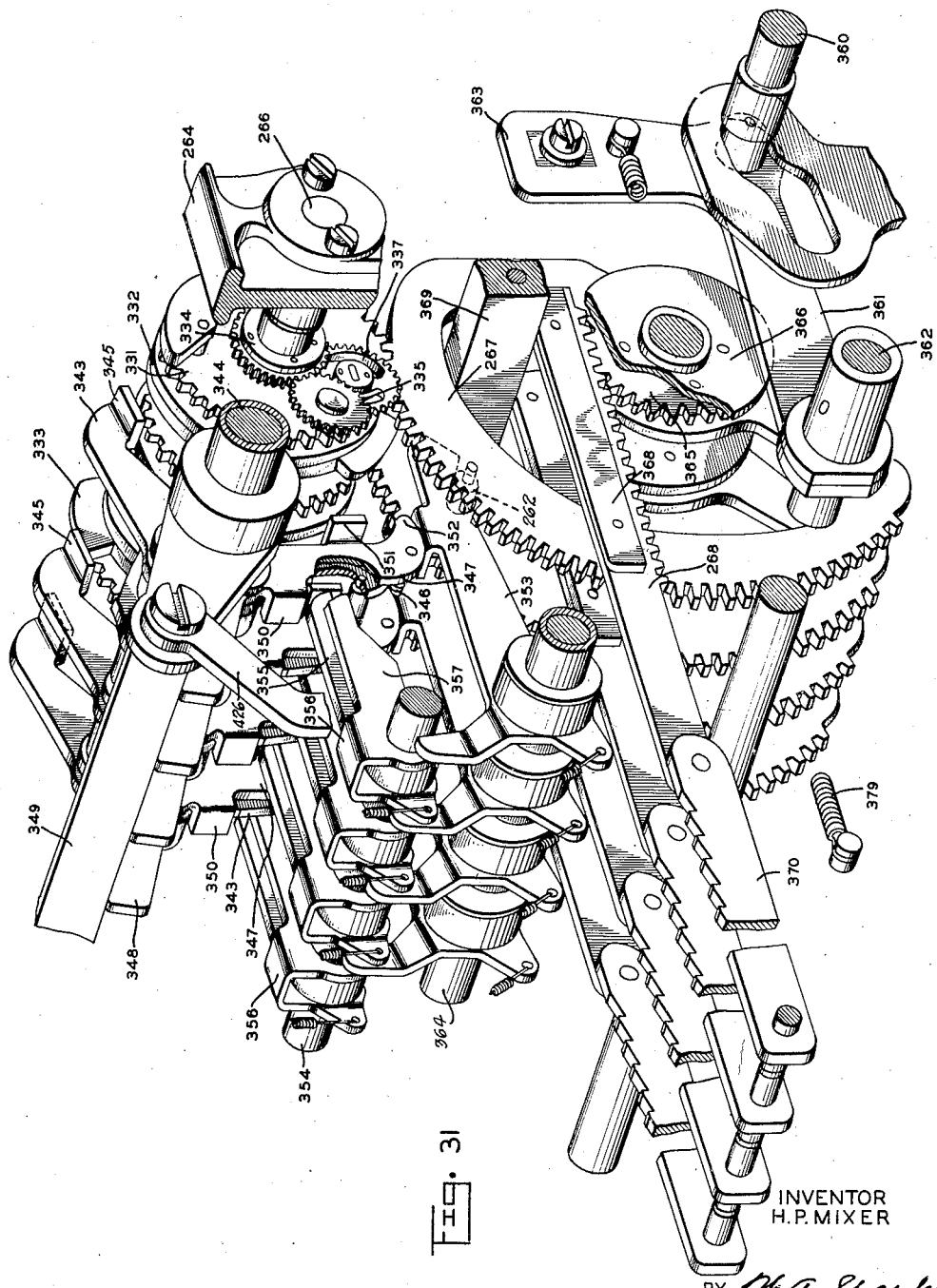
INVENTOR
H. P. MIXER
BY *H. A. Sparks*
HIS ATTORNEY

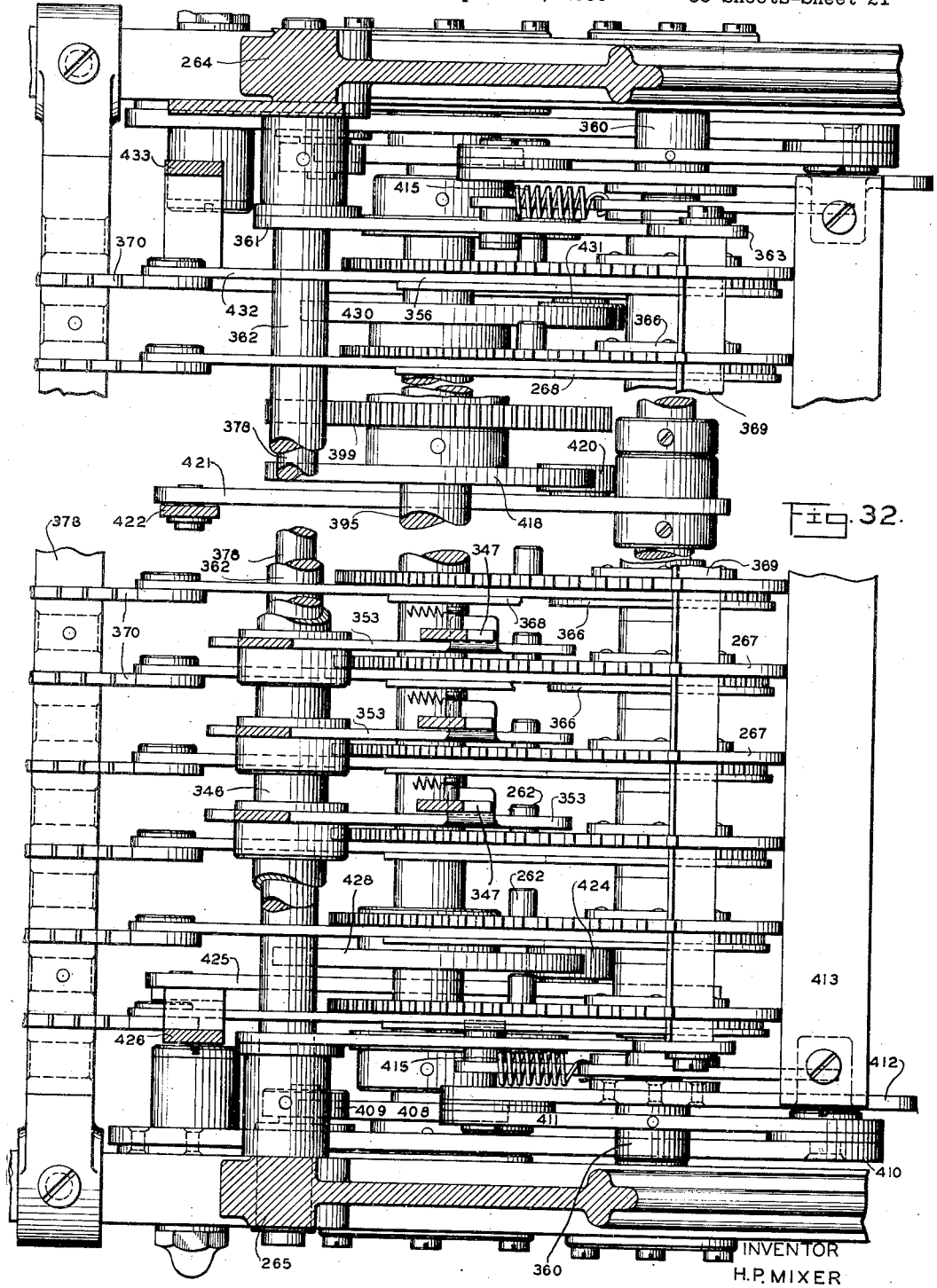

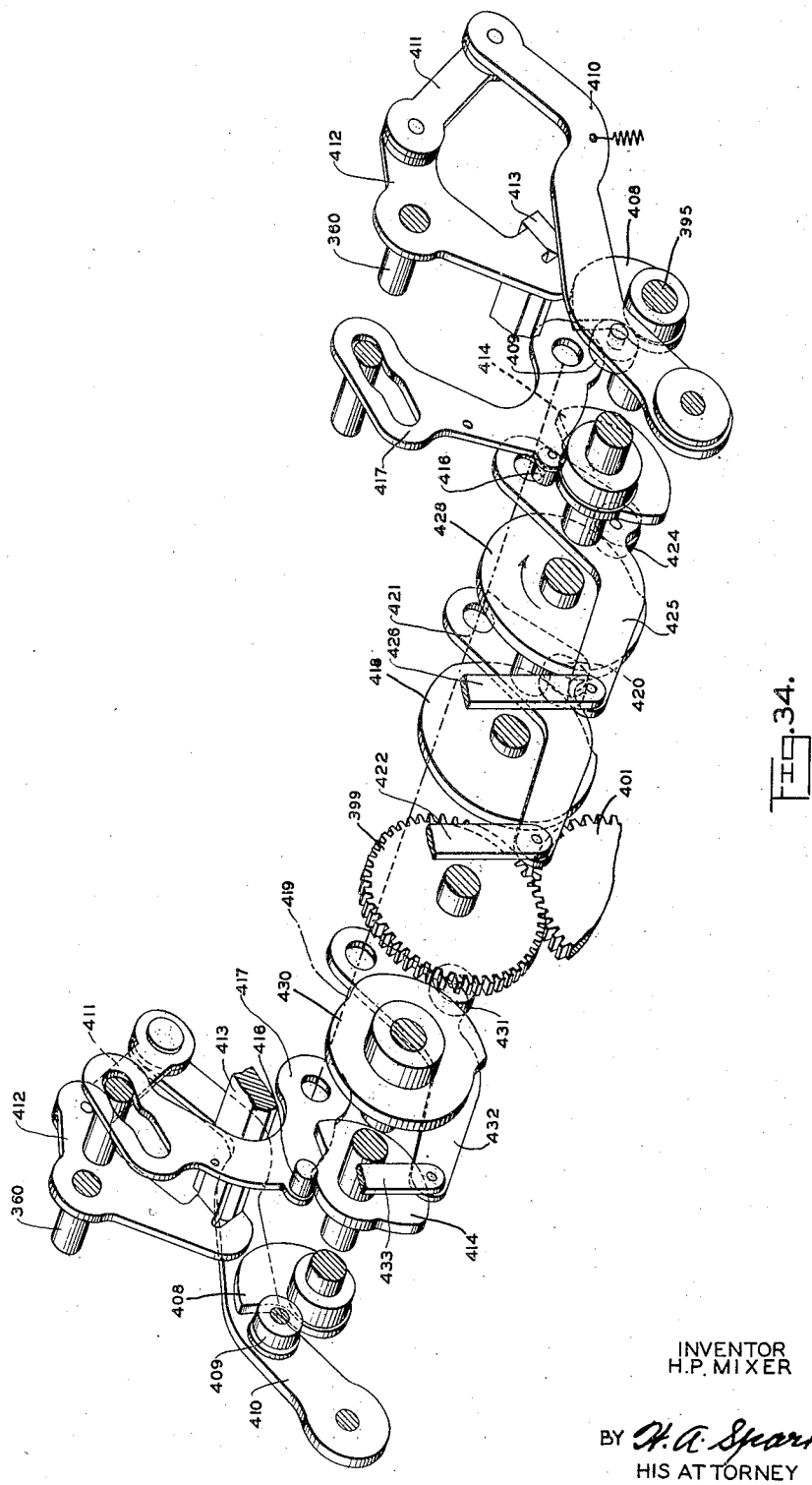

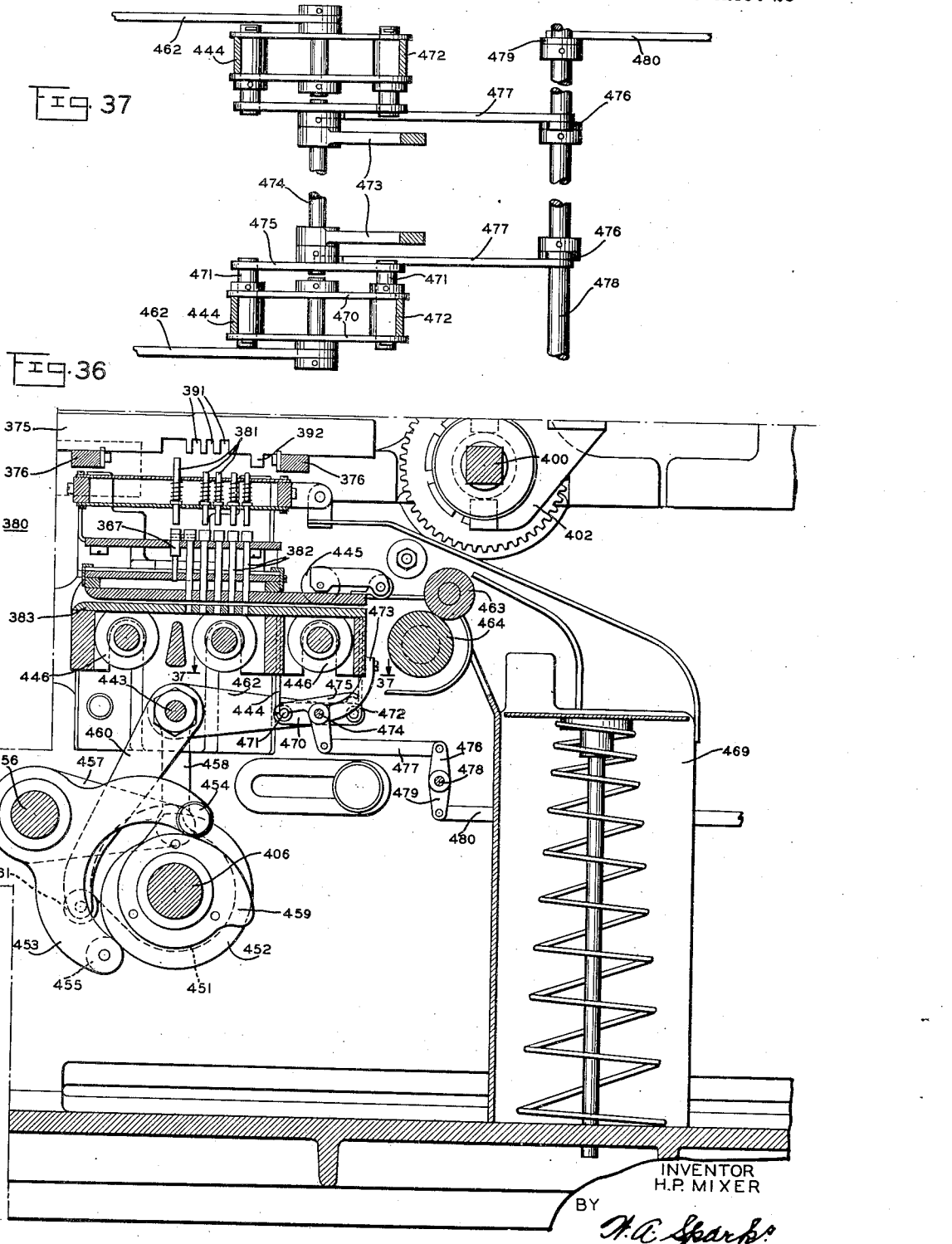

INVENTOR
H. P. MIXER

Sept. 10, 1940.   H. P. MIXER   2,214,029
CALCULATING MACHINE
Filed April 25, 1936   36 Sheets-Sheet 27

INVENTOR
H. P. MIXER
BY W. A. Sparks
HIS ATTORNEY

Sept. 10, 1940.   H. P. MIXER   2,214,029
CALCULATING MACHINE
Filed April 25, 1936   36 Sheets-Sheet 32

INVENTOR
H. P. MIXER
BY *H. A. Sparks*
HIS ATTORNEY

Sept. 10, 1940.   H. P. MIXER   2,214,029
CALCULATING MACHINE
Filed April 25, 1936   36 Sheets-Sheet 33

INVENTOR
H. P. MIXER
BY
HIS ATTORNEY

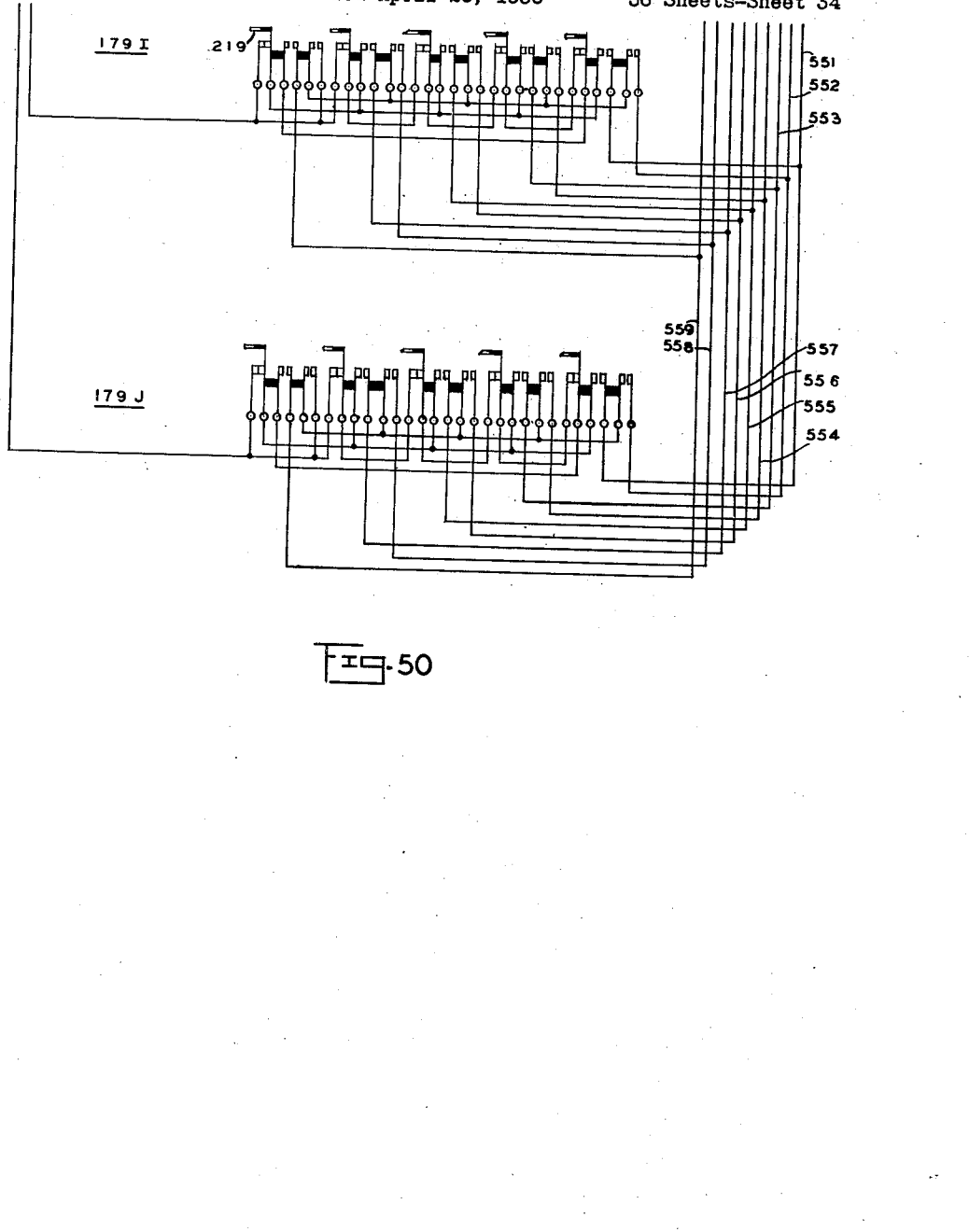

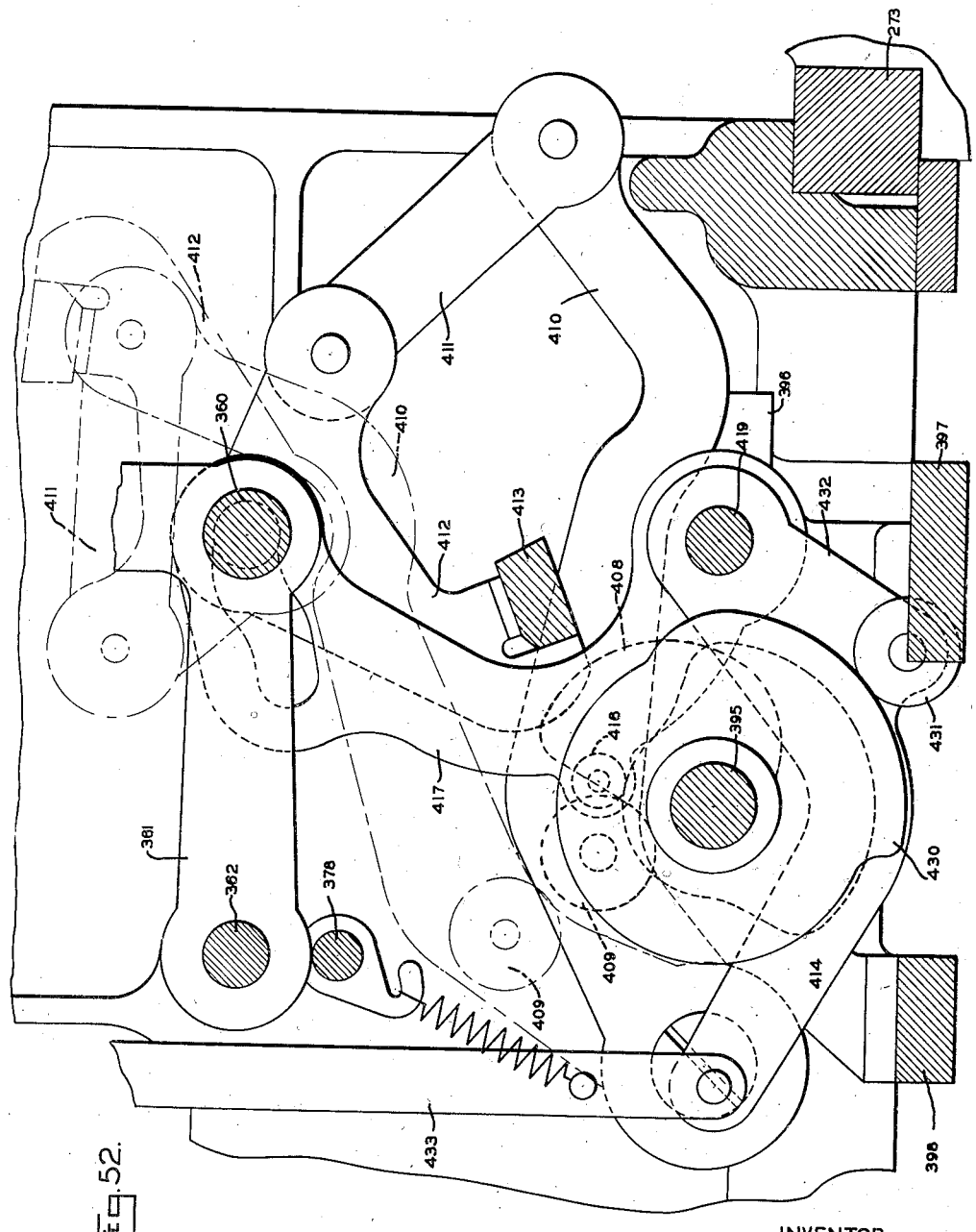

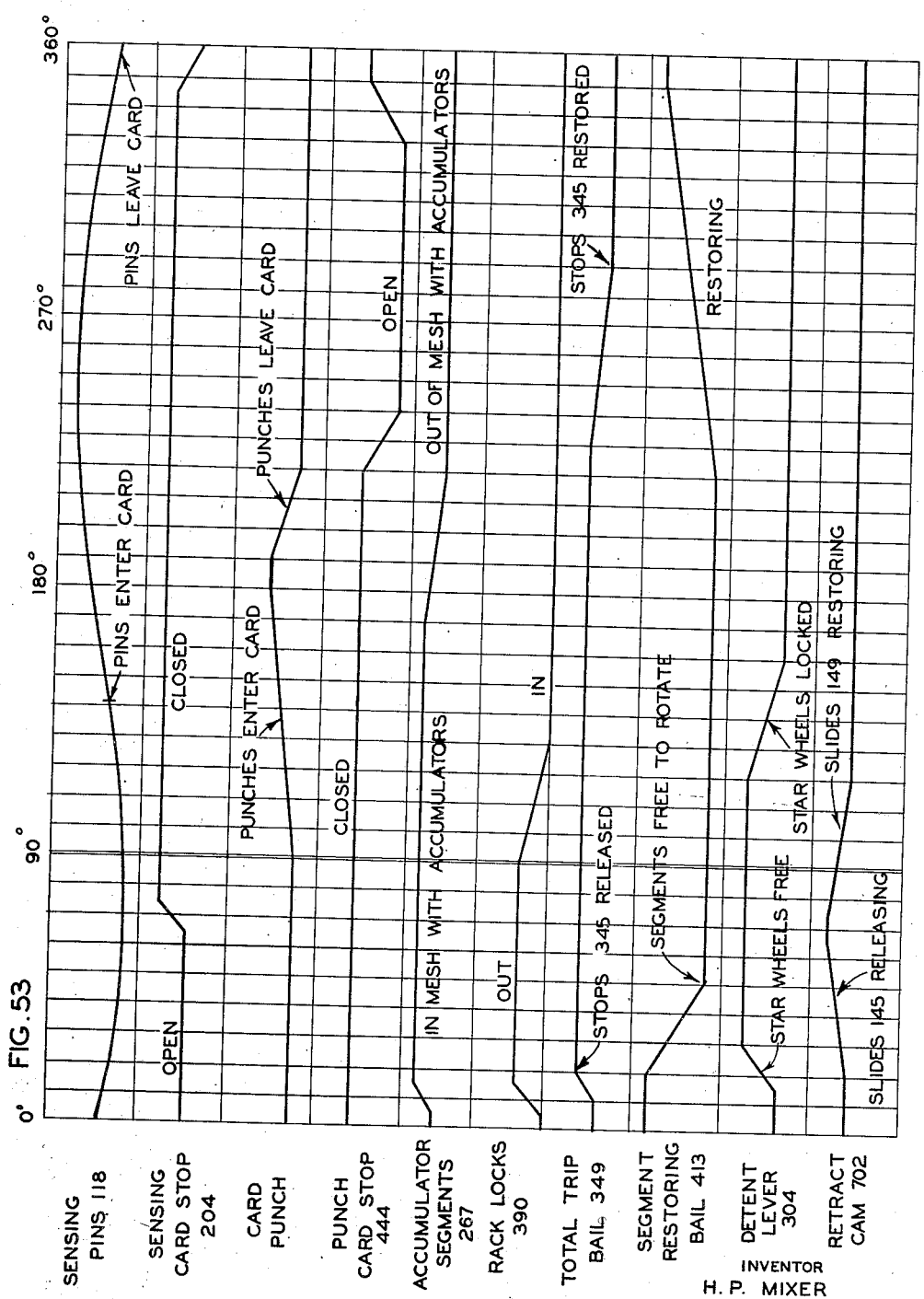

Patented Sept. 10, 1940

2,214,029

UNITED STATES PATENT OFFICE 2,214,029

CALCULATING MACHINE

Harold P. Mixer, Frankfort, N. Y., assignor to Remington Rand Inc., Buffalo, N. Y., a corporation of Delaware Application April 25, 1936, Serial No. 76,492

4 Claims. (Cl. 235—61.6)

The present invention relates to accounting machines and particularly to an accounting machine for performing multiplication. More particularly it comprehends a machine capable of reading two factors from a punched card which are to be multiplied together, multiplying those two factors and punching the product thereof in the same card from which the factors were read.

The machine is in many respects similar to known forms of tabulating and accounting machinery, but performs a combination of operations which is not possible in these old machines.

Generally speaking, the machine of the present invention comprises a sensing mechanism, a multiplication mechanism, a totaling mechanism, punching mechanism and coordinated driving means for the various elements mentioned.

An object of the invention is to provide a machine for sensing factors from any portion of a record card, multiplying those factors together, and perforating the record card with the product of the sensed factors.

A further object of the invention is to provide a multiplication mechanism in which multiplication is performed through the partial product method, but without the necessity of moving the printing or registering carriage of the machine.

A further object of the invention is to produce a multiplying machine which will sense 90 column cards and punch the product of the factors sensed in 90-column code.

A still further object is to provide a device for decoding the digits of the factors punched in the card in 90-column code to digits suitable for operating the machine.

A further object of the invention is to provide an electrically controlled multiplying machine which is adapted to efficiently multiply factors from a punched card and punch the product in the same card.

A still further object of the invention is to provide a totaling mechanism of the crawl-carry type, which is so constructed that the various wheels associated with the different denominational orders may be substantially simultaneously rotated to their zero positions.

A still further object of the invention is to provide a crawl-carry totaling mechanism which utilizes spur gearing throughout and which, consequently, may drive in either direction.

A still further object of the invention is to provide a totaling mechanism of the crawl-carry type so organized that a very small amount of rotation toward the zero position of a wheel of a lower denominational order may permit the release of the wheel of the next higher denominational order for rotation toward its zero stop.

A more clear conception of the further objects, construction, and operation of the invention may be had from the following detailed description taken in conjunction with the accompanying drawings in which:

Fig. 2 is a side view of the machine looking from the right with the casings removed showing in particular the main driving mechanisms and their associated parts.

Fig. 3 is a side view of the machine taken from the left showing additional drive mechanism as well as the relay mounting panel and the general organization of the carriage containing the totaling and recording mechanism.

Figs. 4, 5 and 6 taken together comprise an enlarged sectional view of the machine, the section being taken somewhat to the left of the center line of the machine.

Fig. 6A is a diagram for combining Figs. 4, 5 and 6.

Figs. 7 and 8 taken together comprise a front elevation of the machine some of the lower portions thereof being shown in section, in order that the driving clutch may be seen.

Fig. 9 is a rear elevation of the machine showing the location of the commutator shaft, stepping switch and various drive shafts and accumulator units.

Figs. 10 and 11 combined form a plan view of the machine disclosing the location of the mechanisms.

Fig. 12 is a detail sectional view taken along line 12—12 of Fig. 13, showing the construction of one of the translating or decoding mechanisms.

Fig. 13 is a front elevation of Fig. 12.

Fig. 14 is an elevation of the plugboard through the medium of which desired columns of the decoding mechanisms can be connected to either the multiplicand or multiplier selecting devices. In this figure there is also shown a row of jacks utilized to control a significant figure carry mechanism.

Fig. 15 is a side view of the plugboard of Fig. 14.

Fig. 16 is a detail side elevation of one of the stepping or sequence switches.

Fig. 17 is a front view of Fig. 16.

Fig. 18 is a view in cross section showing the construction of a group of commutators and the mode of fastening the various commutator discs to the commutator shaft.

Fig. 19 is a cross sectional view of the commutator mechanism and mounting taken along the line 19—19 of Fig. 18.

Fig. 20 is a side view partially in section showing the construction of the commutator shaft clutch.

Fig. 21 is a cross sectional view of the clutch of Fig. 20 taken along the line 21—21 of that figure.

Fig. 22 comprises a schematic showing of the cutting of the various commutators used for multiplying.

Fig. 23 is an elevation showing details of the clutch mechanism and the clutch operating magnets.

Fig. 24 is a detail rear view showing an accumulator gear, its associated detent lever, and their relation to the clutch mechanisms of Fig. 24.

Fig. 25 is a side view of Fig. 24 showing the detent wheel and associated lever.

Figure 26:
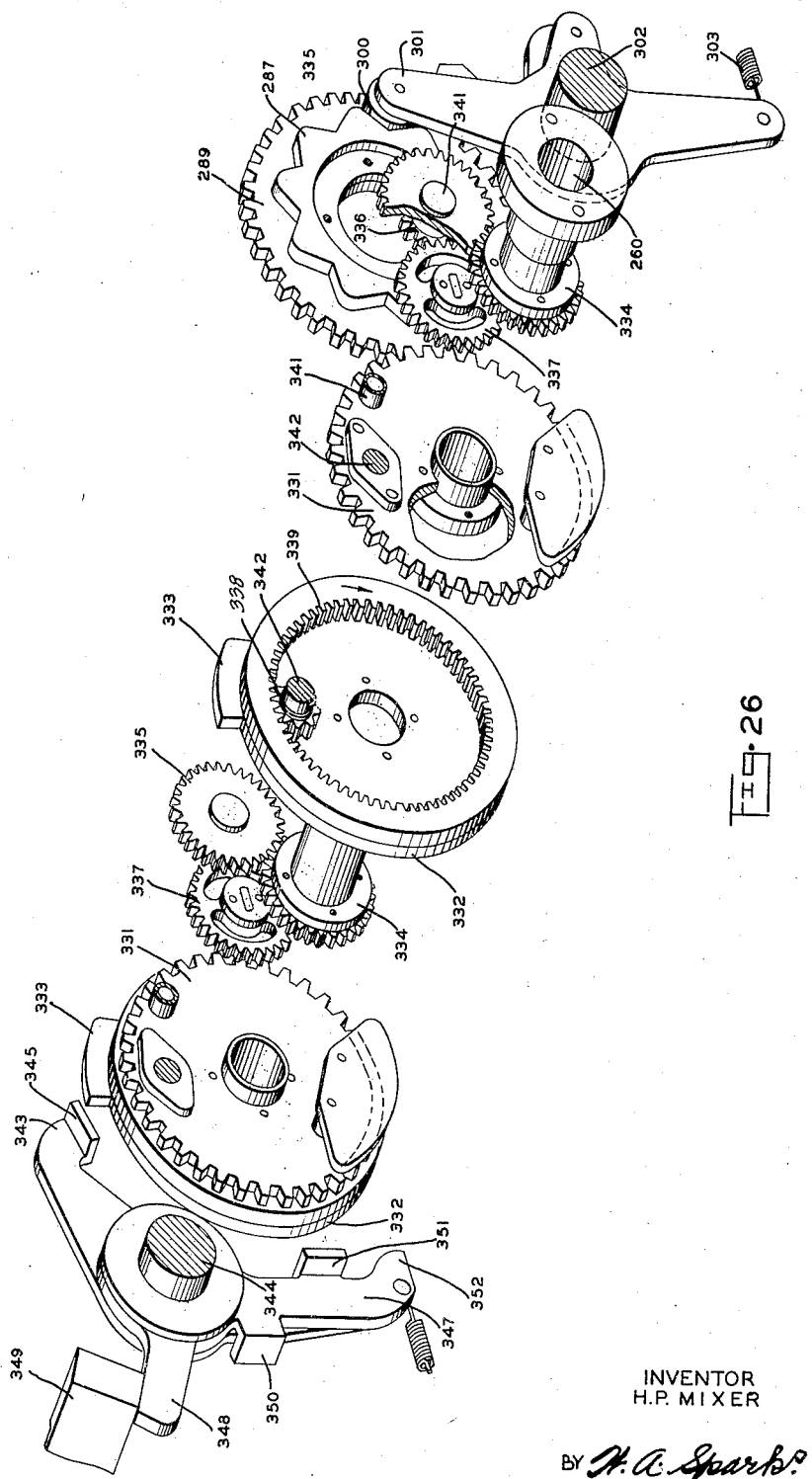

Fig. 26 is an exploded isometric view of two accumulator units showing the relationship of the accumulator gears and wheels and of the planetary transmission for effecting the carry of tens.

Fig. 27 is a detail view showing the mounting of the planetary gearing comprising the carry mechanism on the accumulator gearing. This figure is a view from the front of the machine.

Figure 28 is a side view of Fig. 27 disclosing one of the accumulator gears and its associated planetary gears mounted thereon.

Fig. 29 is a front view of one of the accumulator wheels showing the orbit gear of the planetary train fastened thereto and the sun-gear associated with the next higher order likewise fastened to the wheel.

Fig. 30 is a side view of the device shown in Fig. 29.

Fig. 31 is an isometric view showing the construction and location of the accumulating and total taking mechanisms together with portions of the recording mechanism and portions of the mechanisms for effecting zeroizing of the accumulator wheels.

Fig. 32 is a cross sectional view taken through 32—32 of Fig. 5 showing the accumulator sectors and their associated stop arm and the main driving gear.

Fig. 33 is a detail cross section through 33—33 of Fig. 25.

Fig. 34 is an isometric view showing in detail the control cam shaft in its operated position and the various cam rollers cooperating with the cams on the shaft for effecting release of the accumulator wheels, meshing of the sectors and release of the sectors as well as restoration of all these elements to their normal position.

Fig. 35 is a detail view showing the cooperation of the stop arm of the highest denominational order accumulator unit with a pair of contacts to effect machine control.

Fig. 36 is a modification of the structure of Fig. 6 showing the necessary mechanism to permit the machine to punch in both upper and lower zones of the card.

Fig. 37 is a detail cross section taken on line 37—37 of Fig. 36.

Figure 38:
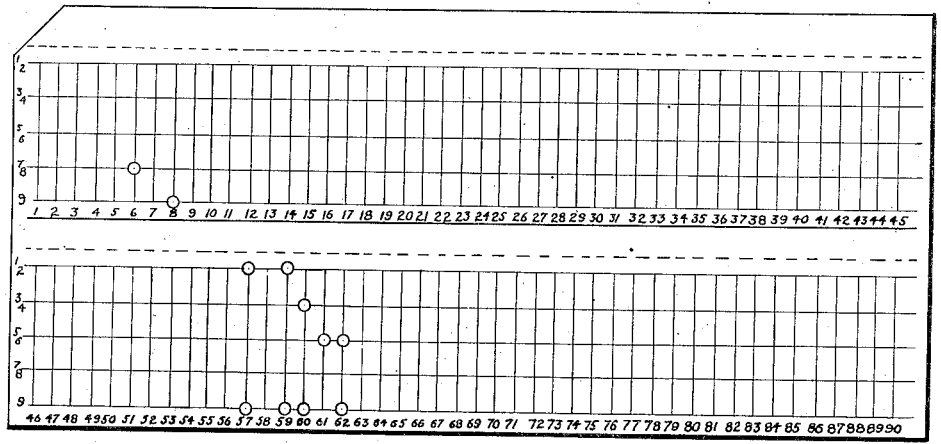

Fig. 38 is a view of a card carrying two factors, one of which is punched in the upper and one in the lower zone, both factors being punched in the 90 column code.

Figure 39:
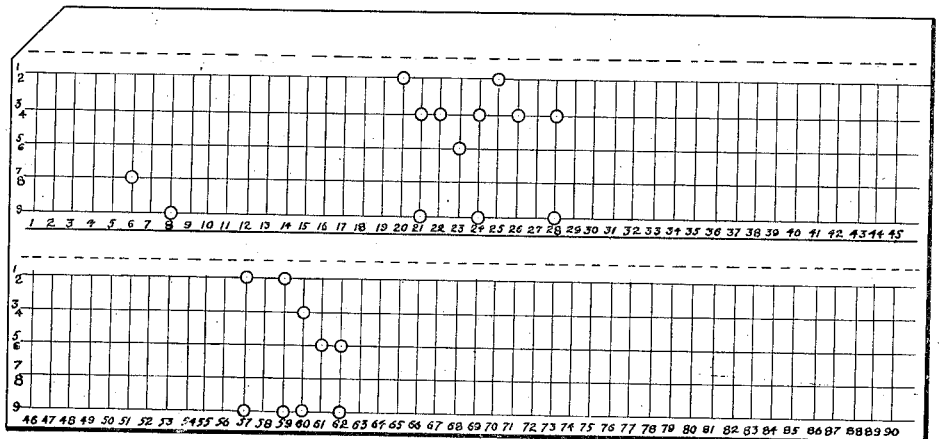

Fig. 39 shows the card of Fig. 38 after the product of the two factors has been punched therein.

Figure 40:
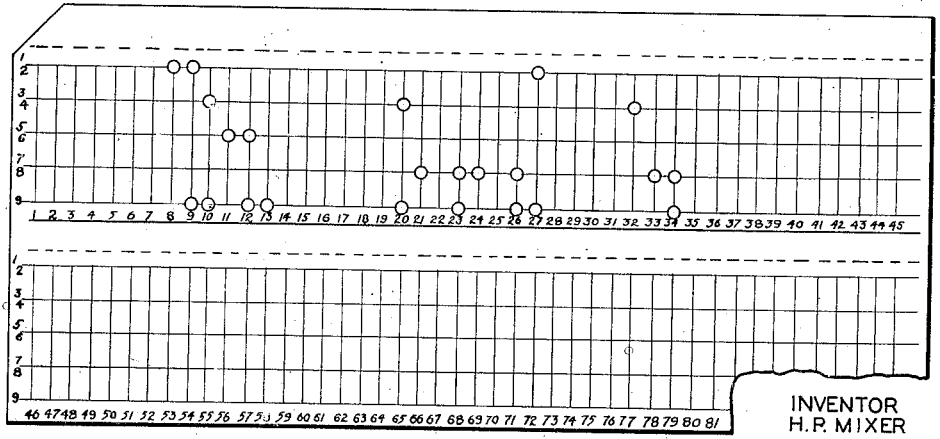
Figure 41:
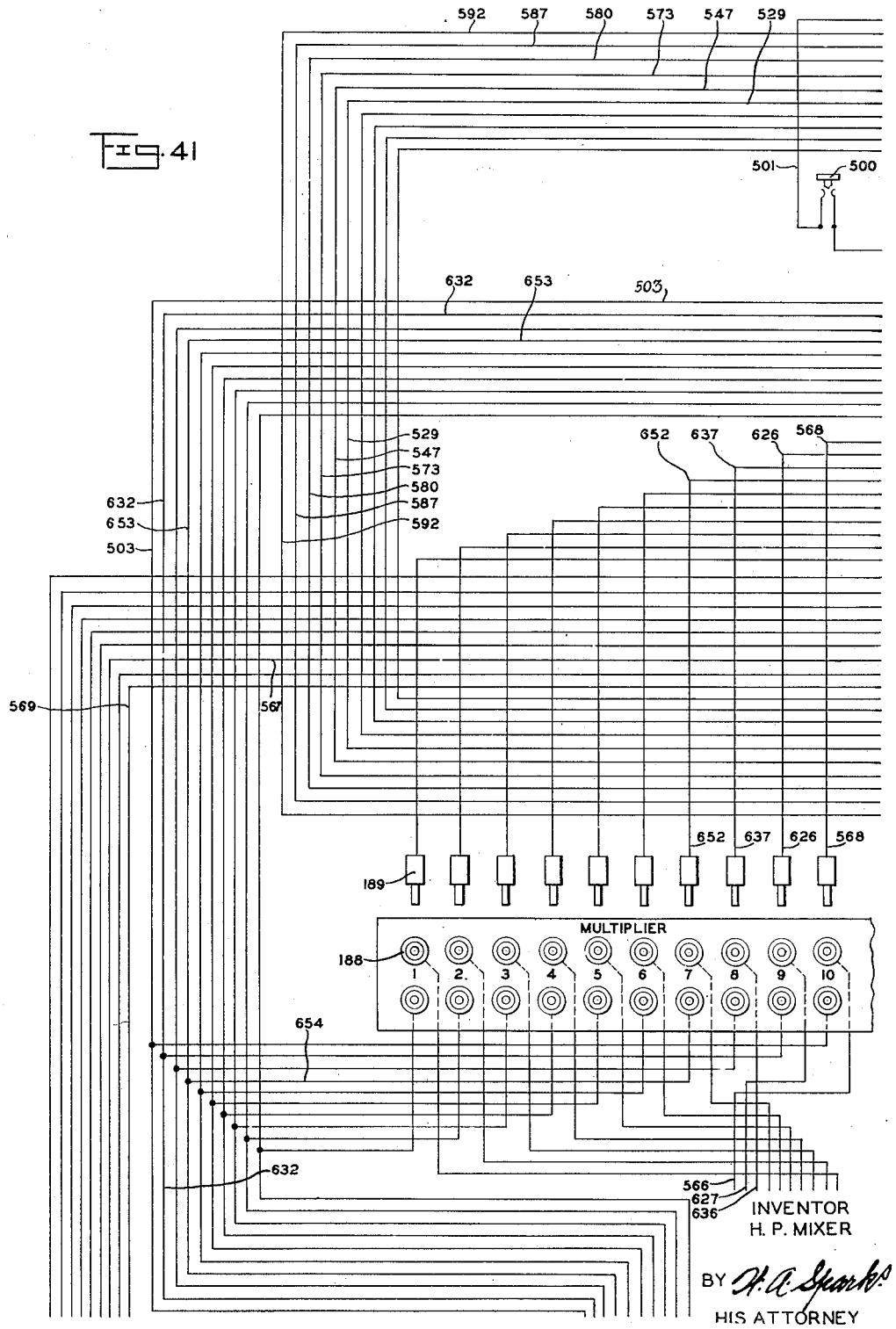

Fig. 40 shows a card which has punched in it the larger of two factors in the left hand end of the upper zone and the smaller factor in the right hand section of the upper zone with the product punched between.

Figs. 41–50 inclusive, which taken together, comprise a wiring diagram of the complete machine.

Figure 51:
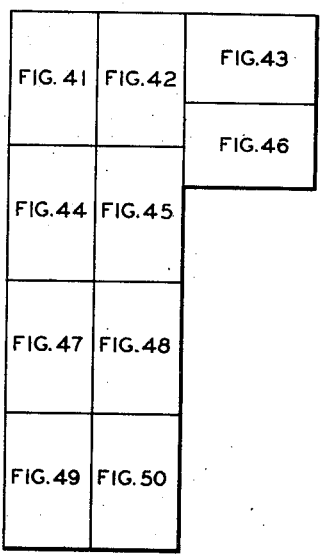

Fig. 51 is a diagram for combining Figs. 40–49 inclusive.

Fig. 52 is a detail view showing the operating cams and their associated arms in the operated position.

Fig. 53 is a timing diagram showing the relative operations and movements of most of the important operating mechanisms.

General description

Figure 1:
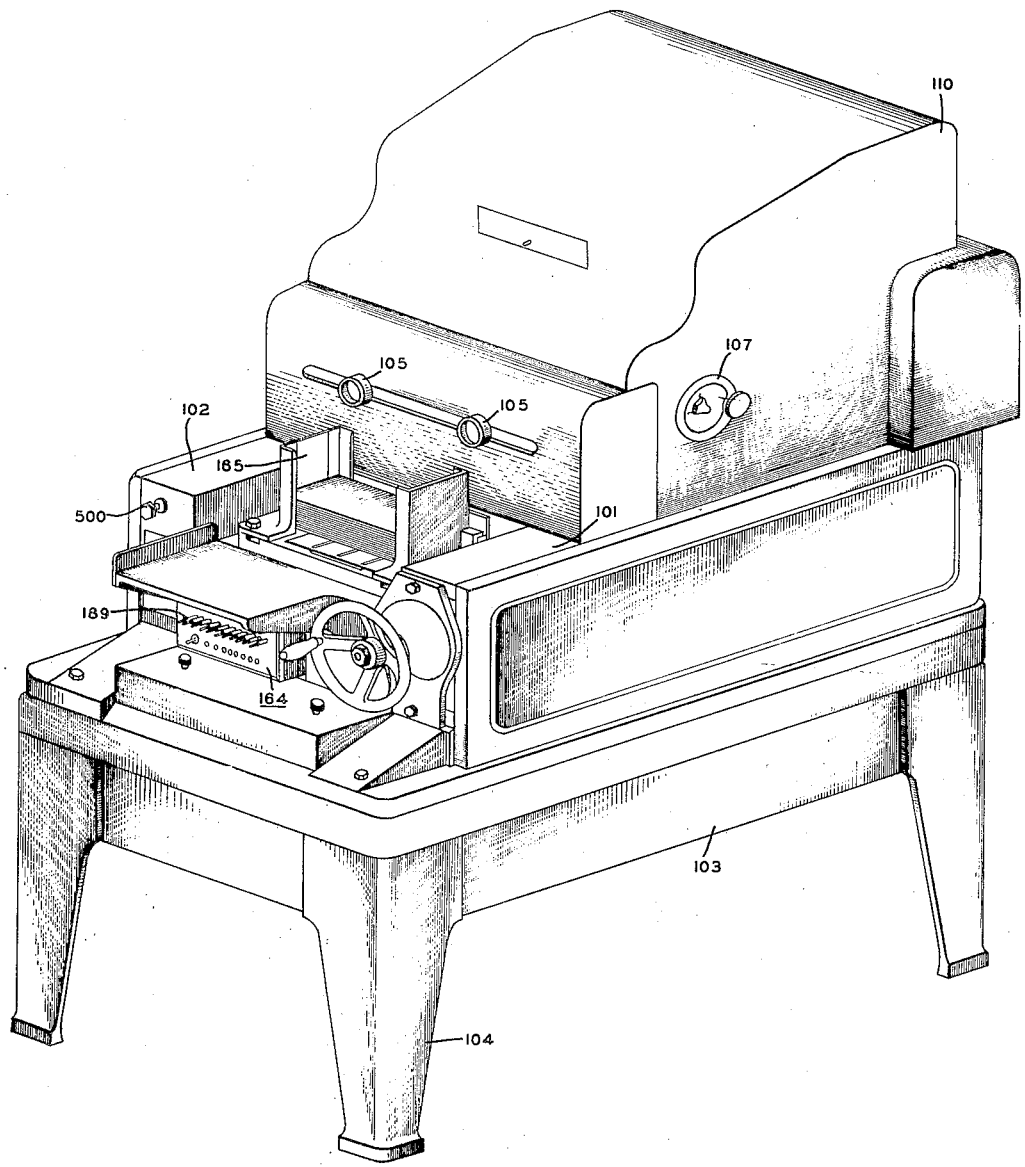
Fig. 1 is a view of the machine showing its appearance with the enclosing casings in place as they would be when the machine is in commercial use.

The appearance of the machine, when the various enclosing casings are in place, is shown in Fig. 1. As will be seen from this figure, and from Figs. 2 and 3, the various elements of the mechanism are supported by side castings 101 and 102, which are, in turn, mounted upon a base or bed plate 103 (Fig. 1), the bed plate being supported by legs 104. Castings 101 and 102 are box-like in shape having their bottoms toward the center line of the machine. Casting 101 is at one side of the machine and casting 102 at the other and between them extend various shafts, bars and rods, which support the machine elements.

Decoding mechanisms which will hereinafter be described are arranged to be moved transversely to align with any desired field in the record card. Control knobs for adjusting these mechanisms are shown in Fig. 1, designated as 105. Likewise, movable transversely of the machine is the totalizer carriage 110 which is that portion of the machine which is located above the frames 101 and 102. The mode of mounting the carriage will be described hereinafter. Transverse adjustment of the carriage however, is under control of the hand-wheel 107 which may be best seen in Figs. 1 and 2.

Supported on the forward portion of the bed plate 103, and between the forward portions of the castings 101 and 102, are the card magazine 165 (Fig. 4) and sensing mechanism. To the rear (Fig. 6) of these are the punching chamber and the punch control racks, while still further to the rear is the card receiving magazine 469 and various of the control and timing mechanisms. Above the receiving magazine lies the commutator shaft and the drive shaft for the accumulator units, together with the accumulator units themselves and the mechanism for causing them to yield their totals. These elements will be considered in detail as the description continues.

Driving mechanism

Suspended beneath the bed plate 103 is an electric motor (not shown) which, through the medium of a belt 108 (see Fig. 2), drives a main shaft 109 which is supported in bearings fastened to the surface of the casting 101. On this shaft are various worms which drive associated worm wheels connected to the card feed and sensing mechanisms. The last worm on shaft 109 drives a worm wheel, which, through associated gearing and a belt drives the commutator and associated accumulator shafts. Likewise mounted on the main drive shaft is a dog clutch (not shown) and a hand wheel 111 for operating the machine by hand should the occasion arise. The various elements of the driving mechanism will be described in detail in connection with the machine elements with which they are directly associated.

Sensing mechanism

The sensing mechanism utilized in this machine is in general similar to that used in Powers type of tabulator, and is well known in the tabulator art. The sensing mechanism (Fig. 4) comprises the sensing head 115, the sensing chamber 116 and the reading-retaining box 117, the elements of which are well known but will be briefly described.

The sensing head 115 is a box-like structure of approximately the size of a record card, having a base plate 112 and an upper plate 114 between which are located 45 columns of sensing pins 118, each column comprising eleven pins. (In the usual tabulator the sensing head has twelve pins per column, but as will later be seen, the instant machine does not utilize the first or uppermost hole position of the card.) Each pin is held in its uppermost position by means of a spring compressed between a collar on the pin and the lower sensing plate 112. In order to retain any sensing pin which has passed through the card in its uppermost position, relative to the sensing head, latching slides 119 are provided, one slide for each column of pins. These latching slides have cutouts with noses formed therein in a well known manner, and are slidably mounted in the sensing head and operated through the medium of a bail 120, which is oscillated under control of a lever 121, a roller 122 on the lower end of which bears against a stationary cam plate 124. A latch controlled by the well known "card presence" sensing pin is also provided to prevent locking of the sensing pins when there is no card in the sensing chamber.

The sensing head is arranged to reciprocate vertically and is guided by sleeves 125 which project downwardly from the sensing head and slide on rods or posts 126 which are supported upon the bed plate 103. The reciprocation of the sensing head is caused by rotation of the sensing drive shaft 127 (Figs. 2 and 4) which shaft is carried in bearings in castings 101 and 102. This shaft extends across the machine directly under the sensing head 115.

Mounted on shaft 127 (see Fig. 4) are two eccentrics 129 one of which lies under each side of the frame of the sensing head. Each eccentric 129 is provided with an eccentric strap 130 having a link-like extension 131. The extension of each eccentric is pivotally connected to a stud fixed to the side of the sensing head frame and thus, as the shaft 127 revolves, sensing head 115 moves up and down.

Shaft 127 is driven from shaft 109 through gearing and a clutch such that its movement is intermittent and is under control of a clutch tripping lever which is magnetically operated as is later described.

Fastened to shaft 109 (Fig. 2) is a worm 132 which meshes with and continuously rotates a worm wheel 133 which is free to rotate on shaft 127 (see Fig. 8). Fastened to worm wheel 133 is a sleeve 134 which serves as the driving element of a clutch 135. As clutch 135 is similar to that used for controlling the rotation of the commutator shaft shown in Fig. 20, both will be described at this time using the same reference characters. Keyed to shaft 127 by a Woodruff key with its periphery in vertical alignment with the annular rim of sleeve 134 is a disc 136 (Figs. 20 and 21), which is the driven element of the clutch. This disc has a number of wedge-shaped portions cut from it, and in these cuts lie rollers 137 which are rotatably mounted on studs 138 supported by the tripping disc 139, which is, in turn, rotatably mounted on the hub of disc 136. Tripping disc 139 (Fig. 2) is provided with two projections 142 and 143 which cooperate alternately with a tripping lever 140 operated by a magnet 141, energized in a manner later described. A light spring 144 (Fig. 2) is stretched between a stud on the tripping disc 139 and a stud on the driven element 136 of the clutch to maintain the parts in operative relation.

When the tripping magnet 141 is operated, lever 140 is momentarily removed from the path of one of the projections on disc 139, spring 144 then moves the disc 139 counter-clockwise thus carrying the rollers counter-clockwise (as viewed in Fig. 2) until they are wedged between the sleeve 134 and the cut out portions of disc 136. The rollers being thus wedged between the two, the disc 136 is driven by the sleeve 134 until the tripping disc 139 is stopped by the other of the projections thereon striking the tripping lever 140.

It will be apparent from the drawings that the projections 142 and 143 are so spaced that the shaft 127 rotates in two steps, the first being about 90° and the second about 270°.

Sensing chamber

Immediately above the sensing head is a card sensing chamber 116 (Fig. 4) which is composed of two plates 145 and 146, which are perforated in the same manner as the plates 112 and 114 of the sensing head and between which a card to be sensed is fed in a manner hereinafter described.

Record retaining mechanism

Supported immediately above the sensing chamber is a record-retaining box 117 which contains a plurality of record-retaining pins 147, which pins are arranged in 45 columns of eleven each to cooperate with the similarly arranged pins in the sensing head. Pins 147 are adapted to be locked in their uppermost positions by the cooperation of extrusions or pins 148 thereon, with latching slides 149. Two latching slides are provided for each column of pins, one of the two slides serving to retain the five pins associated with the upper 90-column zone in their operative position, and the other to retain the five pins associated with the lower 90-column zone. All of the latching slides are normally held in their right-hand positions through the medium of spring combs 150, half of which bear against projections at the forward (left-hand as seen in Fig. 4) end of the slides, and the other half of which lie in notches at the rearward (right-hand) end of the slides. The latching slides are moved to the left against the pressure of the spring combs by the action of the extrusions 148 on the pins 147, with cam faces 151 in the cutout portions of the slides. When a pin has passed above the cam 151 the slide is returned to its normal right-hand position by the spring, and the pin is then held in its raised position. At a predetermined moment in each sensing cycle, a restoring bail 152 is pressed against the right-hand projections of all the slides returning them to the left against their spring tension and thereby releasing all locked pins. The restoring bail 152 is secured to a rock shaft 704, which is rocked by cam 700 (Fig. 6) through the action of arm 701, link 702, and arm 703.

*Sensing operation*

Assuming now that a card lies in the sensing chamber, and that the clutch 135 has been operated, the shaft 127 will commence to rotate. As the shaft rotates, the sensing head is first lowered slightly and then moved upwardly under control of eccentrics 129 until the sensing pins are almost in contact with the record card in the sensing chamber directly above them. This operation occurs during the first 90° of the cycle. If at this time the clutch is again tripped, the sensing head rises further, and any sensing pin 118 which finds a hole in the card continues upwardly as the sensing head rises, while any pin which meets an unpunched portion of the card is forced downwardly (relative to the sensing head) against the tension of its spring. Immediately after those pins which find holes in the card pass through the card, the bail 120 is moved toward the left (as viewed in Fig. 4), and moves the locking slides 119 to the left, thus locking those pins which have passed through the card in their uppermost positions. As the sensing head continues to rise the locked pins press against the corresponding record-retaining pins 147 and move them upwardly against the tension of their associated springs, which are compressed between the upper plate 153 of the reading-retaining box and shoulders on the reading-retaining pins.

As the reading-retaining pins move upwardly, the extrusions 148 thereon meet the cam faces 151 in the cutout portions of the cooperating latching slides 149 and force the latching slides to the left. Shortly thereafter the extrusions pass beyond the cams and the slides are returned to the right by the spring combs 150 and lock the elevated pins in their raised positions. Due to the coordination of the cam plate 124 and of the cam which controls the bail 152 for operating the latching slides 149, those slides are moved to the left just prior to the locking of the pins 147 in their uppermost positions. This movement of the bail 152 will release all pins 147 which were locked during the previous cycle and prepare them for re-operation and locking.

Operation of the reading-retaining pins 147 is effective to raise certain rods and close certain contacts within the de-coding mechanisms which lie above them. Since the de-coding mechanisms are described in detail hereinafter, description of this action will be deferred.

*Means for equalizing the load on the sensing shaft*

The clutch 135 governs the operation of the sensing shaft 127, as described, and in addition, through the medium of gears 157, 158, 159 (Fig. 2) and various other shafts and drives, controls the operation of the total-taking mechanism.

Due to the direct gear connection the load on shaft 127 is thus composed of the composite loads of the total-taking and the sensing mechanisms.

Since this load varies considerably, a cam 154 (Fig. 3) is fastened to the left hand end of shaft 127 in order to distribute the load over the machine cycle. This cam cooperates with a roller 155 which is rotatably mounted on a stud fixed to a pivoted arm 156, the roller being held against the cam by the tension of a spring 128 stretched from a stud in the casting to the end of arm 156.

In Fig. 3 the parts are shown in their normal positions. When the clutch 135 is released, the shaft 127 will be rotated clockwise and a steep rise on cam 154 is presented to the follower roller 155 and energy stored in the spring during this rise tends during the next portion of the revolution at which time a fall is presented to the roller to overcome the load from the total-taking mechanism. When the clutch is again released, a further fall is presented, thus permitting release of energy to aid in overcoming the resistance of the sensing box springs. There is then a short dwell and next a rise in the cam to put a load on the drive substantially equivalent to the energy released by the sensing box springs as the box descends. After this, the cam again lies in normal position as shown. This arrangement in addition to distributing the load on the power source also prevents the clutch which is an overrunning type from overrunning.

In order that there will be no rebound when the clutch 135 is disengaged, a detent member 160 (Fig. 2) is fastened to gear 159. Pivoted to the casting 101 is a detent pawl 161, which is spring-pressed against the periphery of the member 160 and thus falls in behind either one of the two detent teeth and thus prevents shaft 127 and associated shafts, gears and elements from backward rotation.

*Card feeding means (sensing)*

The mechanism for feeding cards into the card chamber, holding them there while sensing is performed, and ejecting them from the chamber after the sensing operation is complete, will now be described. Lying in front of the sensing mechanism is a card magazine 165 (Fig. 4), the bottom of which is formed by a picker plate 166 having a forward table-like projection 167. Projecting from the picker plate a distance substantially equal to the thickness of a record card is a picker knife 168 which serves to move a card from the magazine into line with the feed rolls in a manner shortly to be described.

Extending downwardly from the mid-portion of the picker plate 166 is a lug 169 to which is pivoted a link 170, which extends rearwardly and is pivotally connected to an arm 171 which is secured to the picker shaft 172. The shaft 172 is oscillated through the medium of an arm 173 (Fig. 3) at the left end of the shaft 172. This arm is connected by a link 174 to an arm 175 which carries a roller bearing against a cam 176 on shaft 127 in the manner customary in Powers tabulators. Cam 176 is adapted to oscillate the picker knife under control of shaft 127 and its associated detent plate 160 and clutch 135.

Immediately to the rear of the card magazine and with their contact line aligned with the card throat is a pair of feed rollers 180 and 181 (Figs. 4 and 8). These feed rollers are mounted on shafts 182 and 183 (Fig. 2), the lower one of which 183, is supported in bearings in the castings 101 and 102 and the upper one of which is supported in pivotally mounted bearings which are adjustable with relation to the lower shaft by the manipulation of screws 177 (Figs. 2 and 3). Shaft 183 carries at its outer end a worm wheel 184 which meshes with a worm 185 mounted on the main shaft 109. Shaft 183 (Fig. 8) likewise carries, external to the casting 101, a spur gear 186 which meshes with and drives a similar spur gear 187 on the shaft 182. The feed rollers just described, serve to transport a card which has been ejected from the card magazine (by the picker knife) into the sensing chamber.

At each side margin of the sensing chamber there is a pair of pressure rollers 191 (Fig. 4), held in contact with an associated skid roll 190 by a spring. These pressure rolls are likewise driven from the shaft 109, the two on the right hand side of the machine (Fig. 2) being mounted on stud shafts fastened in the casting 101 and being driven through the medium of worm wheels 192 and 193 and the worm 132, while those on the left hand side are driven from the shaft 109 through the medium of worm 195 (Fig. 2), worm wheel 196, shaft 197, which extends across the machine to the left hand side (Fig. 3), worm wheel 198, worm 199 secured to shaft 200, thence through worm 201, secured to the same shaft, which in turn drives worm wheels 202 and 203.

The above described mechanism serves to transport a card into the card chamber and to position it against a card stop 204 (Fig. 4). When the sensing operation has been completed, the card stop is removed at approximately 325° from the path of the card, under control of a cam (not shown), mounted on shaft 127. This cam is not shown as its operation and construction is well known in the art. When the card stop is removed from the path of the card, the pressure and skid rolls move the card rearwardly out of the sensing chamber and in between two sensing chamber eject rolls 206 and 207, which are mounted on shafts 197 and 208; shaft 197 being driven as described above. Shaft 208 having a spur gear 209 (Fig. 2) thereon which meshes with and is driven by gear 205 on shaft 197.

*Card feeding operation*

From the above, it will be seen that cards to be sensed are stacked and inserted in the magazine 165, being held against picker plate 166 by means of a weight 163 which is placed on top of the stack. When the clutch 135 is energized shaft 127 after being released by detent pawl 140 rotates through 90° and causes the picker plate 166 to move rearward (to the right Fig. 4) a slight amount, and then to move forwardly (to the left) until the picker knife 168 is in a position in which a card may drop behind it, whereupon the blade moves rearwardly again to its normal postion, which is shown in Fig. 4. In this position the card just picked is held just clear of the feed rolls. When the clutch 135 is again energized the shaft 127 moves through an angle of 270° and during this rotation, the picker knife 168 moves rearwardly and the leading edge of the card is forced between the feed rolls 180 and 181 which transport it into the card chamber where it continues to be urged rearwardly due to the pressure and skid rolls 190 and 191 until it comes against the card stop 204, which is at this moment in its lowered position. The card remains against the card stop until the sensing head has been elevated, to operate the reading-retaining mechanism and lowered until the sensing pins are again clear of the card, at which time the card stop is elevated and the card, again urged by the pressure and skid rolls, moves rearwardly between the eject rolls 206 and 207, which carry it into position in the punching chamber, ready for the punching operation.

*Decoding mechanism*

The perforated record card used in this machine is well known in the art as the 90 column or double capacity card. This card is divided into two zones, the upper and lower, each of which includes 45 columns of five rows of sensing holes each. In the code used, each odd digit is represented by a single hole in the card, while each even digit is represented by two holes in the card, one of which is that hole which alone would represent nine and the other of which is that hole which alone would represent the next lower odd digit (i. e., nine and three equals four). Sometimes the uppermost hole in each zone is utilized to designate zero, while at other times, zeros are not punched and the tabulator or other machine with which the card is used is so constructed as to print a zero to the right of a significant numeral when no hole appears in the corresponding column. In the present instance, the latter is true and when there is no hole in the uppermost position of either zone, zeros are automatically registered in the totalizer or, more truly, there is no registration in the totalizer.

As will be obvious from the description, the sensing mechanism, merely determines whether a hole appears in any position of the card and does not serve to translate the card coding into a digital count. It is for the purpose of performing this translation that the decoding mechanisms or units are provided.

The instant machine is adapted to multiply a number of from one to ten denominational orders by another number containing not more than ten denominational orders. There are two decoding units 178 and 179 which are mounted directly above the reading-retaining box 117 and are adjustable transversely of the said box so that the factors to be multiplied may be taken from any field or zone of the card.

Details of one of the two decoding units are shown in Figs. 12 and 13 and the mode of mounting the units is shown in Figs. 4 and 7. The particular unit shown in Figs. 12 and 13 is for the multiplier. The structure of both is the same, the only difference is in the number and type of springs in the "9" contact stacks and the fact that the shorter pins in 179 are of the lowest order, while in 178 the short pins are for the higher order. This difference will be apparent in the wiring diagram (Figs. 44, 45 and 47–50 inclusive).

Each decoding unit comprises a pair of vertical plates 210 which are secured together at the base by a plate 211 and at the top by a pair of rods 212 having shoulders formed thereon for maintaining the plates in parallel relation to form a unitary structure or carriage.

Mounted between the plates 210 and slidable on rods 212 is a box-like frame containing a plurality of contacts and pins. The frame comprises a pair of side members 213 secured together at the base by a perforated plate 214 and a slide plate 215. Securing the members together at the top is a pair of sleeves 216 which are positioned on rods 212. The side members 213 are further secured together by cross bars 217 which are located in set back formation as shown in Fig. 12. Secured to the top and bottom of each cross bar 217 is a stack of contact springs 218. There are five of these stacks in ten vertical rows and each stack is operated by a pin 219. There are five rows of ten pins each. The lower ends of pins 219 are guided in perforated plate 214 and in their intermediate portion by cross bars 220. Each pin is provided with a limiting shoulder 221 and an insulated cap. Each decoding unit is capable of sensing digits from ten columns of either the upper or lower zone of a 90 column card.

With the contact box positioned as shown in Fig. 13, the perforations in the lower zone may be decoded. If it is desired to decode perforations in the upper zone, the contact box is slid over the rails 212 until the box strikes plate 210 in which position the pins 219 will be in line with the sensing pins of the upper zone of the sensing head.

The wiring of these contacts is such that whenever a pin in a position associated with an odd digit is operated, a circuit is completed over a wire associated with that digit and whenever the two pins associated with an even digit are operated, a circuit is completed over a single wire associated with that even digit. As was stated, each horizontal row comprises five contact stacks and is associated with a single column of a zone of the record card. Each vertical row of contact stacks is associated with the same hole or digit code position for the ten record columns.

Referring now to Figs. 4 and 13, which show the appearance of one of the decoding units when viewed from the side, it will be seen that there extends through the unit, near the midpoint of one side thereof, a shaft 222 which is pressed forwardly by spring 223 and has secured to the forward end thereof a knurled knob 105 and at the other end a pinion 224.

Extending across the machine and supported by brackets fixed to the castings 101 and 102 are two rails 225 on which ride guides 226 which are fixed to the outer faces of plates 210 of the decoding unit. Fixed to the rear rail 225 is a rack bar 227, which extends upwardly and meshes with the pinion 224. Fastened to the rear plate 210 of the decoding unit is a segmental rack bar 228 which when the shaft 222 is in its forward position meshes with the pinion 224 and acts as a stop member.

It will be seen from the above that when it is desirable to move the decoding unit from one position to another to align with a field in the card from which a factor is to be sensed, knurled knob 105 is pushed in causing the pinion 224 to disengage from the segmental rack bar 228, after which the wheel is rotated in either direction and the unit, due to cooperation of the pinion 224 with the rack 227, is moved transversely along the rails 225. Upon release or withdrawal of knob 105, the pinion again engages rack bar 228 and the unit is thus locked in position. Also to position the contact stacks over upper or lower zones they are moved either forward or backward.

The contact stacks of each horizontal row are wired together in such a manner that the sensing of the card can be translated into a standard digital code. This wiring of the various contact stacks is shown in the general wiring diagram (Figs. 41–49 inclusive), and will be discussed in detail when an illustrative example of the operation of the machine is considered.

*Plug board*

At the front of the machine and beneath the card magazines (see Figs. 1, 14 and 15) is a small insulated panel board 164 containing a plurality of jacks 188, two rows of which are marked "multiplier" and two rows "multiplicand." Beneath each group of these jacks are a plurality of plugs 189, one of which is designated "multiplicand" and the other "multiplier." In addition, there is a row of jacks designated "half-cent carry" and a single plug located at the right.

All jacks marked "multiplier" and "multiplicand" are connected to various portions of the multiplying circuits in such manner that impulses over the connections determine the product of the two factors.

There are ten jacks 188 in each row, one for each column of the card which lies under either the multiplier or multiplicand decoder unit. Each of the upper rows of jacks in the two groups are connected to their respective decoding units and the plugs 189 are connected to the digit relays or commutators respectively. The lower jacks in the multiplier group are used when there is no data to be sensed from that particular column. When this is the case a plug 189 is inserted in the jack for that particular column, thereby completing a control circuit which will be described hereinafter. The lower row of multiplicand jacks is provided to hold the plugs when not in use.

In applying this method the partial products are first produced, properly placed, and then added to form the final product. Each subproduct is the result of multiplying all digits of the multiplicand by a single digit of the multiplier, and is produced by accumulating the digits of a plurality of partial products in proper registers. The partial-products are, of course, the product of any two of the nine digits of the Arabic system. These partial-products are contained in the machine as conducting segments or commutators and are selected in accordance with the value of the digits of the multiplicand and of a single digit of the multiplier. The partial-products are registered on accumulator wheels selected in accordance with the denominational order of the digital multiplier and with the denominational orders of the multiplicand digits entering into the particular sub-product.

Some of the partial-products have two digits therein and must be registered in two accumulator wheels. In order to assure that this be done, switching means are provided which cause the lower order digit of a partial-product to be registered in an accumulator wheel selected in accordance with the denominational order of the digital multiplier and the higher order digit to be registered in the accumulator wheel of next higher order.

Thus a product of a three digit multiplicand (not the same digit repeated) and a single digit multiplier would be produced by selecting a group of commutators corresponding to the value of the digital multiplier, connecting those commutators of the group which correspond to the values of the digits of the multiplicand to accumulator wheels in accordance with the denominational order of the digital multiplier and the denominational orders of the digits of the multiplicand (in this case connecting one of the three commutators to the units order accumulator wheel, one to the tens and one to the hundreds), driving the connected accumulator wheels the extent recorded on the lower order digit portions of the connected commutators, switching the connection to connect each commutator to an accumulator wheel of next higher order than that to which it was previously connected and then driving the connected accumulator wheel the extent recorded on the higher order digit portion of the connected commutator.

It will be seen that multiplication by a second multiplier digit requires simply maintenance of the connections to the same registers as at the completion of the first sub-product, during which maintenance the lower order digits of the partial-product of the second sub-product are registered, and then switching of the connections again and registering of the highest order digits of the partial-products.

Exact details of the electrical connections will be discussed when an illustrative example is considered; description of the mechanical devices involved follows:

Commutators and driving means therefor

The partial-product devices are in the form of electrical commutators, the positions of the conducting segments thereon, with respect to fixed brushes, determining the length of time during which a then associated accumulator wheel shall be driven by a synchronized drive shaft. There are eighty-one of these commutators, each of which represents the product of a digit by one of the nine digits, the entire eighty-one thus representing the complete multiplication table. These commutators are arranged in nine groups each containing nine commutator segments, all commutators being mounted on a common shaft 230 (see Figs. 2, 9, 18 and 19).

Each group of nine commutators is electrically insulated from each other group while all commutators of a group are electrically connected by virtue of mechanical construction. Referring now to Figs. 18 and 19, which show respectively a longitudinal and a transverse section (along line 19—19 of Fig. 18) of a commutator group it will be seen that each commutator group comprises three insulated discs 231 having squared center holes and mounted in spaced relation for rotation with the shaft 230. Each insulated disc 231 has riveted thereto a pair of conducting members or commutator segments 232 of generally disc-like form, these members having square center holes that are larger than those in the disc 231 so that they do not make contact with the shaft 230.

Pinned to the shaft 230 at one end thereof is a collar 233. When assembling the commutators on the shaft, an insulating washer 234 is placed against the collar 233, then a disc with its associated plates is placed on the shaft, followed by a spacing sleeve 235 of conducting material which is, however, insulated from the shaft by an internal wrapping 236 of insulating material. The next disc assembly is then placed on the shaft, then another spacer, then a third disc assembly followed by a third spacer and by another insulating washer 234. Subsequent groups of commutators similarly arranged are mounted on the shaft and a nut on the other end is tightened to hold the complete commutator assembly in fixed position on the shaft.

There are two types of conducting members 232, one type (that mounted on the left of the insulating member in Fig. 18) being a single commutator segment comprising a metallic disc having a projecting sector 237 integral therewith; the other type being in reality two commutators, comprising two concentric rings joined by a sector shaped lug and having an additional sector shaped lug projecting radially from the circumference of the outer ring (see Fig. 22).

Fig. 22 shows the various commutators used in the invention, in elevation; the elevations are alternately right and left-hand ones, thereby showing both faces of each commutator so that the shape of the various conducting segments and their relation to each other may be clear. The direction of the rotation of the various commutators is indicated thereon and each face comprising a full commutator has been bracketed and designated 1a, 1b and 1c; 2a, 2b and 2c, etc. The 1a, 1b and 1c commutators have numbers thereon, in parenthesis, which correspond to the digits, the multiplication of which will give the partial product controlled by that particular commutator. Only the first three groups have been so designated as the remainder are the same with the exception that the "two" group are designated 2×1, 2×2 and 2×3 and the "three" group are designated 3×1, 3×2, etc.

Current is supplied to each commutator group through a brush bearing on the central portion of the conducting member of the first commutator of the group and is transmitted through the rivets and sleeves to all commutators of the group. Additional brushes cooperate with all the radial projections, such as 237, to extend the circuit over conductors (then closed at other points) to the various accumulator driving means.

Each commutator represents both digits of a product, either half representing one of the digits. Since the decimal system is used, each commutator lug is restricted to one-tenth of 180° and, since there is a means for switching connections from one accumulator to another, as the lower and then the higher denominational order of the product is read, time must be provided for this operation. Thus, each commutator lug is restricted to one-eleventh of 180°. Actually, in order that no undesirable circuits be set up due to brushes lying on two segments at the same time, these lugs or sectors are made 12° each, thus providing approximately 4° between sectors.

The commutators control the operation of certain clutches and thus determine when the accumulators shall be engaged with their driving means. An additional control commutator, not yet described, serves to disengage all clutches at once.

The commutator shaft 230 is supported in bearings in bracket 229 (Fig. 9) secured to side frame 102 and brackets 229 and 238 secured to frame 101 near the rear thereof. Extending between the brackets 229 is a bar 261 to which is fixed near each end, a bracket between which extends another bar 253 (see Figs. 5 and 9). The commutator brushes are mounted in groups and each group is fastened to the bar 253 in such manner that some brushes of each group lie against one side of an insulating disc and others lie against the opposite side. The brushes lying on each side of the disc (usually 2) lie with their tips or contact portions on the same side of a vertical diameter of the discs.

On the shaft 230 is a clutch 240 (see Figs. 2, 9, 20 and 21) which is of the same type as the main sensing shaft clutch 135 already described. Also on shaft 230 (Fig. 5) is a detent disc 239 which operates with a spring urged detent arm 249 to prevent reverse rotation of shaft 230 and associated parts. The arm 249 is controlled by a magnet 263. The driving element of the clutch 240 (Figs. 2 and 9) is a pulley 241 which is connected by a belt 242 to a pulley 243 on a stub shaft 244, The stub shaft 244 (Fig. 2) is carried in a bracket 245 pivotally mounted on a stub shaft 246 journaled in the frame 101. The bracket 245 is provided with an arcuate slot through which a bolt, secured in the casting 101, extends. Thus, the tension on belt 242 may be regulated.

Fixed to the shaft 244 is a gear 247 (Fig. 9) which meshes with a gear 248 on the stub shaft 246. Also on shaft 246 is a worm wheel 251 which meshes with and is driven by a worm 252 on the main shaft 109. It will be obvious that the rotation of the main shaft is transmitted to the driving element of the clutch 240 by means of this train of gearing.

*Connections between the commutator shaft and accumulator driving gears*

It is necessary that the commutator shaft and the various accumulator driving gears rotate fixed amounts in respect to each other in order that the various clutches connect and disconnect the accumulators with the proper intervals between operations.

In order to insure proper synchronization, the accumulator drive shaft 250 is connected by a gear train to the commutator shaft 230. Mounted in an upward extension of brackets 229 is a squared idler shaft 254 (Figs. 2, 5 and 9). Slidably mounted on this shaft is a gear 255. Fastened to the shaft at its right-hand end (left as viewed in Fig. 9) is another gear 256 which meshes with a gear 257 fixed on the commutator shaft 230. The angular position of gear 257 with respect to the shaft 230 may be adjusted, since the gear is not fixed directly to the shaft, but is instead coupled to a toothed disc 258 which is fixed to the shaft and with which cooperates a toothed sector 259 fixed to the gear. The hub of the disc 258 is threaded and the gear held against the disc by a nut on the threaded hub.

Due to the fact that it is desirable to record the products in any field of the card at the will of the operator, the various accumulating mechanisms, recording mechanisms, and accumulator control mechanism are carried on a framework or carriage 110 which is adjustable transversely of the machine.

This carriage is formed of two side frames 264 and 265 (see Figs. 2, 3, 5, 7, 10 and 11) between which are mounted the accumulator shaft 266, the total sectors 267, and associated racks 268 and the solenoids for operatively clutching selected accumulators to the drive shaft 250. The side frames are secured together by a plurality of cross rods and bars to form a rigid structure. Secured to the lower front and rear edges of the side frames 264 and 265 are shoes 271 and 272 formed as shown in Fig. 5. These shoes rest and slide on rails 273 which are secured to the side frame members 101 and 102. Formed integral with the shoe 271 is a bearing for a stub shaft 274 having a worm wheel 275 and a gear 276 secured thereto. Running transversely of the carriage is a shaft 270 (Fig. 7) having a worm 277 secured to the center thereof and a hand wheel 107 secured to the right-hand end. The worm 277 meshes with worm wheel 275 and the gear 276 meshes with a rack bar 278 secured between the frames 101 and 102. Rotation of hand wheel 107 causes the gear 276 to roll along rack 278 thereby shifting the carriage transversely of the machine. An indicator which is not shown may be provided so that the operator may determine the location of the carriage over the punch gags.

Rotatably mounted in the carriage near the rear thereof is a detent bail shaft 280 (Fig. 5) carrying a gear 281 which meshes with the gear 255 at all times. The gear 255 being provided with a grooved hub in which is a forked member 282 fastened to the carriage for transverse movement therewith (see Fig. 5).

Rotatably mounted in the carriage is the squared accumulator drive shaft 250 which carries a plurality of clutch elements, detent wheels and accumulator driving gears. This shaft is driven by shaft 280 (Fig. 9) through the medium of gears 283 and 284 fixed respectively to one end of the two shafts. Gear 283 is angularly adjustable with respect to shaft 250 in the same manner as gear 257 is with respect to shaft 230.

The shaft 250 is squared and has mounted on it a plurality of clutch members 285 (Figs. 9, 23, 24, 25 and 33) having sleeve-like hubs 286. The clutch members are formed as shown (Fig. 33) having ratchet teeth cut in the faces thereof. Mounted on the hub of each of the clutch members 285 is a detent wheel 287 which also has a sleevelike hub 288 which slides over and coincides with the hub 286. Mounted on the hub of each detent wheel is an accumulator driving gear 289 which is secured to the detent wheel 287 for rotation therewith. Likewise mounted on the hub 288 of each wheel 287 is a clutch member 290, the periphery of which contains a groove 291 to receive a forked operating member 292. The clutch member 290 is slidable longitudinally of the hub 288 of the detent wheel 287, but is caused to rotate therewith due to cooperation of lugs 293 (Fig. 33) projecting internally from the clutch member 290 and cooperating with slots 294 in the sleevelike hub.

Each forked-operating member 292 (Fig. 23) is pivoted at a point 295 on an L-shaped arm 296 which is secured to and extends downwardly and forwardly from a bar 297 secured between the frame members 264 and 265 of the carriage.

Each arm 296 also supports a clutch operating magnet 298 and a compression spring 299 which holds the operating member 292 in its normal or unoperated position.

There are two sets of magnets 298 (Fig. 5) one set being mounted on bar 279 and the other on bar 297. This is done to permit the magnets to be mounted in staggered relation so that their armatures and associated fork members 292 may be in line with the clutch members 290.

It will be seen from the above that if a magnet 298 be operated it will rock forked member 292 about its pivot 295 and cause a clutch member 290 to engage with its companion member 285. As soon as the teeth of the two members engage the detent wheel 287 and gear 289 will be rotated and the accumulator advanced with results to be described hereinafter.

Cooperating with each detent wheel 287 (Figs. 24 and 25) is a detent roller 300, which is mounted on one arm of a three-armed lever 301 pivoted on a rod 302 extending across the carriage. It is understood that each gear 289 has its individual detent wheel 287. Roller 300 is held against its cooperating detent wheel by virtue of a spring 303 stretched between the lower arm of the lever 301 and the carriage frame (see Fig. 5). This spring tension is sufficient to hold the wheel and attached parts in position, but is not sufficient to cause rotation of the wheel.

Due to the fact that all wheels might not stop at the same point when the clutches were disengaged, means for assuring proper operation are provided.

Rotatably mounted on rod 302 (Figs. 24 and 25) adjacent each lever 301 is a bell crank 304. The horizontal arm of the bell crank overlies a stud 305 in the horizontal arm of the lever 301 and a stud in the vertical arm of bell crank 304 is connected to the stud 305 by a spring 306.

When the commutator shaft 230 (Fig. 5) and the associated detent bail shaft 280 are in their normal position, the detent bail 307 which is carried in arms 308 fixed to shaft 280, lies just above the face 309 of the vertical arm of bell crank 304. Whenever, in a commutator shaft cycle, the bail 307 makes contact with the face 309 it, through the bell crank, strong spring, three armed lever and detent roller, forces the wheel 287 rapidly to a position such that the roller 300 lies in the bottom of the notch, this rapid movement serving to disengage the clutch slightly ahead of the normal movement of disengagement. The resilient spring connection 306 between the lever 301 and the bell crank 304 prevents breakage of the parts.

It will be seen from the above that whenever the clutch 240 on the commutator shaft 230 is tripped and that shaft is permitted to rotate, the accumulator driving gear shaft 250 and the detent bail shaft 280 are also rotated. However, the gear ratios are such that the shafts are rotated different amounts, in order that the half commutator representing one of the digits of a product may be effective to cause accumulation of its digits and that there may be time for the necessary switching before the other half commutator is effective.

The gear ratios are best shown by stating the number of teeth on each gear although it is to be understood that it is the ratio and not the actual number which must be maintained.

Gear 257 (Fig. 9) has forty teeth; gear 256 twenty teeth; gear 255 forty teeth; gear 281 forty teeth; gear 284 forty-four teeth; and gear 283 forty teeth.

Each complete rotation of shaft 230 thus causes two and two-tenths revolutions of the accumulator gear driving shaft 250 and two revolutions of the detent bail shaft 280. Each half revolution, therefore, causes one and one-tenth and one revolution, respectively, of the two shafts 250 and 280.

Now, as was stated above, each half commutator is in effect divided into eleven equal parts, one of these parts being provided with a lug to represent a digit, the number of spaces or parts of the lug displaced counter-clockwise from the vertical diameter, when the shaft is at rest, being theoretically equal to the tens complement of the digit represented. There is, of course, no need for a lug to represent zero for this simply means no movement of an accumulator—nor is there any need to represent ten or any multiple thereof for the digits are represented, separately as 0 and 1 or 2, etc., as the case may be.

Theoretically, then, a half commutator representing 9 would be provided with a lug one space from the vertical diameter or one space from the brushes when in normal position; one representing 8, with a lug 2 spaces removed, etc. Actually this is modified; the 9 lugs lying just off the line, the 8 lug one space removed and so on down to the 1 lug which is eight spaces from the brush line.

The modified orientation is made necessary by the construction and arrangement of the parts, particularly the accumulator clutches and accumulator detent wheels.

The accumulator clutch members 285 and 290 (Fig. 23) each have ten teeth. However, when the accumulator drive shaft 250 is at rest and the detent rollers 300 are at the bottom of a tooth space of the detent wheels 287, the clutch tooth points are directly opposite each other, wherefore the accumulator drive gears 289 are not driven until the shaft 250 has gone through one tenth of a revolution.

The clutch magnets 298 are provided with a locking circuit so that once operated a magnet remains operated until a definite point in the cycle. This common locking circuit is under control of a special commutator which is mounted on the commutator shaft 230 and so positioned with respect to its brushes that the locking circuit is broken slightly prior to the time that the commutators have rotated through ten of the eleven spaces. At this time the shaft 280 will have rotated through slightly less than ten-elevenths of a complete turn; shaft 250 will have rotated through slightly less than a complete turn, and, if we will consider the "9" commutator as controlling, the associated gear 289 will have been driven through slightly less than nine-tenths of a complete turn.

Shortly before the locking circuit is broken the detent bail 307 strikes the portion 309 of the vertical arm of the bell crank 304 (see Figs. 24 and 25), thereby adding the force of spring 306 to that of spring 303 to force the detent wheel ahead carrying with it the driven clutch member 290, thus assuring disengagement of the clutch members 285 and 290, without overthrow. The accumulator gear 289 associated with the operated clutch will at the time when the roller reaches the bottom of the tooth space have rotated nine-tenths of a revolution. It will be obvious that if the multiplication commutator, or half commutator, which controlled the clutch was one representing 8, then the associated gear would be rotated eight-tenths of a revolution, etc.

The remaining one-eleventh of a revolution of the commutator shaft is utilized for shifting connections from certain of the clutch magnets to the magnets associated with the next higher order accumulator.

*Switching mechanism*

The actual switching of connections is under control of a stepping switch of a type well known in the telephone art. The particular switch used has twelve contact banks, each of which has fifty-one contact points. The stepping switch 310 is mounted under the rear of the machine (Fig. 9) in a manner to make the contacts readily accessible so that such adjustments as are necessary may be easily made.

The sequence switch 310 (Figs. 16 and 17) comprises two arcuate side members 311 connected at each end by flat strips 312 to form a unitary frame formed as shown. Secured between the side members 311 are twelve arcuate banks of fifty-one contacts 313.

A secondary frame comprising a flat horizontal plate portion 314 with two side arms 315 is adapted to carry a shaft 316 on which are secured twelve arms to each end of which are secured brushes, or wipers, 317, formed as shown, adapted to wipe over the contact banks 313. Also secured to one end of shaft 316 is a ratchet drive wheel 318. Mounted on the horizontal plate 314 is a double wound magnet 320 having an armature 319 pivoted on a rod 321 carried on a bracket secured to the plate 314. The armature is formed with a downwardly extending arm to which is riveted one end of a flat spring member 322. To the other end of the spring is riveted an arcuate driving pawl 323 which cooperates with the ratchet wheel 318. Secured to the arm 315 which is nearest the ratchet wheel is an arm 324 having a spring detent pawl 325 secured thereon and has a lug 326 formed thereon which limits the movement of drive pawl 323 to insure correct cooperation with the drive ratchet.

To permit the mounting of the secondary frame with its associated brushes on the arcuate frame carrying the contact banks, the frame 311 is provided with slots in which the ends of shaft 316 are positioned. Spring pressed hook members 327 are provided for holding the shaft ends in their respective slots. Formed on the rear cross piece 312 is a tapped boss and formed on the plate 314 is a tapped lug. A knurled screw 328 cooperates with both the boss and the lug to secure the secondary frame in position. A lock nut is provided to hold the screw 328 in its connecting position. Secured to the armature 319 is an insulated arm 329 adapted to cooperate with a pair of spring contact arms 330.

When the magnet 320 is energized the armature 319 is rotated in a clockwise direction drawing pawl 323 out of the tooth of wheel 318 in which it is resting and permits it to engage the next tooth. When the magnet 320 is deenergized, the armature 319 is rotated in a counter-clockwise direction by a spring 359, thereby causing pawl 323 to rotate wheel 318 which in turn moves wipers 317 to the next contact 313. It is apparent from the above that the release of the magnet, not its operation, causes the brushes to be moved. The contacts 330 are opened when the armature is operated, thereby opening the operating circuit and causing the switch to step.

The stepping switch 310 has twelve banks of contacts, ten of which, 310C to 310L, inclusive, are used as circuit routing switches to connect the various clutch magnets with the correct multiplicand contact stacks. The bank 310B, called the multiplier contact bank, is employed to successively select the multiplier digits in denominational order for multiplication with the multiplicand. The bank 310A, called the control contact bank, is employed to control the progressive operation of the entire stepping switch.

Figure 42:
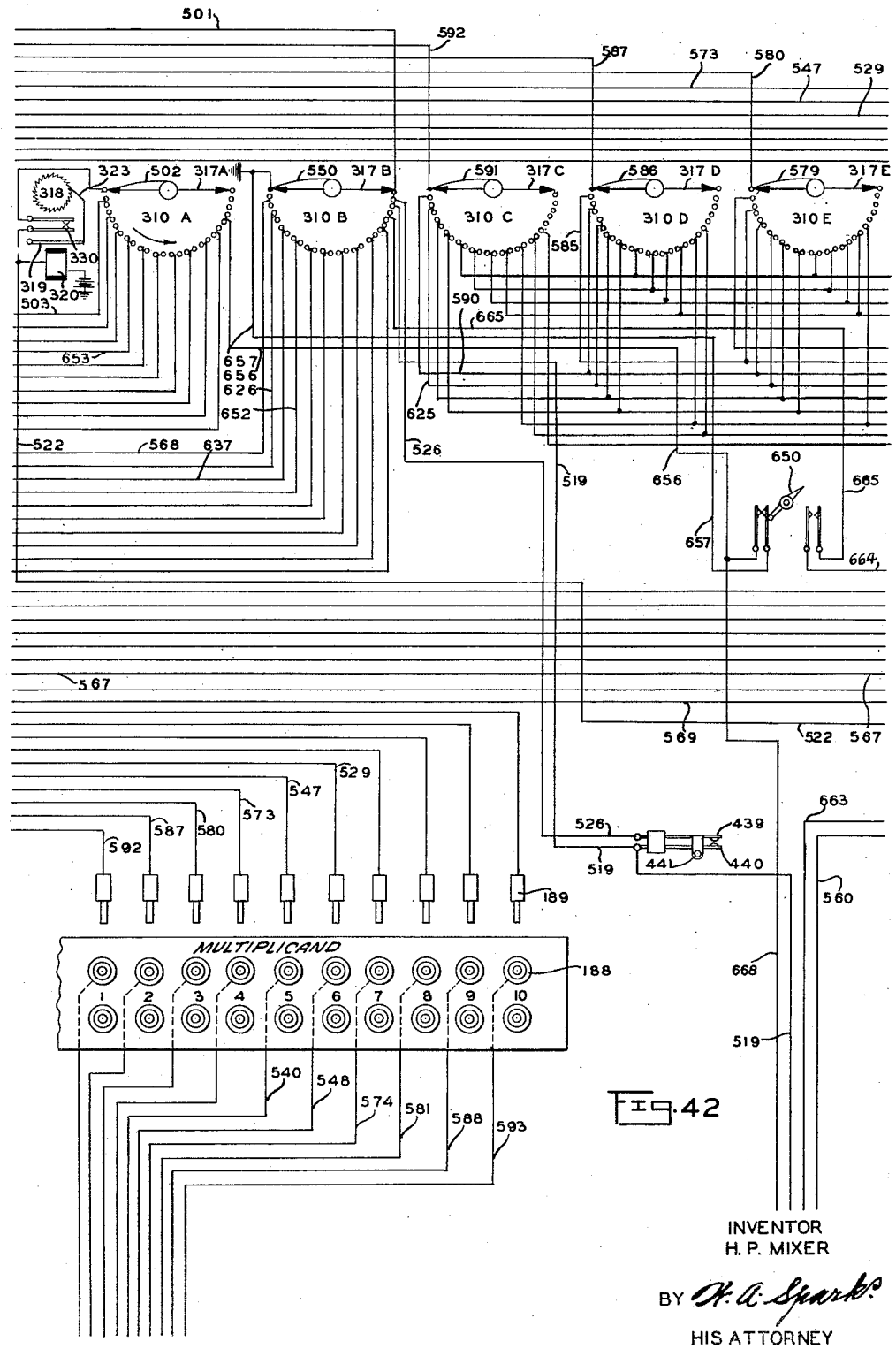
Figure 43:
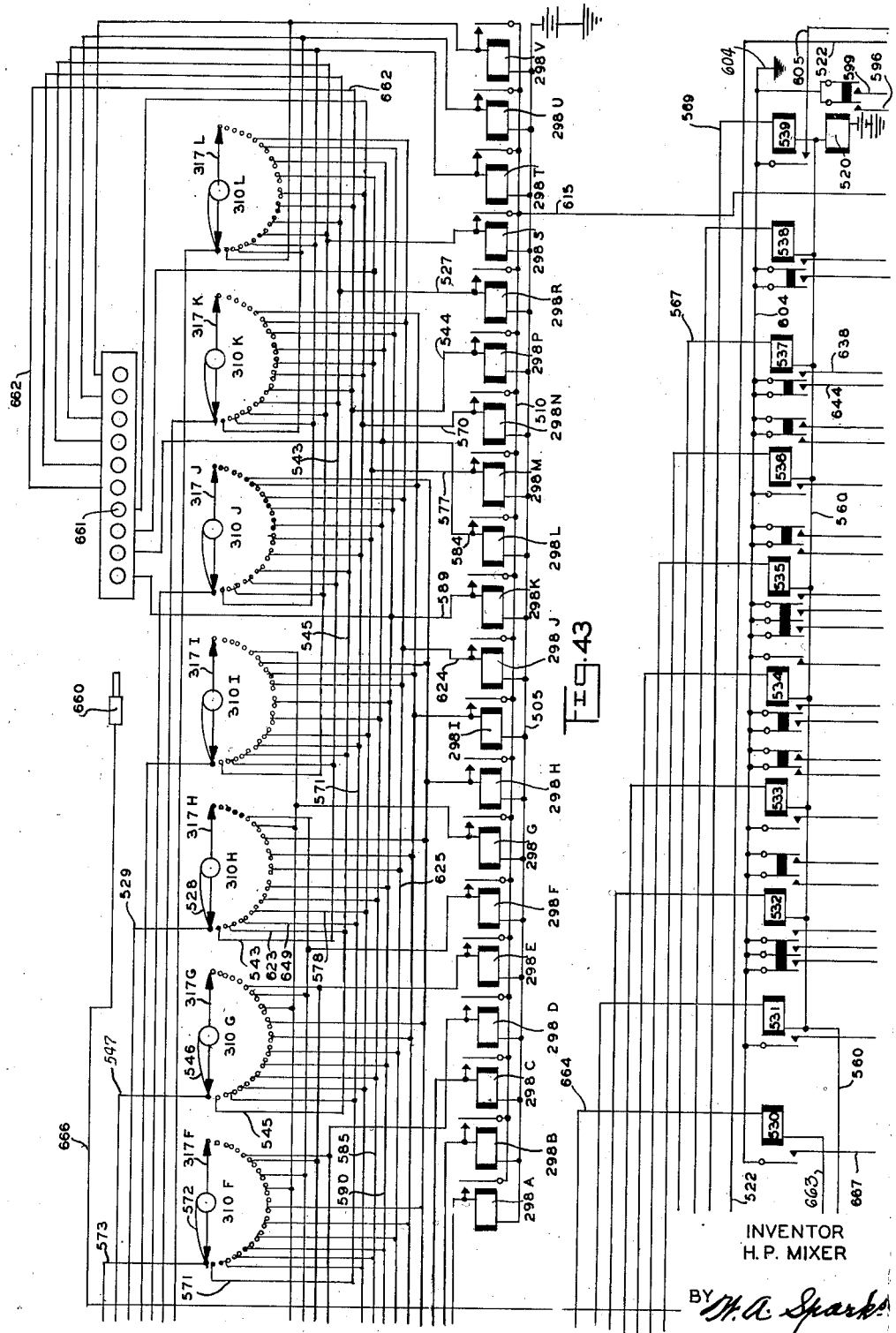
Figure 44:
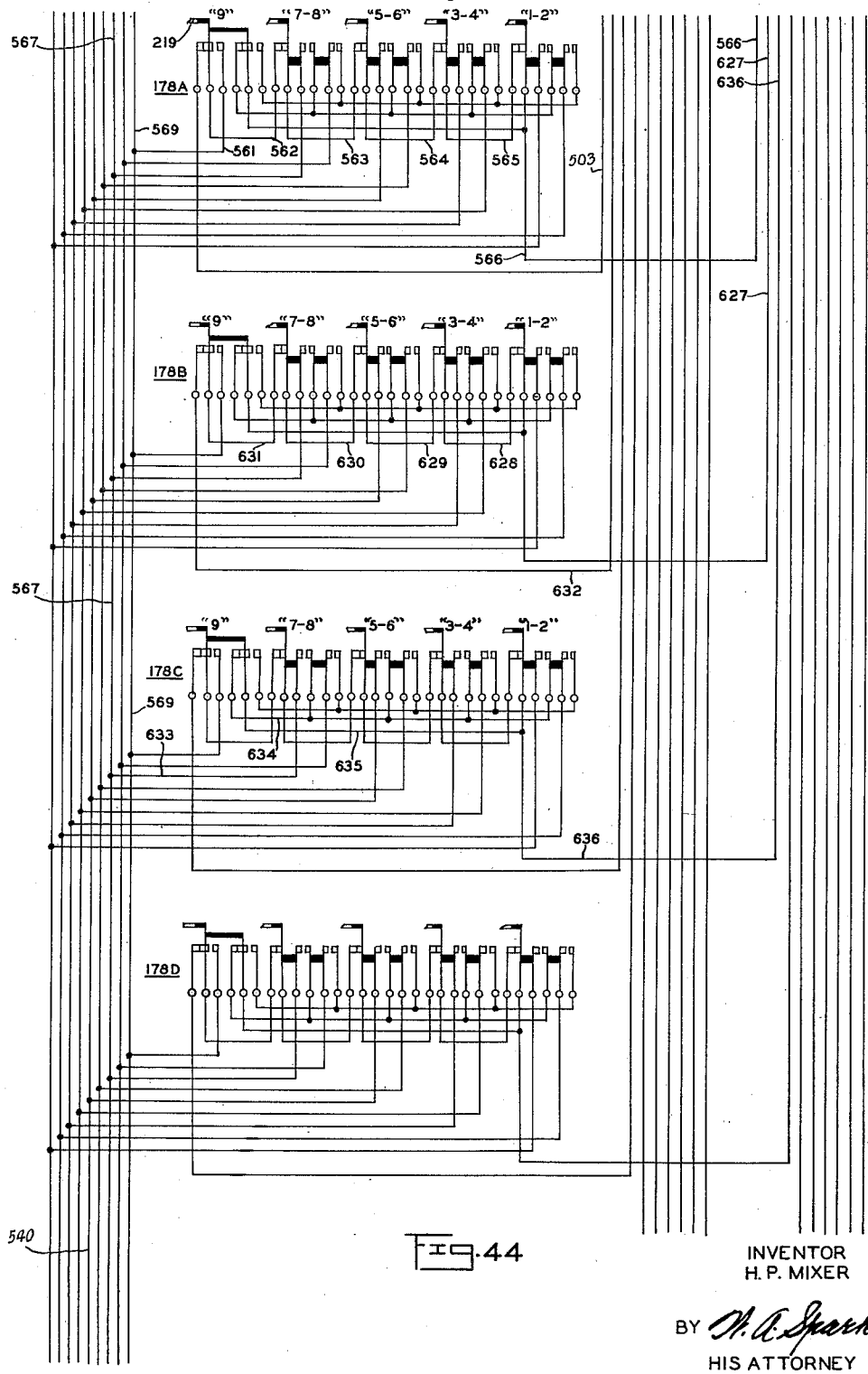
Figure 45:
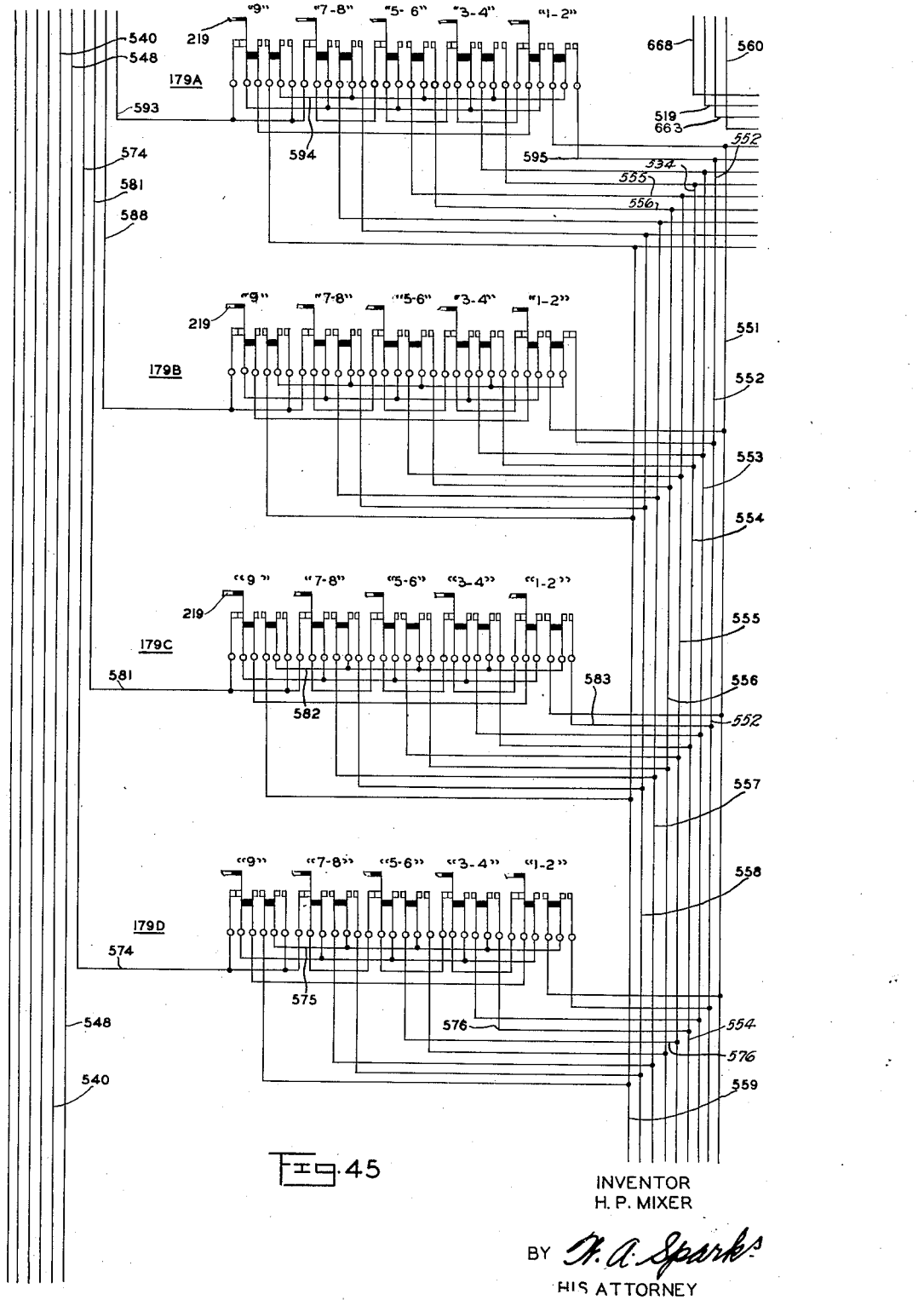

In Figs. 42 and 43 of the wiring diagram, the sequence switch is shown as a half circle. The circuits for operating the magnet 320 are completed through control commutators in a manner brought out in the description of the circuits used in a typical problem. The switches in the wiring diagram are shown with only twenty-six contacts 313 instead of fifty-two. This is done to simplify the diagram as the wipers 317 only pass over half the contacts of the switch during one complete cycle of the machine. The fifty-second contact is omitted to prevent both sets of wipers from wiping a contact at the same time.

Relays and mounting thereof

Interposed in the circuits between the decoding units and the commutators is a group of relays. These relays are of common telephone type and operate under control of the section of the decoding unit selected to sense the multiplier.

As may be seen by reference to Fig. 3, the relays just mentioned are mounted on the inside of a plate 269, which plate is fastened to the casting 102 near the rear thereof. The plate 269 is formed with apertures adjacent each relay so that the relay contacts may be readily adjusted without removing the plate; the contacts are plainly visible in Fig. 3.

These relays are shown in the wiring diagram of Figs. 41–50, and their function will be made clear when an illustrative example is considered.

Accumulating mechanism

The type of accumulator used in this machine is commonly known as the crawl carry, as distinguished from the snap carry type of mechanism in which transfer of tens occurs subsequent to the accumulation. In the crawl carry type, the transfer of tens is continuous, and is ordinarily caused by some form of step-down gearing. A common example of the crawl carry is that shown in Gardner Patent No. 1,828,180.

In the mechanism of the patent the transfer is effected through the medium of an eccentrically mounted gear and in taking totals from this mechanism it is necessary that the wheel of the lowest denominational order be positioned against its zero stop before the wheel of the next higher denominational order is released.

In the form of crawl carry totalizer shown in this application, the carry is through the medium of a train of planetary spur gears and as a consequence the various accumulator wheels may be positioned at the zero stops at substantially the same time.

Moreover, in former crawl carry mechanisms the various wheels were released for return to their zero positions by an independent mechanism, and if a wheel for any reason did not reach its zero position before the next higher order wheel was released, the lower order wheel made practically no further movement after the higher order wheel came against its stop, the result being that one or more of the total positioning members moved less than the correct amount, the total was incorrect and the accumulator was not completely cleared. In the present device various latches cooperate with the accumulator wheels in such manner that normally each wheel is released simultaneously with the release of the latch cooperating with the wheel of next higher order, the wheels thus being released successively and rapidly in fact approaching simultaneous release. The latches then, trip in order and they are delayed only when a nine appears in the accumulator wheel in which case the next higher order wheel is not released until the wheel considered was moved approximately one unit space or to the eight position. This mechanism provides for very nearly simultaneous release of the wheels to zeroize and is a positive means for maintaining the correct relation of the zero stop arm with the stop member on the wheel.

The accumulating mechanism comprises twenty accumulator units, together with certain latches for governing their operation. Each accumulator unit is adapted to be driven by a gear 289 (Fig. 23) which is controlled by one of the clutches 285—290 heretofore mentioned. In addition, there is associated with each accumulator unit a gear sector 267 which, though normally out of mesh, may be brought into mesh with the associated wheel to operate a rack 268 bearing a punch gag.

The present machine is designed to register the product of a ten digit multiplicand and a ten digit multiplier. Consequently, twenty accumulator units are provided. These units are mounted for free rotation on a common shaft 260 (see Figs. 10, 11, 26–31, inclusive) which extends from the carriage side plate 264 to the side plate 265 and is secured therein.

Each accumulator unit (Figs. 27–31, inclusive) comprises the accumulator gear 331, accumulator wheel 332, together with its integral zero stop 333 and a train of planetary gearing including the sun gear 334, planet gears 335, 336, 337 and 338 and the orbit gear 339.

In the accumulator unit for the lowest denominational order the sun gear 334 is fixed, while in each of the other units the sun gear is fastened to the accumulator wheel 332 and orbit gear 339 of the next lower order.

The accumulator gears 331 (Fig. 26) have 36 teeth and mesh with driving gears 289 which have 40 teeth; the exact number of teeth is unimportant, it being necessary only that the ratio of 9 to 10 be maintained.

Fixed to each accumulator gear 331 (Fig. 27) is a stud 341 on which are mounted the gears 335 and 336 which gears are fastened together and rotatably mounted on the stud. Rotatably mounted in and extending through the accumulator gear 331 is a short shaft 342 on one end of which is fixed a gear 337 and on the other a gear 338 which meshes with an annular orbit gear 339 which is secured to the accumulator wheel 332.

The tooth ratios of the various gears 334 through 339 are such that one turn of gear 334 will produce one-tenth of a turn of gear 339. In the present instance, gears 334 and 335 have thirty teeth each; gear 336 sixteen teeth; gear 337 thirty teeth; gear 338, twelve teeth; and gear 339 sixty-four teeth.

As has been explained above when a digit is to be registered in an accumulator wheel, the clutch associated with that accumulator unit is engaged for a period of time proportional to the digit to be registered.

The engagement of a clutch causes the associated accumulator driving gear 289 to be rotated by the drive shaft 250 which is driven from the commutator shaft 230 as has been described above.

Due to the gear ratio set forth above the rotation of an accumulator drive gear 289 causes its associated accumulator gear to be driven one and one-ninth times as far. Thus, if the digit to be registered is assumed to be "9" the accumulator gear 331 will be driven one and one-ninth times nine-tenths, or a complete turn; if "8" then one and one-ninth times eighth-tenths, or eight-ninths of a complete turn; and if "1," then one and one-ninth times one-tenth or one-ninth of a complete turn.

The rotation of the accumulator gear 331 rotates its associated accumulator wheel 332 and its integral zero stop 333 until the stop is properly positioned. The rotation of the accumulator wheel may be considered as the resultant of two separate operations upon it, although actually the two operations occur simultaneously.

One of the component movements of the resultant may be considered as that due to the teeth of planet gear 338 co-acting with teeth of orbit gear 339 to pin the two gears together. Due to this component the accumulator wheel 332 will be driven as many ninths of a turn as is the accumulator gear 331, in an additive direction.

The other component movement of the resultant is that due to the action of the planetary gear train. Thus, if we assume the sun gear 334 of the train to be stationary, which is true of the first, or unit, gear, then, as the accumulator gear 331 rotates, the planetary gear 335 will roll on the sun gear 334 and will rotate the orbit gear 339 in the opposite or subtractive direction. Now the gear ratios are such that the orbit gear 339 and, therefore, the accumulator wheel 332 tend to rotate one-tenth as much as the accumulator gear 331 in the opposite direction.

The resultant and actual motion of the accumulator wheel 332 for any digit is, then, the motion of the accumulator gear 331 minus one-tenth of that amount. Thus, for a digit 9 the accumulator wheel rotates one turn minus one-tenth of a turn or nine-tenths of a turn; for the digit 8, the wheel rotates eight-ninths of a turn minus eight-ninetieths of a turn, or eight-tenths of a turn and for the digit 1 the accumulator wheel rotates one-ninth of a turn, minus one-ninetieth of a turn, or one-tenth of a turn.

From the above, it will be seen that an accumulator wheel during accumulating operations rotates as many tenth of a turn in an additive direction as the digit registered represents.

In addition to movement imparted to it from the associated accumulator gear 331, each accumulator wheel 332 (except that of the lowest denominational order) has imparted to it movement due to the rotation of the sun-gear 334 attached to the accumulator wheel of the next lower denominational order. In this action, the gears 334, 335, 336, 337, 338 and 339 act as ordinary step-down gearing, and serve to rotate each accumulator wheel one-tenth as far in the same direction as the wheel of the next lower order. For example, if the wheel of the lowest or units order were rotated nine-tenths of a turn to register a nine and no digits were inserted in the higher order wheels, then the wheel of the tens order would rotate nine one-hundredths of a turn, that of the thousands order nine one-thousandths, that of the ten-thousands order nine ten-thousandths, etc. The movement of any wheel is, then the sum of the movements imparted to it from its associated accumulator gear and the correct decimals of the movements imparted to all lower order wheels, these decimals being in each case the movement of any wheel divided by ten to that power which represents the degree of removal of the lower order wheel from the next higher order, the movement of which is sought.

To explain the above statement more fully, let us assume that the units, tens and hundreds orders of accumulator gears are rotated nine-tenths, seven-tenths and five-tenths of a turn respectively. Then the hundreds wheel will be rotated five-tenths of a turn plus seven-tenths divided by $(10)^1$ turns plus nine-tenths divided by $(10)^2$ turns or 0.5 turn plus 0.07 turn plus 0.009 turn or .579 turn.

It will thus be obvious that the total rotation of any accumulator wheel 332 is the sum of the rotative movement transmitted to it due to movement of the next lower order accumulator wheel and the movement transmitted to it due to movement of its own accumulator gear.

The stops 333, being integral with the accumulator wheels, move therewith; these stops occupy one-tenth of the periphery of the wheels and, as will be shown later, cooperate with stop arms to govern the positioning of recording members and to release total latches.

*Accumulator zeroizing mechanism*

The present machine utilizes a method of total taking which comprises rotating the accumulator wheels in a reverse direction until the stops 333 (Figs. 5, 10, 11 and 31) thereon strike stop arms 343 located at definite points or until they reach the "zero position." As is customary the accumulator gears are meshed with toothed elements, in this case sectors 267, which are under spring tension such that they tend to rotate the accumulator wheels reversely until the stops come against the stop arms.

In prior crawl type carry accumulators, it was customary to mesh all the accumulator gears with the associated toothed elements while those elements were prevented from moving, and to then release the toothed elements one by one progressively from the lowest to the highest order, the mechanism, governing the timing of the progression, being independent of the stop arms, the interval between successive releases being sufficient for a wheel to travel the maximum amount, namely, from "9" to "0."

The instant mechanism is so constructed that a total arm governs the release of the toothed element associated with the next higher order wheel and release of the total arm associated with that wheel, thus eliminating the independently operated timing mechanism, and speeding up the return of the accumulator wheels to their zero position. Since, in the present device, the creep or crawl is effected through the medium of planetary spur gearing, the position of an accumulator gear is adjusted in accordance with the position of the wheels of lower order after those wheels have reached their true zero position and thus it is not necessary to provide time for each wheel to reach its zero position before releasing the wheel of next higher order. In most instances, the wheels will be released in immediate progression, delay being involved only when a wheel is in the "9" or high order positions. It will be obvious that if all wheels had had nines registered thereon, the higher order wheels would, due to the creep or crawl, stand very near the zero print, and that, when the stop arm was lowered into the path of the stop, it might, and probably would, stop it at its zero point, rather than at its nine point.

In order to eliminate this possibility of error, each zero stop 333 occupies a peripheral space equal to a unit, so that the stop arm 343 cannot drop and release the toothed element associated with the order until the wheel has rotated one-tenth of a turn.

The mechanism for releasing the accumulator wheels in order and for delaying such release when necessary will now be described.

Pivoted on a rod 344 (Figs. 5, 10, 11 and 31) extending between the carriage side plates 264 and 265 are a number of stop arms 343, one for each accumulator unit. These stop arms are formed as bell cranks and each one is provided with a bent-over lug 345 on its substantially horizontal arm and a stud 346 on its vertical arm. Each bent-over lug 345 lies in the same vertical plane as the zero stop 333 on the accumulator wheel of corresponding denominational order so that, when the stop arm 343 is rotated clockwise, the lug 345 lies in the path of the stop 333 on wheel 331 and causes the wheel to stop at its zero position.

Pivoted on the rod 344 (see Fig. 31) adjacent each stop arm 343 is a latch member 347 which serves to hold the sector, or other toothed element against movement and also serves to hold the stop arm 343 of the associated accumulator until against clockwise rotation.

Each latch member 347 is formed as shown in Figs. 26 and 31, it being substantially L-shaped, having a horizontal arm 348 and a vertical leg which has a lug 350 bent to the left from the side thereof and a lug 351 bent to the right from the opposite side. The arm 348 cooperates with a restoring bail 349. The foot 352 of the vertical arm is cam shaped as shown and is adapted to cooperate with a lug formed on the sector locking member 353. The locking member 353 is pivotally mounted on shaft 364 and cooperates with a pin 262 on the sector 267 to hold it from rotation. Lug 350 lies in front of the vertical leg of stop arm 343 so that, when the latch member 347 is in its normal position (as shown in Fig. 26) the stop arm 343 is held against clockwise rotation.

Lug 350 (for all units except that of the lowest order) also extends above the left-hand arm 355 of a U-shaped stop arm locking member 356. The lug 351 is positioned in front of the end of the right-hand arm 357 of member 356. The foot 352, when in normal position lies directly above a lug on sector locking member 353, thereby preventing the release and subsequent operation of the sector 267 by the spring tension applied thereto.

Locking member 356, as shown in Fig. 31, is a U-shaped piece having forwardly extending arms 355 and 357 integral with each side of the U, and having a rearwardly extending lug on one side to which a spring may be attached. The members 356 are pivoted on a rod 354 extending between the side frames (Fig. 31), the rod being so located that, when the locking members are in normal position, the rearward end of the left-hand arm 355 abuts the right-hand lug 351 on holding member 347 of an accumulator unit, while the cam surface on the right-hand arm lies above the stud 346 on the stop arm 343 associated with the accumulator unit of next lower order.

When a total is to be taken the toothed elements, in the present instance the toothed sectors 267, are caused to be meshed with the accumulator gears 331, while being held against rotation (as they go into mesh) by studs 262 thereon positioned in notches in the latches 353.

At this time, the bar or bail 349 is raised by a link and cam arrangement which will be described under the heading "Total control mechanism" and all the holding members 347 are released for clockwise rotation in so far as control by the bail is concerned. The members 343 and 347 are now under control of the U-shaped locking member 356. However, only the lowest order holding member is free to move at this time for it is the only one not blocked by a locking member 356.

When released, the holding member 347 is rotated in a clockwise direction by a spring stretched between a stud 346 and an anchor bar.

Thus, when upon taking a total the bail 349 (Fig. 31) is raised, holding member 347 rotates and the foot 352 thereon moves off the lug on latch 353. Although latch 353 is still held down (due to a spring stretched between a forward extension thereof and an anchor bar) a strong spring tends to rotate the sector clockwise and consequently the stud 262 on the sector 267 cams the latch 353 upwardly and the sector is free to rotate. If the associated accumulator wheel 332 at this time lies in any position other than that representative of "9," the stop arm 343 (which is urged clockwise by a spring stretched between stud 346 and an anchor bar) immediately moves clockwise until the lug 345 thereon rests on the periphery of the accumulator wheel 332. If, however, the wheel should be in the "9" position, the lug strikes the stop 333 preventing the complete oscillation of arm 343 until the stop 333 has been moved, or until the wheel reaches its "8" position.

When the stop arm 343 rotates (Figs. 31 and 35) the stud 346 thereon strikes the camming surface on the right-hand arm 357 of locking member 356, causing it to rise and the rearward end of its left-hand arm 355 is removed from the path of the lug 351 on the latching member 347 of the next higher denominational order. This second latching member rotates clockwise and releases the associated stop arm 343 and sector latch 353 of the adjacent higher order. Again, the stop arm moves, immediatetly if the wheel stands at a position other than nine (and after slight delay if at nine position) and, when it moves, sets up a similar train of operation to release the next adjacent higher order wheel and stop arm. This action continues from one accumulator unit to another until all wheels are released.

It will be seen from the above that, if the accumulator wheels of lower denominational orders have therein digits greater than those in the wheels of higher denominational orders, then the wheels of higher orders may reach their zero positions first.

In the older type of crawl and carry mechanism, embodying the eccentric transmission such operation would be fatal, for the higher denominational order wheels once positioned could not be corrected, and, since they would be positioned before the creep from the lower denominational order wheels was taken out, their final reading or positioning would be incorrect.

Due to the planetary spur gear arrangement the present device is operative under conditions such as set forth. If a wheel of higher denominational order reaches its zero position before those of lower denominational orders, then, as the lower order wheels come to their zero positions, they cause readjustment of the accumulator gear and sector of the higher order unit.

If, for example, the units order wheel has in it a digit of greater value than that in the tens order wheel, then, after both have been released, the tens order wheel will reach its zero position first. In moving to its zero position the tens order wheel will permit the sector (or other toothed element) associated therewith to move too far and the sector will be incorrectly positioned.

As the units order wheel continues to move toward its zero position, the sun gear 334 of the tens order unit is carried therewith. As the sun gear rotates it rotates the step down gearing, comprising planetary gears 335, 336, 337 and 338, with it, the gears 334 and 338 both rotating counter-clockwise. Since the orbit gear 339 is prevented from rotating, due to the fact that stop 333 is against the stop arm 343, gear 331 is forced to move clockwise and in so moving forces the sector of the tens order to be readjusted to the proper position.

Let it be assumed, now, that the numbers 80 and 189 are inserted in the accumulator wheels in two successive accumulating operations, giving a total of "269."

After the first accumulating cycle the units order wheel stands at zero, the tens order wheel at "8" (0.8 of a turn), etc.

After the second accumulating cycle the units order wheel stands at "9" (0.9 of a turn), the tens order wheel at "6.9" (0.69 of a turn, since it stood at 0.8 and had added to it 0.8 and 0.09), and the hundreds order wheel at "2.69" (0.269 of a turn—it stood at 0.08 of a turn and had added to it 0.1 turn carry from the tens order plus 0.08 of a turn also carry from the tens order and 0.009 of a turn carry from the units order).

The units, tens and hundreds order wheels thus stand at "9," "6.9" and "2.69," respectively.

If a total is now initiated, or, more exactly, if the bail 349 is raised, the stop arm 343 of the units order will be released for clockwise rotation (see Fig. 31), but, since the stop 333 is in the "9" position, the lug 345 will strike the periphery of the stop and the arm will be prevented from moving. However, bail 349 also released latch 347 and thus caused the release of the sector 267 of the units order.

When the sector has moved through one unit space, the wheel of the units order will also have moved through one unit space and will lie at "8," the tens wheel at "6.8" and the hundreds wheel at "2.68."

Although the wheels 332 of the tens and hundreds order are free to move, the corresponding sectors are held by their latches 353. All of the movements of these wheels is caused by the planetary gearing of the units carry mechanism.

When the units wheel reaches "8," the stop arm 343 associated therewith drops, since stop 333 has passed by. This movement of the units stop arm permits latch 347 to move, camming arm 355 of member 356 out of the path of lug 351 of the tens latch 347, permitting it to rotate clockwise and release the tens order sector. The stop arm of the tens order immediately moves and releases the hundreds order sector. At this time the units order sector will have moved one unit space while other sectors will not have moved.

Assuming, for convenience, that the sectors of the tens and hundreds order are released simultaneously and that this release is at the moment when the units order wheel reaches its "8" position, then it is obvious that the hundreds order wheel will reach its zero position before either the tens or units order wheels.

The movement of the hundreds order wheel toward its zero stop is comprised of movement transmitted from its own sector and gear and movement transmitted from the gears and sectors of lower orders. These movements may be computed since the gear ratios are known, the movement, of course, is in a subtractive direction bringing the stops 333 toward the stop arms 345 rather than away from them as in accumulating cycles.

If, now, we assume that all sectors move at the same speed and consequently the same amount in a given time (this is a probable condition for the springs, the friction, etc., of the various units are substantially equal) then the movement of the sectors, or equivalent toothed elements, may be taken as the same for all and equal to X.

Now X units of movement of a sector causes X units of movement of the corresponding accumulator wheel, $$\frac{X}{10}$$

units of movement of the next higher order wheel and $$\frac{X}{100}$$

units of movement of the second higher order wheel. Then, the units of movement of the wheel of the hundreds order, to bring it to 0, namely, 2.68, equals the movement of its own sector, or $$X \text{ plus } \frac{1}{10}$$

the movement of the tens order sector, or $$\frac{X}{10} \text{ plus } \frac{1}{100}$$

the movement of the units order sector, or $$\frac{X}{100}$$

Then $$\frac{111X}{100} = 2.68$$

Solving this equation, we find that X=2.414. This is the number of units of movement by the sectors to bring the hundreds order wheel to zero. Checking this to ascertain if the hundreds order wheel truly stands at 0 we find that the wheel has moved 2.414 plus 0.2414 plus 0.02414, or 2.680 which, subtracted from 2.68, =0.

Now, the tens order wheel at this time will have moved 2.414+0.2414 or 2.655. Since it stood at 6.8 it now stands at 6.800—2.655 or 4.145.

At this same time the units order wheel will have moved 2.414 and, since it stood at 8.000, will now stand at 8.000—2.414 or 5.586.

Also, at this time the hundreds, tens and units sectors will have moved from their zero positions, respectively 2.414, 2.414 and 3.414 units. It will be remembered that the units wheel moved one unit to clear its stop arm and start the totaling operation.

Now the tens and units order wheels will continue to rotate and after the tens order wheel has rotated through 4.145 unit spaces it will come to rest with its stop against the stop arm. In order that the wheel rotate through 4.145 units the tens and units sectors must move X unit spaces. Now $$X + \frac{X}{10} = 4.145$$

and, therefore, X=3.768.

Again checking, we find that the tens order wheel rotates 3.768+0.3768 or 4.145 units bringing it to zero. The units order wheel will have rotated 3.768 units and will now stand at 5.586—3.768 or 1.818 units from 0.

As the tens order wheel rotated to 0 it rotated the hundreds order sun gear 334 with it (counter-clockwise as seen in Fig. 26) and this tended to rotate the hundreds order orbit gear 339 counter-clockwise. But, the stop 333 being already against the stop arm, the orbit gear could not move counter-clockwise and consequently the accumulator gear 331 was caused to move in the opposite direction (clockwise) one-ninth as many times as the sun gear or 0.0460 turn. Now, each one-ninth of a turn of the gear 331 represents a unit and consequently the gear 331 and associated sector 267 will have moved nine times 0.0460 unit or 0.414 unit.

In order to show clearly that, when an accumulator wheel 332 has reached its zero stop arm, the correction of the associated accumulator gear 331 by the wheel 332 of the next lower order is one-ninth of the movement of the latter wheel, the following explanation is given:

The sun gear 334 will move as many fractions of a turn as does the wheel of the next lower order since the sun gear is fastened to that wheel. Then the pinion 337 of the higher order tends to rotate the orbit gear 339 of that order one-tenth the number of turns of the sun gear. But the orbit gear 339 of the higher order cannot rotate counter-clockwise since the stop thereon is against the stop arm and consequently the accumulator gear 331 of the higher order rotates clockwise one-tenth the number of turns of the wheel of lower order. In so doing the accumulator gear carries the planet gear 335 with it, causing that gear to roll on the adjacent sun gear, and thus tending to move the orbit gear again, this time one one-hundredths the number of turns of the lower order accumulator wheel. Again this results in rotating the higher order accumulator gear clockwise and in rolling the planet gear 335 on the sun gear 334. Now the planet gears 337 and 338 again tend to rotate the orbit gear and to again rotate the accumulator gear, this time, of course, one one-thousandths the number of turns of the sun gear; and this action continues until all have reached normal.

Now the accumulator gear will have moved one-tenth, plus one-hundredths, plus one-thousandth, plus, etc., or will have moved a number of turns represented by the repeating decimal .111***; this repeating decimal equals one-ninth and thus it is seen that the movement of the higher order accumulator gear is one-ninth that of the lower order accumulator wheel.

Now the sector moves with the accumulator gear and, since it stood at 2.414 and has just moved 0.414 toward 0, it now stands at 2.000, which is correct.

At this time, the hundreds and tens wheels are at 0 and the units wheel 1.818 units from 0, also at this time the sectors stand 2, 6.182 (2.414+3.768) and 7.182 (3.414+3.768) units from zero.

The units accumulator wheel is now 9—7.182 or 1.818 units from 0.

To rotate it this amount, its sector must move this amount. In moving 1.818 units the unit wheel is brought against the zero stop. Also the sun gear of the tens order rotates 1.818 units counter-clockwise and tends to rotate the orbit gear of that order counter-clockwise 0.1818 unit. Since this is prevented, due to the stop lying against the stop arm, the gear 331 rotates 0.1818 (.00202 turn) clockwise and thus the sector is moved 0.1818 unit toward 0. Now, the tens sector stood at 6.182 and this minus .1818=6.0 which correctly positions the sector.

The units order sector has moved one unit plus 2.414 units plus 3.768 units plus 1.818 units and is, therefore, positioned at 9, which is correct.

*Total recording mechanism*

As the accumulator wheels are positioned against the zero stops, sectors which have been meshed therewith, are moved as has been described, to positions which indicate the total to be recorded. Sectors 267 (Figs. 5 and 31) are rotatably mounted on a shaft 360 which is, in turn, rotatably mounted in two L-shaped arms 361 which are pivoted at the end of the long leg thereof on a shaft 362 extending between the carriage end plates 264 and 265. Each sector has fastened thereto a gear 365 and disc 366. Lying above each gear 365 and in mesh therewith is a rack bar 268 having a shroud plate 368 which rides on the periphery of disc 366 and prevents the rack teeth from meshing too deeply with the gear teeth. All of these racks 268 are held against their corresponding gears through the medium of a bail 369 which is supported in upward extensions 363 of the arms 361. Pivotally connected to each rack bar 268 at the forward end thereof is a detent bar 370 which serves as a detent member and also as a link between the racks and the punch gag setting members.

Near the forward end of each bar 370 (Fig. 5) is a pin 371 against which lies a lug formed on a lever 372. The levers 372 are pivoted on a rod 373 which is supported in the end plates 264 and 265 and are bifurcated at their lower ends to fit over pins 374 fastened to code bars 375 (Figs. 5 and 6). As will be seen by referring to Figs. 7, 10 and 11, the levers 372 are fanned out to contact the racks 370 at the top and code bars 375 at their bottom. Code bars 375 are slidable longitudinally of the machine and are guided in slots in guide bars 376. Mounted beneath the code bars and supported in the base of the machine is a punching mechanism 380 which is in most respects identical to that used in the well known Powers key punch.

This punching mechanism (Fig. 6) comprises a gag-box containing 45 columns of gags 381, each column comprising five gag members. These gags are supported in two perforated plates in the usual manner and are pressed downwardly due to springs compressed between the upper plate and shoulders on the pins.

Lying directly beneath the gag-box is a punch retaining box which likewise consists of a number of perforated plates in which punches 382 are guided. The punch box contains 45 columns of punches, each column including five punches and an auxiliary punch operating member, which will be described shortly. Lying below the punches, is a die plate 383 which is reciprocated by cam 393 in the usual manner against the punches to perforate holes in desired locations.

Each code bar 375 has in it four notches 391, of which three are equal and one is double the size of the others. Each code bar also carries a downward projection 392. A group of five gags 381 is arranged beneath the code bar of each column in such a manner that four are evenly spaced and the fifth is one unit removed. One of the code bars is shown in its normal position in Fig. 6. It will be seen by referring to this figure, that if the code bar is moved one unit to the left, the projection thereon will lie above the uppermost (right hand as seen in Fig. 6) gag, and at the same time a notch in the code bar will lie above the left hand gag in the column. If moved two units to the left, the projection will still lie above the right hand gag but at the same time, the end of a tooth or projection of the bar will be above the left hand gag. In a similar manner, if the bar is moved three spaces to the left the second gag will be prevented from rising and the left hand gag being under a notch will be free to rise and, if moved four spaces, both the second and the last gag will be prevented from moving. Lying alongside the left hand gag is an auxiliary pin or punch 367. This pin is merely guided in the two upper plates of the punch box and does not extend sufficiently far to act as a punch. It is fastened to the left hand one of the regular punches 382 in such a manner that whenever it is prevented from rising the punch is likewise prevented. Now, it will be seen that punches are held down in accordance with the setting of the code bar; those punches which are so held penetrate the card.

There are twenty code bars 375, one for each accumulator unit, and as stated these bars are guided in cross bars 376, which bars being fastened to the carriage frame members 264 and 265, move with the carriage and can thus be positioned over any twenty adjacent columns of the 45 columns in the gag box. Thus, the product can be punched in any desired twenty columns of the upper field of the card.

At times, particularly when the hereinafter described "significant figure" device is used, it is desirable to prevent certain of the code bars from departing from the zero setting position. For this purpose latch members 384 (Fig. 5) are provided, these latches being manually operable. By pressing down on the forward end of a selected latch, the latch is rotated about a pivot rod 385, thus elevating the notched rearward end of the latch until the notch fits over a pin 386 on the upper end of lever 372 and preventing that lever from rocking clockwise as the cooperating detent bar 370 moves rearwardly (to the right in Fig. 5). It will be obvious from the above description, that, as an accumulator gear 331 with its associated wheel 332 moves toward a zero arm 343, a sector 267 in mesh therewith will rotate on the shaft 360 and drive gear 365 associated therewith. As the gear 365 rotates, the rack bar 268, which is in mesh therewith, moves rearwardly and carries the detent bar 370 rearwardly. The bar 372 being held in contact with pin 371 by a spring 377, follows the movement of detent bar 370 causing the lever 372 to rotate clockwise. The spring 377 is secured between the upper arm of the lever and a spring anchor on the rod 378.

Movement of the gear 365, rack bar 268 and detent bar 370 pivoted thereto is caused by a strong spring 379 (Fig. 5) which extends from the bail 369 forwardly through holes in the bar 387 and is connected to a stud projecting from the detent bar 370 (Fig. 4). It is to be noted, that the bar 387 is slotted, and serves as a guide for the bars 370. Mounted on arms pivoted on a rod 388 which is mounted in arms secured to the top of bar 387 are two box-like members 389 each of which contain ten spring pressed detent pawls 390. Each of these pawls cooperates with teeth cut in the upper edge of the detent bar 370. The rod 388 and the box-like members may be oscillated in order to release the rack bars when desired. The mechanism for timing this release is described hereinafter.

When the lever 372 rotates clockwise, as described, it moves one of the code bars a proportionate amount to position it above the gags of a column in such a manner as to prepare the punch to perforate a card with holes in positions representing that digit of the total accumulated in the corresponding accumulator wheel.

The timing of the movement of the code bars and the punch die plate, as well as the meshing of the sectors with the accumulator wheels, the releasing of the sectors, and the operation of the restoring bail is governed by a cam shaft 395 which is driven in synchronism with the card feeding mechanisms and sensing mechanism described hereinabove. This cam shaft is the primary element of the total control mechanism.

*Mechanism for controlling the zeroizing of accumulators and the recording of totals*

The cam shaft 395 is supported in bearing blocks 396 (Fig. 5) which are mounted on two bars 397 and 398 which extend transversely of the carriage. The cam shaft has mounted thereon near the center thereof a gear 399 (Fig. 34, see also Figs. 5 and 6) which meshes with a gear 401, the squared hub of which fits a square shaft 400 which is mounted in bearings in the castings 101 and 102. Fixed to bar 397 is an arm 402 (Figs. 5 and 6) which is forked at its forward end thereby forming two fingers which are positioned in a groove in the hub of gear 401. The arm 402 is so positioned that gears 399 and 401 are always in mesh. Thus as the carriage is moved laterally from one position to another, the gear 401 is caused to move along the square shaft 400 retaining the two gears in mesh.

Mounted on the left hand end of shaft 400 is a sprocket wheel 403 (Fig. 3). This sprocket wheel is driven through the medium of a chain 404 from a similar sprocket wheel 405 which is mounted on the shaft 406. This shaft is driven from the main sensing shaft 127 by means of gears 157, 158 and 159 (Fig. 2) as has already been described.

Adjustably positioned in a slot in casting 102 (Fig. 3) is a stud which carries an idler wheel 407 by means of which the chain 404 can be adjusted.

Mounted on the cam shaft 395 (Fig. 34) is a plurality of cams which cooperate with cam rollers to control the various mechanisms mentioned above. At each end of the cam shaft 395 is a cam 408 on the surface of which lies a roller 409, supported by a stud extending from a lever 410. Each lever 410 (there being one on each side of the machine) is pivoted on a stud extending from the adjacent side plate of the carriage and extends upwardly and rearwardly to a pivot point on a link 411. Links 411 extend toward the front of the machine and are pivotally connected at their forward ends to plates 412, which plates are rotatably mounted on the sector shaft 360. Plates 412 are generally triangular in shape and support a bail bar 413 between them at their upper rearward ends. It will be seen in Figs. 34 and 52 that when the cams 408 rotate to a position such that the low parts thereof are presented to the rollers 409, the arms 410 move clockwise about their pivot and pull the link 411 rearwardly, thus rotating the plates 412 about the shaft 360 in a clockwise direction thus moving the bar 413 out of the way of the sectors 267 which may then, if not otherwise prevented, rotate in a clockwise direction under urge of the strong springs 379 exerted through the rack bars and gears. In Fig. 52 the parts are shown in their operated position, their normal position being indicated in dot-and-dash lines.

Mounted on the cam shaft 395 at each end thereof but toward the center from the cams 408 is a cam 414. Cooperating with each cam 414 is a cam roller 416 which is rotatably mounted on a stud projecting from a lever 417. Levers 417 are themselves pivoted on a shaft 419 at a point to the rear of the cam shaft. The levers 417 are of a peculiar curved shape and have cam slots formed in their upper horizontal portions in which the sector shaft 360 rides. A strong spring 415 extends forwardly from the lever 417 and urges it for counterclockwise rotation about its pivot. It will be seen that as the cam shaft revolves and a low portion of the cam 414 comes under the roller 416, the lever 417 oscillates counterclockwise to the position in Fig. 52 and 34 and, due to the cam slot therein, causes the sector shaft 360 to be raised so that the sectors will mesh with the accumulator wheels. The sector shaft, of course, does not move directly upward but rather moves in an arc determined by the length of the arms 361.

Lying to the right of gear 399 is a cam 418 with which cooperates a roller 420 mounted on a stud extending from arm 421 pivoted on the shaft 419. Extending upward from the forward end of the arm 421 is a link 422, the curved upper end of which is fastened to the rod 388 on which the box members 389 are mounted. Stretched between a point on the lower portion of link 422 and a spring anchor mounted on the rod 378 is a spring 423 which serves to hold the cam roller against the cam surface, and to lift the box members 389 so that the pawls 390 clear the detent bars 370.

As the cam 418 rotates, the roller 420, which normally lies on a high portion thereof, moves inwardly (Fig. 34) and thus elevates the link 422 and rotates the box members 389 counterclockwise to raise the detent pawls.

Lying adjacent the cam 418 on the right hand side thereof is a cam 428 with which cooperates a roller 424 mounted on an arm 425 similar to the arm 421. Extending upwardly from the lefthand end of the arm 425 is a link 426 which is fastened to the restoring bail 349 which bail is as has been stated supported in arms pivoted on the stop arm shaft 344. When the roller 424 moves upwardly (Fig. 34), as the cam 428 rotates, the link 426 is elevated and moves the bail 349 out of the path of the horizontal arms 348 of the stop arm holding members 343. Subsequently, the bail is moved downwardly under action of the cam and all of the holding members as well as the stop arms controlled thereby are restored to normal position.

Adjacent the gear 399 at the left hand side thereof is a cam 430 which cooperates with a cam roller 431 mounted on an arm 432 shaped similarly to the arms 421 and 425 and is similarly pivoted. Extending upwardly from the forward end of the arm 432 is a link 433 which is pivoted to a lever 434 which is in turn pivoted on the accumulator shaft 260. The lever has a forked portion at its rearward end which cooperates with a stud 435 on the forward extension of one of a pair of arms 436. These arms are fastened to the shaft 302 on which the detent levers 301 are rotatively mounted (see Figs. 24 and 25). The arms 436 are mounted on opposite ends of the shaft 302. Each arm has a rearward extension 437, and between these extensions a bail 438 is supported. This bail lies immediately in back of the downward extensions of the detent levers 301 so that whenever the arm 436 is rotated in a clockwise direction, spring tension on lever 301 is counter-acted removing the detent action and the accumulator wheels are free to rotate.

By referring to Figs. 34 and 52, it will be seen that as the cam shaft 395 revolves, the first operation in the sequence or cycle is the ascent of cam roller 416 and the consequent oscillation of the arm 417 about its pivot point, this in turn causing movement of the cam slot in the upper end of that arm and the elevation of the sectors 267 bringing them into mesh with the accumulator gears 331.

At about the same moment, the cam rollers 420, 424 and 431 have presented to them respectively a low portion, a low portion and a high portion of their respective cams 418, 428 and 430 and consequently the arms 421 and 425 are raised and arm 432 is lowered and serves to release the detent rack 370, the accumulator wheel detents 300 and raise the restoring bail 349.

Shortly after this time the cam rollers 409 have presented to them the low spots of the cams 408 and consequently arms 410 are lowered (Fig. 34) and swing the links 411 and plates 412 about their pivot point on shaft 360 until the bail 413 is below and to the left of shaft 360, thereby removing the bail from the path of the sectors 267 and permitting them to rotate under control of the accumulator wheels.

The cam shaft 395 is driven by the shaft 400, which is in turn driven by the main sensing shaft 127 through gears 133, 157, 158 and 159 as described. Now, as has been explained, the sensing shaft 127 is released to rotate through 90° and then stopped and is subsequently again released to complete a revolution. The cam shaft 395 is thus permitted to perform a complete revolution in two steps during the first of which the releasing actions just described occur. As the revolution of the cam shaft is completed or the second step occurs, the various members are restored to their normal positions, awaiting subsequent accumulating operations.

The release of the main sensing shaft 127 for the final 270° of a revolution may at times be under manual control, but is ordinarily under control of a circuit which is completed through contacts closed by the action of the stop arm of the highest denominational order. The contact arrangement mentioned is shown in detail in Fig. 35. Mounted on the side plate 264 (Fig. 3) of the carriage is a pair of contact springs 439 and 440 which extend forwardly and lie along the side of the zero stop member 343 associated with the unit of highest denominational order. These contacts are normally open but are closed whenever the stop arm is released due to the provision of a stud 441 on the contact 439. Thus when the product is completely set up and the highest order accumulator wheel has been released, a circuit is completed to initiate the second portion of the revolution of the cam shaft which results in restoring all of the parts of the total control mechanism to their normal position.

*Punch control mechanism*

As was stated when the card handling mechanism was described, cards ejected from the sensing chamber are urged rearwardly by a pair of eject rolls 206 and 207 (Fig. 4) and thus fed into the punch chamber. When the card reaches the punch chamber it is urged against the card stop 444 (Fig. 6) by punch feed and skid rolls 445 and 446. The skid rolls 446 are driven through the medium of worms and worm wheels 447, 448, 449 and 450 (Fig. 2) the worms of which are fastened to the main shaft 109. The pressure rolls 445 are spring pressed against the skid rolls 446. When the cards first reach the punching chamber, they are stopped in position to be punched in the upper zone by means of the card stop 444, which is then in its raised position.

As the main shaft 127 rotates, it carries with it the cam shaft 406 through the medium of gears 157, 158 and 159 already described. As the cam shaft rotates, a pair of complementary cams 451 and 452 thereon oscillate a bifurcated lever 453, which has cam rollers 454 and 455 lying on opposite sides of it and cooperating respectively with cams 451 and 452. The lever 453 is fastened on a shaft 456 which extends from casting 101 to casting 102 and lies slightly above and forward of the shaft 406. Toward each side of the machine an arm 457 is fixed to the shaft 456 and extends rearwardly. Each of these arms is connected by a link 458 with a side member of the punch box. Consequently, as the shaft rotates it elevates and depresses the punch box to cause perforation of the card in a manner already described.

At the time when punching has been completed, a cam 459 rotates to such position that a cam roller 461 on an arm 460 is moved outwardly by the cam and in so moving rocks the shaft 443 on which it is mounted, thus rocking an arm 462 in a clockwise direction and lowering the card stop 444. The card being thus released is driven by the pressure and skid rolls 447 and 446 to a position in which its leading edge lies between a pair of punch eject rolls 463 and 464, which rolls are constantly driven by means of the worm 465 and worm wheel 466 and the spur gears 467 and 468 (Fig. 2), the worm 465 being fixed to the main shaft 109. Thus the cards are transported rearwardly and guided in an obvious manner to the receiving magazine 469 where they remain until removed by the operator. It is to be noted that the timing of the machine is such that during the second part of the rotation of the shafts 127 and 406, one card is being sensed while another is being punched, the second release of the main sensing shaft serving to initiate both operations. There is thus provided an overlap which cuts down to a considerable degree, the time required for sensing and punching a card.

In Fig. 37 is shown a modification of the card stop mechanism to permit the punching of 90 column cards in either the upper or lower zones. In this form the actual punch mechanism is the same as described above but the plates 383 have been extended and an extra skid roller 446 and pressure roll 445 have been added. The card stop 444 remains the same but the arm 462 has been extended and a pair of arms 470 are pivoted thereon which are connected by pins 471 to which the card stops 444 and 472 are secured. Secured to the punch box frame is a pair of arms 473 in which is pivoted a shaft 474 on which is secured a pair of T-shaped arms 475 which are adapted to cooperate with either one of the pins 471 to hold them stationary. The tails of the arms 475 are connected to an arm 476 by a link 477. The arms 476 are fastened to a shaft 478 to which in turn is secured an arm 479. This arm is adapted to be rocked by a link 480 which extends to any form of manual two position control lever (not shown) on the back of the machine.

With the arm 475 in the position shown, any upward movement of arm 462 by the cam 459 will cause the card stop 472 to be raised due to the pin 471 of the card stop 444 being held from rocking by the lowered end of arm 475. Should the tail of arm 475 be rocked to the left, any operation of arm 462 will raise the card stop 444. The card stop 444 holds the card in the punch chamber to permit punching of a product in the upper level while card stop 472 permits the card to be fed rearward until the lower zone is under the punches.

Circuits

The foregoing portions of the specification described in detail the mechanical elements of the invention. In the instant portion the interconnection of these mechanical elements, through the medium of electrical circuits, is considered.

In describing the circuits, an illustrative example will be assumed and the circuits utilized in working out that problem will illustrate the general operation of all circuits.

Let it be assumed now that the two factors 202, 456 and 709 are to be multiplied together, these factors being punched respectively in the 57th through the 62nd columns (lower zone) and the 6th to 8th columns (upper zone) of a record card. Fig. 38 illustrates a card punched in the manner set forth above. It is also assumed that the product is to be located in the 20th through the 28th columns of the record card and it is so shown in Fig. 39.

To prepare the machine for computing this problem, the left-hand one of the decoding mechanisms will be moved to a position such that its units column, or first row from the right, of decoding wires 217 lies above the 8th column of the reading retaining pins 147.

The normal procedure would then be to move the right-hand one of the decoding mechanisms to a position such that its unit column, or first row from the right, of sensing pins 219 would lie immediately above the 62nd column. However, this is impossible since the decoding mechanism is ten units wide and, therefore, will strike the left-hand mechanism when the units column of the right-hand mechanism lies in the 64th column.

It will be noted that the decoder contacts shown in Figs. 44, 45 and 47–50, inclusive, are one above the other the top set corresponding to the top stack in the unit and so forth down the diagram. The separate stacks in the left-hand or multiplier unit being designated 178A–178J, inclusive, and the stacks of the right-hand or multiplicand unit being designated 179A–179J, inclusive. The units are positioned with relation to the card as described under "Decoding mechanism" so that the pins 219 controlling stacks 178A, B and C will be positioned over the reading retaining pins for columns 8, 7 and 6, respectively. The stacks 179A, B, C, D, E and F are positioned over columns 57 to 62, respectively, thus making stack F the units stack for the multiplicand. Each of the contact stacks are wired to a jack 188 of the upper level of the plug board, the first stack being wired to the first right-hand jack, the second stack to the second jack from the right, etc. Thus, stacks A in both decoders are connected to jacks 10 in their respective multiplier and multiplicand section of the jack board. The lower level of jacks in the multiplicand are not wired in the circuit, but those in the multiplier section are wired in multiple to the control bank 310A of the stepping switch and to one of the contacts of each stack of contacts. This is done to provide a control circuit which is effective when there are no perforations in the card such as zero or blank columns and also when the decoder unit is positioned over columns containing data not pertinent to the factors of the computation.

The first three plugs from the right in the multiplier section (Fig. 41), when taken in sequence from right to left are inserted in the 10, 9, and 8 jacks, respectively, of the upper level, while the remainder are inserted in the 1–7 jacks of the lower level. In the multiplicand section, the first six plugs in sequence from left to right are inserted in jacks 5, 6, 7, 8, 9, and 10, respectively, of the upper level and the remaining four plugs are inserted in the remaining lower level jacks, not to complete circuits but to prevent short circuits.

The contact stacks in the left-hand decoder unit are now moved to the rear, thereby positioning the pins 219 over the reading retaining pins of the upper zone of the card. The contact stacks of the right-hand unit are moved to the front of unit to position them over the lower zone of the card.

As shown in Fig. 39, the product is to be punched in columns 20 through 28 of the upper zone of the card. Therefore, the hand wheel 107 is operated to move the carriage containing the totalizing and recording mechanism until the indicator thereon shows that the punching will occur in the desired columns. The machine is now ready to sense the factors from the columns as shown in Fig. 38 and to punch the product in the columns shown in Fig. 39. Cards bearing factors in these columns are placed in the magazine and a weight placed on top of them. The bottom card of the stack will have punched therein the factors set forth in Fig. 38.

In order to initiate operation of the machine, the starting button 500 which may be seen in Fig. 2 (as well as in the wiring diagram, Fig. 41) is pressed. This completes a circuit (Fig. 42) from battery through the winding of stepping magnet 320, through the starting button 500, over conductor 501 to the 26th or last contact of bank 310B of the stepping switch 310, through wiper 317 of that bank to ground on the first contact.

The completion of this circuit energizes magnet 320 which attracts its armature to cause the ratchet pawl 323 to slide over a tooth of the ratchet wheel 318. When the button 500 is released, this circuit is broken and the spring 359 restores the magnet armature to its normal position, stepping the ratchet wheel and consequently all the wipers 317 to their second contact points.

Since at this time no card has reached the sensing chamber the sensing mechanism has not been operated, and consequently none of the sensing rods 219 have been raised. Therefore, the circuits to the stepping switch contacts will remain open and ground is supplied to the stepping switch magnet will remain connected thereto and the magnet will continue to step the wipers ahead due to a common form of stepping or vibrating circuit which is as follows:

From battery (Fig. 42) through the winding of stepping magnet 320, thence over the contacts 330 associated with the stepping magnet, first contact of bank 310A, strap 502, wiper 317A, the second contact of the same switch bank, conductor 503, left-hand break contact of "9" pin of stack 178A, conductor 562, break contact of "7–8" pin, conductor 563, break contact of "5–6" pin, conductor 564, break contact of "3–4" pin, conductor 565, break contact of "1–2" pin, conductor 566, upper #10 jack and plug, conductor 568, second contact of bank 310B, wiper 317B, strap 550 to ground on the first contact of bank 310B'. The portion of the circuit through the stack 178A is possible due to the fact that no sensing has taken place and, therefore, no pins 219 have been operated. If the first column had not been in use, the plug on conductor 568 would have been in the lower jack #10 and the circuit would then be traced from conductor 503, conductor 513, #10 jack and plug, conductor 568, and thence to ground as before.

Figure 46:
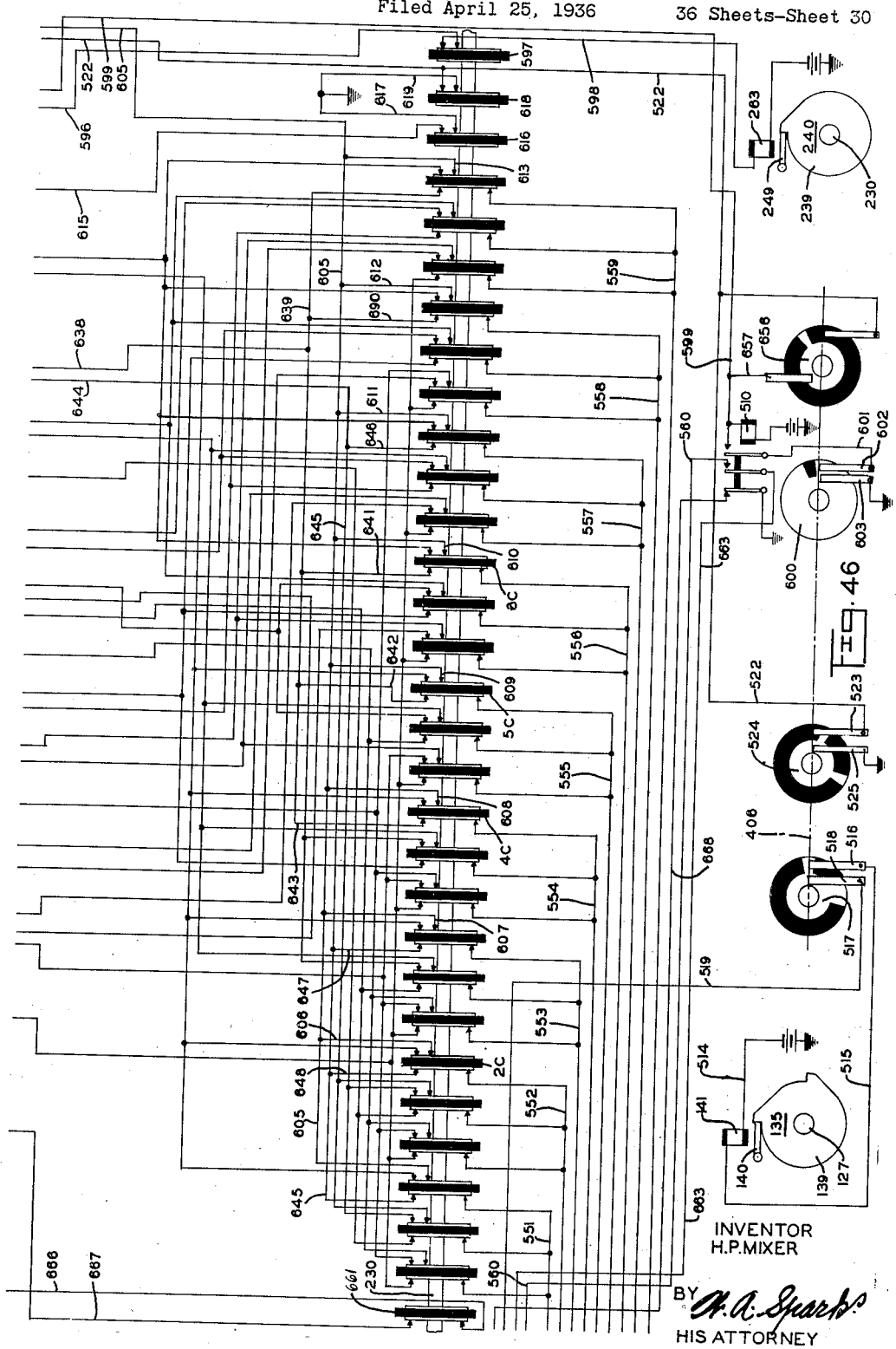
Figure 47:
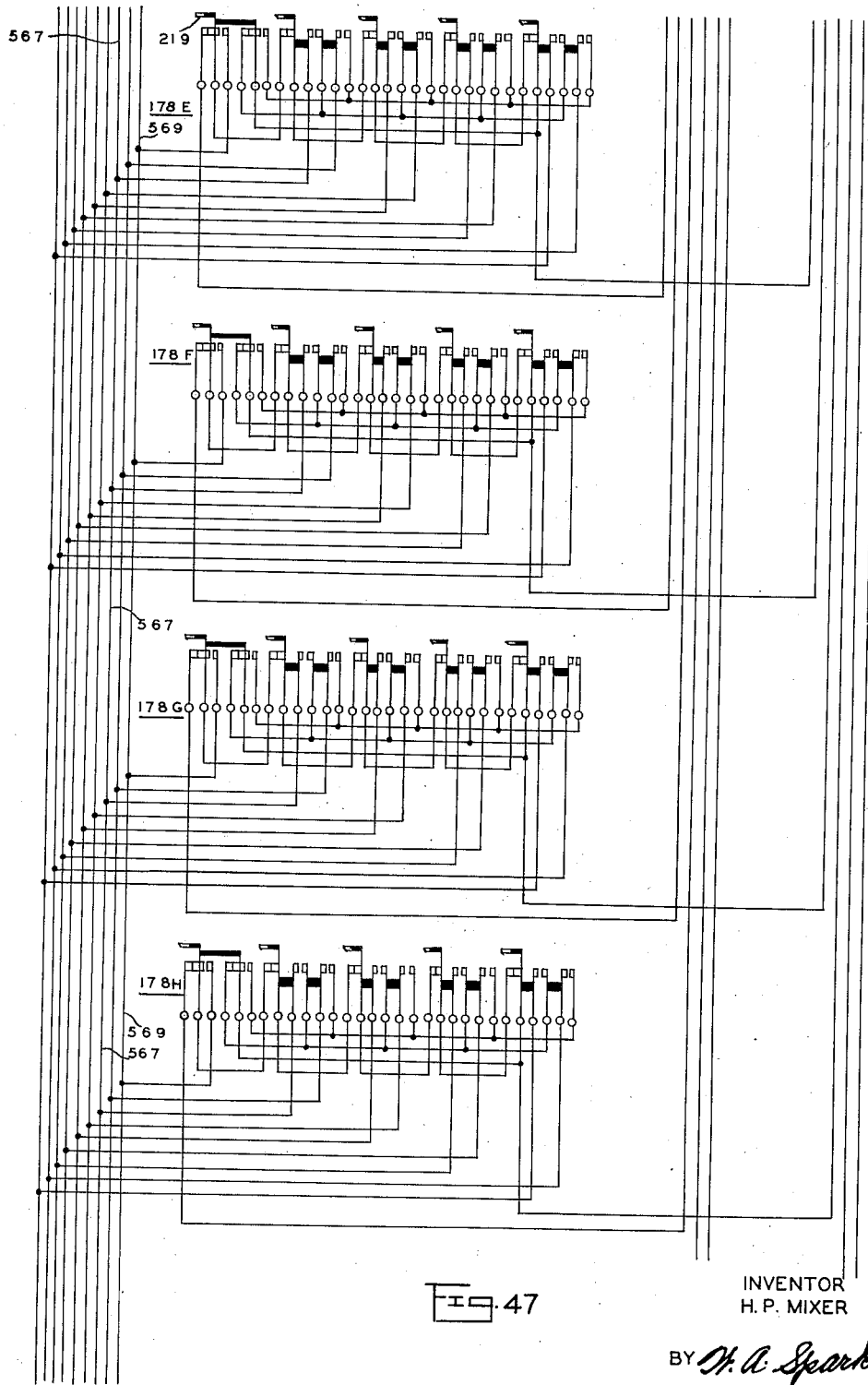
Figure 48:
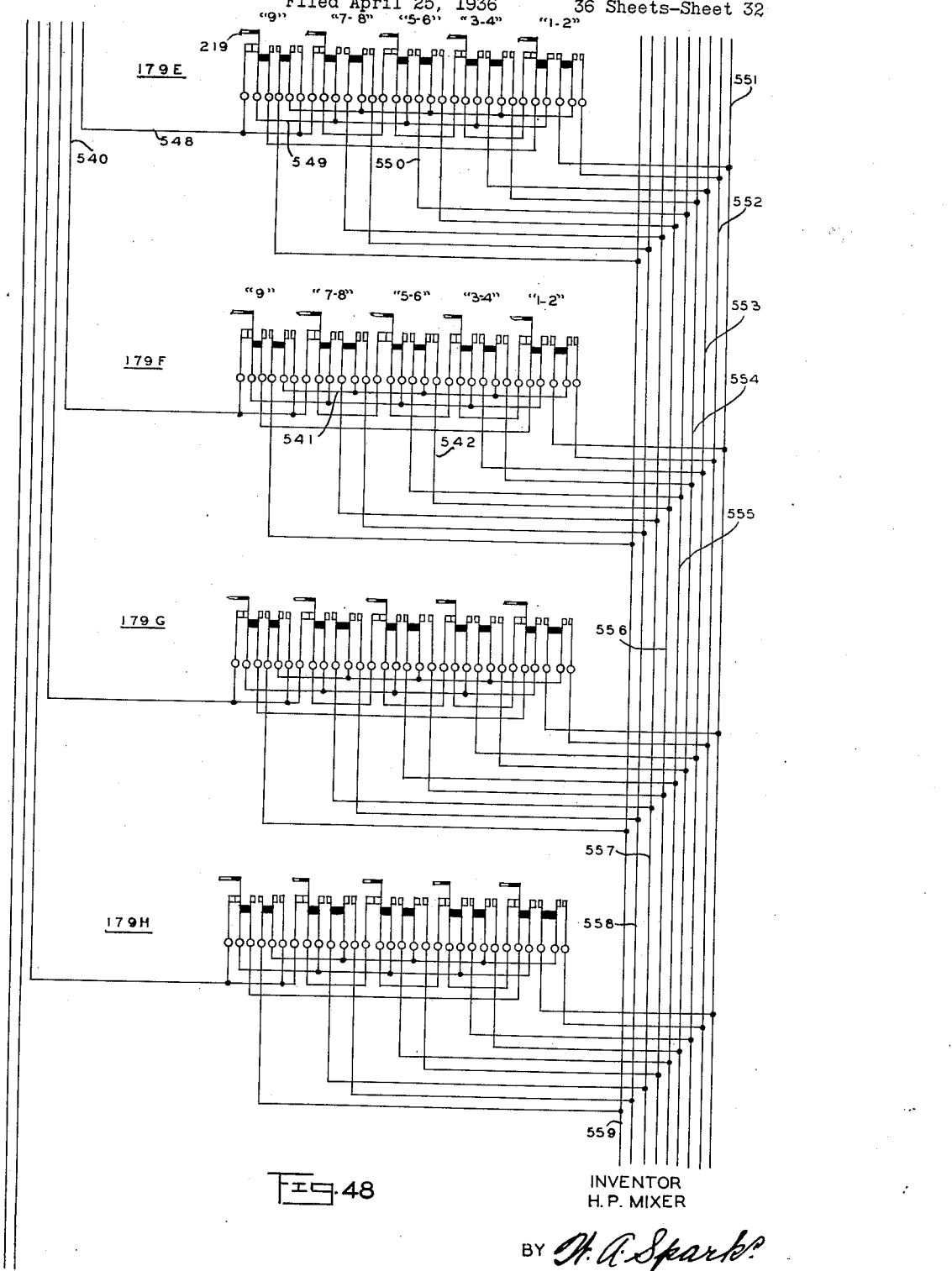
Figure 49:
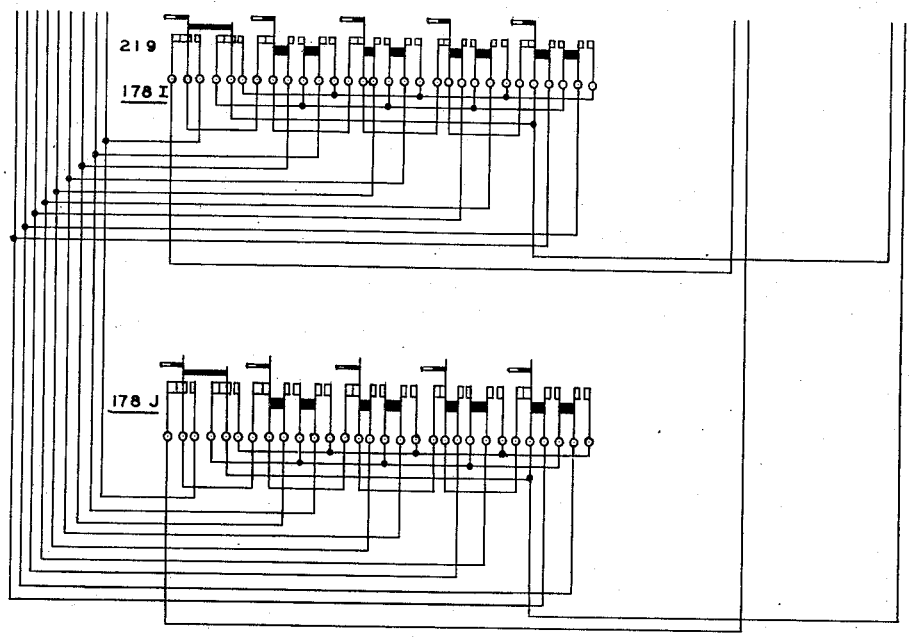

It will be seen that each time the magnet operates it will break this circuit at its own contacts 330, thus stepping the wiper ahead whereupon the circuit will immediately be again completed through the next stepping switch contact and contact stack 178, attracting the armature and breaking the circuit. This continues until the wipers 317 have reached their 24th contacts. At this time, due to the fact that the contacts in bank 310A beyond the 23rd contact, are not included in the strapping, the stepping switch will stop and a circuit will be completed to energize the tripping magnet 141 of the sensing shaft clutch 135 (Figs. 2 and 46). The 20th and 21st contacts lead to the contact stack 218 for the highest and last possible denomination of the multiplier. The 22nd and 23rd contacts are provided for a special operation which will be explained hereinafter. For the purpose of the movements now being described, these contacts are grounded and result in energizing the stepping magnet to carry the brush to the 24th contact, where a circuit is closed for energizing clutch magnet 141 to cause the shaft 127 to rotate 90° of the next card feed and control cycle. This circuit may be traced as follows:

From battery over conductor 514 (Fig. 46), through the winding of tripping magnet 141, thence over conductor 515 to brush 516, which cooperates with a commutator 517 mounted on the shaft 406 (see Fig. 2) which shaft rotates in synchronism with the main sensing shaft 127, thence through the conducting portion of that commutator to a second brush 518 cooperating therewith and over conductor 519 (Figs. 42 and 45) to the 24th contact of switch bank 310B, thence through the wiper 317B of that bank, strap 550, first contact to ground, thereby causing the energization of the tripping magnet 141, thereby withdrawing the tripping lever 140 and the releasing of the main sensing shaft 127 as well as of the commutatior shaft 406. After the shaft 406 has traveled a short distance, an insulating portion of the commutator 517 comes between the brushes 516 and 518 and causes de-energization of magnet 141. The sensing shaft 127 and the mechanism driven thereby moves through 90° of rotation due to the construction of the clutch as previously described.

Just after the breaking of the tripping magnet circuit at commutator 517, a circuit is completed through an additional commutator 524, which is likewise mounted on the shaft 406 (see also Fig. 2). This circuit leads from battery (Fig. 42), through the winding of stepping magnet 320, thence over conductor 522 (Figs. 43 and 46) to brush 523 which bears on commutator 524, through the commutator to brush 525 and to ground. As the shaft rotates an impulse will be sent to the stepping magnet 320 of switch 310, the wipers of which will then move from their 24th to their 25th contacts. This breaks the circuit by which release magnet 141 was energized, so that when the second segment of commutator 517 reaches brush 523 said magnet will not be re-energized, but it prepares a circuit which will be closed later, viz., through the 25th contact, conductor 526, contacts 439 and 440 to conductor 519 and thence to the magnets 141 as described.

The main sensing shaft 127 will come to rest after 90° of rotation, and, as has been previously explained, at this time the picker knife will have moved forwardly but will not have moved a card with it. Also at this time, due to rotation of the cam shaft 395 (Figs. 5 and 34) the various total and punch control mechanisms will have been released and the totalizer wheels freed for rotation to their zero positions, thus insuring that all accumulator units will be normalized at the beginning of each run of cards.

When the wipers are on their 25th contacts, a circuit will be completed, from battery (Fig. 46) over conductor 514, through magnet 141, thence over conductor 515 and the two brushes 516 and 518, the conducting segment of commutator 517 (which has now moved through 90°), over conductor 519, through contacts 439 and 440, which are closed as described hereinbefore by the last zero stop arm 343 (Fig. 35), conductor 526 to the 25th contact of switch bank 310B, thence over the wiper 317B, strap 550 to ground. Completion of this circuit again energizes tripping magnet 141 and releases the main shaft 127 and associated portions of the mechanism for an additional 270° of rotation. As before, since the conducting portion of the commutator 517 is very short, a short impulse is transmitted to magnet 141. Shortly after this impulse has been transmitted, a circuit is completed through commutator 524 (Fig. 46) over conductor 522, which is identical with that previously described, and which serves to momentarily energize stepping magnet 320 so that the wipers thereof are caused to move to their 26th and last contacts.

During the 270° of rotation of the main sensing shaft 127, the picker knife moves toward the front of the machine. The bottom card of the stack in the magazine falls against the edge of the picker knife which then moves rearward and comes to rest with the card in position to be fed between the feed rolls. Also, during this 270° rotation, the accumulator units and the totaling and recording mechanism are restored to their normal positions. After the described rotation the machine comes to rest with the stepping switch wipers lying on their first and 26th contacts, there being no circuits completed at this time.

The starting button 500 is again operated and the circuit completed through the magnet 320 of the stepping switch and over the conductor 501 to ground (Fig. 42) as previously described.

Again, the stepping switch magnet is energized and the wipers moved to their second contacts, and, as described above, the vibrating circuit takes control and the switch wipers move step by step to the 24th contact points where they come to rest. At the time when the switch wiper of the bank 310A reaches its 24th contact, the circuit to the tripping magnet 141 is completed, thus permitting the main sensing shaft 127 to rotate through 90°. Immediately upon the starting of the rotation of the shaft, the circuit to the stepping magnet is made and broken at commutator 524, causing the wipers to step to their 25th contacts. During this 90° of rotation of the shaft 127, the card, which is under control of the picker knife, is moved rearwardly up to the feed rolls 180 and 181 which carry it to the sensing chamber. When the wiper 317A of the switch bank 310A reaches its 25th contact point, a circuit which has already been described is completed through the commutator 517 and the tripping magnet 141 to again energize the tripping magnet to again release shaft 127 for 270° of rotation. During the 270° of rotation, the sensing box is raised and those pins 118 (Fig. 4) which find holes in the card pass through it and operate reading retaining pins 147 which lock in their raised positions and elevate corresponding decoder pins 219, which close contacts in the decoding mechanism. Due to the fact that the circuits to the decoding mechanism pass through contacts 2—21 of the switch banks of switch 310, these circuits are not closed at this time, for it will be remembered that the wipers all lie on their 25th contacts. As discussed below, almost immediately upon release of the shaft 127 for its 270° rotation, a circuit is completed through commutator 524 (Fig. 46) to momentarily energize the stepping magnet 320 and step the switch to its 26th contact. At this time, the machine again stops.

In the second cycle the sensing card stop 204 was opened at about 350° of the cycle, and the first card was fed into the punch chamber by the feed rolls which are continuously running. At the end of the cycle the parts are standing with the second card almost up to the feed rolls (see Fig. 4) the wires 219 set in accordance with the data in the first card and the first card in the punch chamber. The button 500 is again depressed in order to cause a third cycle of the machine after which cycle continuous machine operation under control of the cards will be initiated.

When the starting button is depressed the circuit previously described is completed to energize the stepping magnet and cause all wipers 317 to move to the second contacts of the corresponding contact banks. It will be remembered that the card has been sensed and the various elevated reading retaining pins locked in position holding the sensing wires 217 elevated and closing contacts in the decoding device.

In the description of the decoding device, it will be remembered that there are ten banks of contact stacks and five stacks per bank, each of the stacks corresponding to the index points in ten columns of the upper or lower zone of a 90-column card. Each of the units is, therefore, capable of sensing a multiplication factor of ten digits.

If the two units are positioned over a card such as shown in Fig. 38 and the sensing head raised as described above, the following pins 219 will be raised.

In the multiplier or left-hand unit 178 the first stack 178A will have the "9" pin 219 elevated; in stack 178B no pin will be elevated due to a zero in the multiplier factor. Zeros are not punched in the card. In the stack 178C the "7–8" pin will be raised.

In the multiplicand or right-hand unit 179, the stack 179 F which is over the units column of the factor in the card will have the "9" and "5–6" pins elevated. The tens digit "5" will cause the elevation of pin "5–6" in bank 179E. In the 179D bank the "9" and "3–4" pins are elevated. In the 179C bank the "9" and "1–2" pins are elevated. In the 179B bank no pin will be raised to a zero in the place of the factor, and in bank 179A the "9" and "1–2" pins are elevated.

With the wipers 317 at rest on their second contact points as described, the following circuits will be prepared for completion:

(1) From battery (Fig. 43) to conductor 505 and through the winding of magnet 298R; thence over conductors 527 and 543 to the second contact of contact bank 310H of stepping switch 310; thence through the wiper 317H, strap 528 to the conductor 529; and thence to the 6th from the left or units plug of the "5" jack of the upper level of the multiplicand group to conductor 540 (Figs. 45 and 48); thence, since the "9" and "5–6" pins are elevated, through the outer right make contact of the "9" pin stack 179F to conductor 541, and thence, through the inner right make contact of the "5–6" pin stack to conductors 542 and 556 (Figs. 48, 45 and 46) to the brushes of a commutator group which represents the product six by one of the nine Arabic digits.

Since the commutator shaft 230 is now at rest, this circuit is prepared but not completed and it is set up awaiting rotation of the shaft 230.

(2) From battery through the winding of magnet 298P (Fig. 43), conductors 544 and 545 to the second contact of the switch bank 310G, through the wiper 317G, strap 546, conductor 547 (Figs. 41 and 42) and thence to the plug in the "6" jack of the upper level of the multiplicand section, through that jack, over conductor 548, and through the left-hand break contact of the "9" pin stack designated 179E, conductor 549, and thence through the inner right-hand contacts of the "5–6" pin of stack 179E to conductors 550 and 555 to the brushes of a commutator group representing the products of 5 by the nine Arabic digits.

(3) From battery to conductor 505 (Fig. 43), thence through the winding of magnet 298N, and over conductors 570 and 571 to the second contact point of bank 310F of stepping switch 310, brush 317F, strap 572; thence over conductor 573 to the plug in the "7" jack of the upper level of the multiplicand group, and thence over a conductor 574, through the outer right-hand "9" contact of stack 179D of the decoding unit, conductor 575, outer right-hand contact "3–4" of stack 179D, conductors 576 and 554, thence to the brushes of the group of commutators which represent the products of four and the nine digits.

(4) From battery through conductor 505 (Fig. 43), thence through the winding of magnet 298M and conductors 577 and 578 to the second contact of the bank 310E of the stepping switch 310 (Fig. 42) and thence through the wiper 317E, strap 579, conductor 580 to the plug in the "8" jack of the upper level of the multiplicand group, and thence over conductor 581 through the outer right-hand contacts "9" of the stack 179C (Fig. 45), conductor 582, and thence through the outer right-hand contacts "1–2" of stack 179C to conductors 583 and 552 to the brushes cooperating with the commutator group which represents the products of 2 and the nine digits.

(5) From battery to a conductor 505 and the winding of magnet 298L (Fig. 43) to conductors 584 and 585, second contact point of the bank 310D of the switch 310 (Fig. 42), wiper 317D, strap 586, conductor 587 to the plug in the "9" jack in the upper level of the multiplicand group; conductor 588 to the stack 179B.

This circuit, however, remains incomplete for in this column the digit represented is zero and in order to represent a zero no hole is punched in the card. Consequently, none of the contacts have been operated and, therefore, a circuit is not completed through the commutators.

(6) From battery through the conductor 505, winding of magnet 298K, conductors 589 and 590, the second contact of the switch bank 310C, thence over the wiper 317C of that bank, strap 591, conductor 592 and to the plug in the "10" jack of the multiplicand group, conductor 593 through the outer right-hand "9" contact of the stack 179A, conductor 594, and thence through the outer right-hand "1-2" contact of the stack 179A to conductors 595 and 552 to the brushes of the group of commutators representing the products of the digit 2 by all nine digits.

At the time when the six circuits described above are prepared for operation, in the manner described, there is a circuit which is completed, this circuit being under control of the left-hand decoding unit which has been selected to sense the multiplier. This circuit leads from battery (Fig. 43) through the winding of relay 520, thence over conductor 560, winding of relay 539, over conductors 569 and 561 (Figs. 42, 41 and 44), the left-hand make "9" contacts of the stack 178A, conductor 562, break "7-8" contacts, conductor 563, break "5-6" contacts, conductor 564, break "3-4" contacts, conductor 565, break "1-2" contacts, conductor 566, jack 10 in upper level of the multiplier group of jacks (Fig. 41) into which the plug is assumed to have been inserted and over conductor 568 to the second contact point of the multiplier bank 310B of switch 310 (Fig. 42), and thence through the wiper 317B, strap 550, to ground. Completion of this circuit immediately causes energization of the two relays 520 and 539. The energization of relay 520 closes a circuit from ground through the inner contact and over conductor 596 to a brush associated with a control commutator 597 mounted on the shaft 230. As may be seen by reference to Fig. 22, this commutator lies in such position that the conducting sector is presented to the brushes and consequently this circuit is extended through the other brush to a conductor 598 and thence through the winding of the clutch magnet 263 to battery.

Closure of the outer contact of the relay 520 completes a circuit from ground over conductor 599 through the winding of a control relay 510 to battery. Due to the two last mentioned circuits, tripping magnet 263 and control relay 510 are operated. Operation of magnet 263 releases the commutator shaft clutch plate 239 (see Figs. 20 and 21) for rotation. Relay 510 is held operated over a locking circuit from battery through the winding of the relay innermost contact conductor 601 to a brush 602 of control commutator 600 mounted on the auxiliary shaft 406; through the conducting portion of the commutator to the brush 603 to ground.

Operation of relay 539 connects ground to a plurality of conductors to brushes cooperating with commutators representing the products of nine by the various digits. These circuits from ground are as follows:

From ground (Fig. 43) over conductor 604, thence through the contacts of relay 539 to conductor 605, and thence over the branch conductors 606, 607, 608, 609, 610, 611, 612 and 613 to all commutators representing a product of nine as multiplier and any digit as a multiplicand.

It will be seen that battery has been extended to one set of brushes of groups of commutators having as one factor of the product they represent either two, four, five or six and that ground has been extended to the other brush of the commutators having as a factor of the product, nine, or, in other words, circuits stand prepared for completion by the commutator segments of those commutators 2c, 4c, 5c and 6c (see Fig. 22) designated as (2×9), (4×9), (5×9) and (6×9).

The release of disk 239 operates clutch 240 to cause the commutator shaft 230 to be rotated, and as it rotates commutator 2c designated (2×9) (Fig. 22) will first present a conducting segment to its brushes. As it does so, the circuits described under (4) and (6) above will both be completed from conductor 552 (Fig. 46) through the commutator over conductor 606 to ground. Therefore, the magnets 298K and 298M will be energized and shortly thereafter will cause the corresponding clutch members 285 and 290 to engage and drive the accumulator wheels of the fourth and sixth denominational orders.

When the magnets 298K and 298M operate, they are held in their operated position due to a locking circuit from battery through their windings, make contacts, conductors 510 and 615 (Fig. 43) to a brush on the locking control commutator 616 and thence to a brush of that commutator and over conductor 617 to ground.

The commutator shaft continues to revolve until the commutator 4c designated as (4×9) (Fig. 22) next presents its conducting segment to the brushes. When this occurs the circuit described under (3) above is completed, from conductor 554 through the above commutator over conductor 608, thus causing magnet 298N to operate. The magnet is held operated in the manner described above.

Next, the commutator 5c designated as (5×9) presents its conducting segment to the brushes. When it does so, the circuit described under (2) above is completed from conductor 555 through the commutator over conductor 609, and magnet 298P is energized and locked in its operated position.

The shaft 230 continuing to revolve, the commutator 6c designated as (6×9) presents its conducting segment to the brushes, and the circuit described under (1) above is completed from conductor 556 through the commutator, conductor 610, causing energization and locking of magnet 298R.

No other circuits through the commutators having been prepared for completion, the next occurrence is the de-energization of all the magnets 298K through 298R. This de-energization occurs due to the fact that the locking commutator 616 reaches a position at which the insulating portions thereof come between the brushes, which breaks the circuit from ground over conductor 617. As was explained above when the accumulator driving means was discussed, the deenergization of the clutch magnets occurs slightly before the commutators have rotated through ten unit spaces in order to insure that the clutches be freed and placed under control of the detent levers 333. At this time, the accumulator wheels will have the following numbers inserted therein:

```
First order wheel_____ 4.0
Second order wheel_____ 5.4
Third order wheel_____ 6.54
Fourth order wheel_____ 8.654
Fifth order wheel_____ .8654
Sixth order wheel_____ 8.08654
Seventh order wheel_____ .808654
Eighth order wheel_____ .0808654
```

The whole number in each case is the digit inserted in the particular wheel while the decimal represents the creep from the wheels of lower order.

As the commutator shaft continues to rotate and, in fact, immediately after the breaking of the locking circuit, a circuit is completed through a commutator 618 to operate the stepping magnet 320. This circuit is as follows:

From battery (Fig. 42) through the magnet 320 of stepping switch 310, thence over conductor 522 (Figs. 43 and 46) through a brush of the commutator 618, thence through the conducting segment of the commutator to brush and over conductor 619 to ground.

At this time, the stepping switch is energized and then, since the commutator conducting segment is very short, deenergized, thus stepping the wipers 317 of all the switch banks to their third contact points.

When the stepping switch operates, the various circuits prepared and described under (1) through (6) above are altered in that each circuit is prepared for completion through the clutch magnet of next higher denominational order. For example, circuit (1) which originally led through the magnet 298R and the bank 310H of the stepping switch now leads through the magnet 298P and the third contact of the bank 310H of the stepping switch, and in like manner all the other circuits are shifted. It is to be noted that the second and third contact points of the switch bank 310B are connected together and that consequently the circuits to the relays 539 and 520 previously described are but momentarily broken and then immediately completed again.

As the commutator shaft continues to rotate the first commutator to present its second conducting segment to the brushes is that designated in Fig. 22 as 6c. When the conducting segment (6×9) of this commutator reaches its brushes, the following circuit will be completed:

From battery over conductor 505 to magnet 298P (Fig. 43) thence over conductors 544, 545 and 623 to the third contact point of switch bank 310H of the stepping switch, wiper 317H, strap 528, conductor 529, and to the plug in the "5" jack of the multiplicand group (Fig. 42), conductor 540 (Figs. 45 and 48), thence through stack 179F of the decoding unit and conductors 542 and 556 in a manner already described to the common brushes of the sixth group of commutators and through the conducting segment (6×9) of the commutator designated as 6c to conductors 610 and 605, to the contacts of relay 539, conductor 604, to ground.

At this time, then, magnet 298P will be energized and will, of course, be held in its operated position over a circuit previously described.

As the commutator shaft continues to rotate the (5×9) segment of commutator 5c, will present its second conducting segment to its brushes and a circuit will be completed from the magnet 298N through the third contact of bank 310G of the stepping switch, and thence to a conductor 547 and over the circuit described under (2) through the commutator 5c over conductors 609 and 605 to ground, causing energization of magnet 298N and locking thereof.

The next commutator which presents a conducting segment to its brushes will be that representing the product of 4×9. When the conducting segment (4×9) of commutator 4c comes between its brushes, a circuit will be completed through magnet 298M, third contact points of switch bank 310F, and thence the conductor 573, from which it follows the circuit described under (3) through the commutator 4c over conductors 608 and 605 to ground at the contacts of relay 520. This causes energization of the magnet 298M and locking thereof.

Next, two circuits are completed in parallel, due to the presentation of the conducting segment (2×9) of the commutator 2c to its brushes. These two circuits lead from ground to conductor 505 and thence through the windings of magnets 298L and 298J to conductors 584 and 624, respectively, thence to conductors 585 and 625 and thence to the third contact points of the banks 310C and 310E respectively, thence over the wipers 317 of these switch banks, conductors 592 and 580, respectively, to the plugs in the "10" and "8" jacks of the multiplicand group, and thence through the stacks 179A and 179C of decoding mechanism, as described above. Since conductors such as 551–559 are multiplied from all banks of the decoding mechanism, it will be obvious that here the two parallel circuits which were being traced join and from here they lead over the conductor 552 to the second group of commutators and thence through the segment 2×9 of the commutator 2C of that group to conductors 606 and 605 to ground at the contacts of relay 539. Thus the magnets 298J and 298L energize at the same moment and lock in their operated positions.

It is to be noted that magnet 298K does not become energized during the second 180° rotation of the commutator shaft 230. This is due to the fact that this magnet is connected into a circuit which leads to the contact stack 179B of he decoding mechanism and since the card which has been sensed has a zero in that column no pin was raised and no contacts closed, wherefore the circuit is not completed.

As the commutator shaft 230 continues to revolve, the locking circuit for the various magnets 298J through 298P is opened in the same manner as described above and shortly thereafter the circuit to the stepping magnet 320 is again completed and the commutator shaft 230 completes its revolution and the tripping lever 249 controlled by the magnet 263 (Fig. 46), the circuit for which is opened by commutator 597, at this time is released, thereby stopping shaft 230 in its normal position. At the time when the locking circuit is broken, all the clutches associated with the magnets 298J through 298P are disengaged, and shortly thereafter detent levers 325 position the wheels.

During the second half rotation of the commutator the first order wheel had added to its previous reading nothing: the second order wheel, 5; the third order wheel, 4.5; the fourth order wheel, 3.45; the fifth order wheel, 1.345; the sixth order wheel, .1345, the seventh order wheel 1.01345; and the eighth order wheel .101345. The wheels now stand in the following positions:

| | Units from zero |
|---|---|
| 1st order wheel | 4.0 |
| 2nd order wheel | 0.4 |
| 3rd order wheel | 1.04 |
| 4th order wheel | 2.104 |
| 5th order wheel | 2.2104 |
| 6th order wheel | 8.22104 |
| 7th order wheel | 1.822104 |
| 8th order wheel | 0.1822104 |

If a total were now taken, it would give the product of 202,456 as the multiplicand by 9 as multiplier. However, our assumed problem had a three digit multiplier, namely, 709, and the machine will continue until that product is completed. As the stepping switch 310 operates under control of commutator 618 all of the switch wipers 317 move to their fourth contact points. During the interval when the wipers are between their third and fourth contact points the circuit to relay 520 is broken at the contacts of the bank 310B and quickly re-established over the fourth contact, provided a multiplier digit has been set up in stack 178B. The rotary switch makes its step when the brush 615 moves off of the conducting segment of commutator 618. As shown in Fig. 22, this point is reached some little distance before the shaft 230 completes its rotation. The relay 520 is, therefore, deenergized, and then reenergized before said shaft finishes its rotation, and before the conducting segment of commutator 597 reaches the brush 598 which controls the release magnet 263. Said segment reaches said brush and the magnet is energized a little before the end of the rotation, so that the shaft does not stop. However, in the example given, no multiplier was set up in stack 178B, and, therefore, the circuit of relay 520 is not reclosed, and magnet 263 not energized, and the shaft stops momentarily and until the stepping switch 318 reaches a denomination in which a digit has been set up.

It is important that the shaft 230 stop when no digit has been set up, as otherwise the mechanism would be thrown out of proper timing. This is assured by the fact that the angular distance from the point where commutator 518 (Fig. 22) breaks the circuit of the stepping magnet, to the point where commutator 597 closes the circuit through the contacts of relay 520 to the clutch magnet 263, is ample to give said relay time to become deenergized and to break the circuit, and thus stop the shaft. As shown in Fig. 22, on the commutator 1A, the contact for adding "1" is far enough from the stop position of the disk so that the magnet 298 will be energized before the rotary switch makes its stop.

With the wipers of contact bank 310B on the fourth contact the following circuit is closed. From ground on the first contact of bank 310B through strap 550, conductor 626, the plug in the "9" jack of the upper level of the multiplier group, conductor 627 to the contacts of the stack 178B (Fig. 44) of the multiplier decoding unit. Since the multiplier digit at this time is zero, there are no pins elevated and the circuit continues through the left break "1-2" contact, thence over conductors 628, 629, 630 and 631, through the left break contacts for all the pins to conductor 632, fourth contact of bank 310A of the stepping switch wiper 317A, strap 502, contacts 330 to battery, through the winding of stepping magnet 320. The magnet 320 is energized but in operating the contacts 330 are opened and the magnet immediately restores stepping the wipers 317 to the fifth contact points. Since the fourth, and fifth contacts of the bank 310B are strapped to conductor 626, the same circuit will be again established and the stepping magnet 320 operates as before stepping the wipers 317 to the sixth contact point.

From the above the ease of registering zero is seen. It involves nothing but the operation of the stepping switch 310. When the switch wipers reach their sixth contacts, a circuit is completed from battery through the winding of relay 520 (Fig. 43) to conductor 560, thence through the winding of the relay 537 to conductor 567 (Figs. 42, 41 and 44), center "7–8" contacts of stack 178C, conductor 634, right-hand break "9" contacts of the same stack, conductors 635 and 636, to the "8" jack and plug of upper level of the multiplier group, thence over conductor 637 to the sixth and seventh contacts of the bank 310B of the stepping switch, over the wiper of that switch bank and strap 550 to ground.

Relays 520 and 537 are operated and as before relay 520 causes completion of two circuits and places magnet 320 under control of the commutator 618 of the shaft 230. One of the circuits which is completed is that which leads over conductor 599 to the winding of relay 510. This circuit is, however, without effect, since relay 510 is held operated due to its locking circuit, which has been described. The other circuit is that leading over conductor 596 to a brush of commutator 597; thence over conductor 598 through the winding of magnet 263 to battery and ground, operating the magnet and releasing the commutator shaft 230 for a revolution. The sequences of operations described when the units portion of the digit nine as a multiplier was considered are repeated with the exception that the circuits completed are now governed by the operation of relay 537 rather than that of 539.

When the relay 537 operated, its contacts completed two circuits, one from ground over conductor 604 through the inner contact of the relay 537 and over conductors 638 and 639 to conductors 640, 641, 642 and 643 to the commutators representing respectively the products of 7×9, 7×8, 7×6, 7×5 and 7×4, the other circuit is from ground, outer contact of the relay and over conductors 644 and 645 to conductors 646, 647 and 648, to the commutators representing respectively the products of 7×7, 7×3, 7×2 and 7×1. The reason for utilizing two contacts on relay 537 is to prevent feed-back through circuits having therein commutators which represent products containing the same digit, as for example, 42 and 49, or 28 and 21. The same procedure is followed in connection with other relays, such as 532, 533, 534 and 535, which it will be seen all have more than a single contact, some having as many as five.

Circuits will now be prepared for completion through the magnets 298N, 298M, 298L, 298K, 298J and 298I. These circuits are similar to those described under the headings (1) through (6) above, but differ in that they lead through the decoder contacts to the seven commutator, and also differ in that they are grounded at the other side of the commutators through brushes associated with the conductors 638 and 644 associated with the contacts of the relay 537, rather than through those associated with the relay 539.

In order that they may be perfectly clear, one of the circuits will be traced in detail.

This circuit leads from battery, through the winding of magnet 298N, thence over conductors 570, 571 and 649 to the sixth contact point of the bank 310H of the stepping switch, thence over the wiper 317H, strap 528, conductor 529, and to the plug in the "5" jack of the upper level of the multiplicand group, conductor 540 through the contact stack 179F (in which the "9" and "5–6" contacts are closed), in the manner described above to conductor 556 to all commutators representing products of six and any of the nine digits.

Circuits are also completed as has been described to all commutators representing products of seven by any digit. Due to this cross grouping a single circuit is actually prepared; this circuit being the one which extends on both sides of that commutator which represents the products of 6×7. At this time the circuits are, of course, also prepared for completion through those commutators representing the products of 5×7, 4×7 and 2×7.

As the commutator shaft rotates, the circuits which have been prepared are completed in the following order:

When the conducting segment of commutator 4C reaches its brushes, the circuit prepared for completion through it will be completed and cause operation of the magnet 298L which will immediately lock over the locking circuit previously described, which was, of course, established.

As the commutator shaft continues to rotate, a circuit through the conducting segment 7×5 of commutator 7B will be completed causing energization of the magnet 298M.

Continuing rotation of the shaft causes completion of circuits prepared for completion through the segments 2×7 of commutator 2C, and magnets 298I and 298K will be energized.

Finally, the circuit which has been prepared for completion through the segment 7×6 of commutator 7B will be completed and will energize magnet 298N.

As the commutator shaft continues its rotation at a definite point therein, the locking circuit to the clutch magnets will be broken and magnets 298I through 298N will deenergize.

In the same manner as during the first cycle of the machine, shortly after the deenergization of the clutch magnets a circuit is completed from ground, conductor 619 (Fig. 46), through the brushes of commutator 618 to conductor 522 (Figs. 46, 43 and 42), through the winding of stepping magnet 320 to battery. This causes energization of the stepping magnet which subsequently deenergizes at its own contacts 330 and permits the spring to step wipers of the switch ahead to their seventh contact point. This stepping of the switch connects the clutch magnet of the next higher denominational order to each of the multiplicand columns of the decoding unit, so that circuits which were previously completed to the magnet 298N are now completed to the magnet 298M, those which were previously completed through the magnet 298M to the magnet 298L, etc.

The commutator shaft continues its rotation breaking the circuit to the stepping magnet at commutator 618 and thereby preventing further stepping at this time and shortly thereafter the circuit is completed through the commutator representing the product of 6×7 and through the magnet 298M to energize that magnet. This circuit may be traced as follows:

From battery through conductor 505 (Fig. 43), thence through the winding of relay 298M to conductors 577 and 578, thence to the seventh contact point of the bank 310H of the stepping switch, thence over the wiper 317H, strap 528, to conductor 529 (Figs. 43, 42 and 41) to the plug in the "5" jack of the upper level of the multiplicand group, conductor 540 to the stack 179F and, since the digit six is recorded in the card, the "9" and "5–6" pins have operated their contacts described above and the circuit is completed over conductor 556 to the commutators 6×1 through 6×9, thence the conducting segments of the commutator 6×7 and the brushes cooperating therewith to conductors 641, 639 and 638 to ground through the inner break contact of relay 537, thus energizing magnet 298M.

As the commutator continues to revolve, similar circuits are completed in order through magnet 298L and commutator 5×7; through magnet 298K and commutator 4×7, and then through magnets 298J and 298H and commutator 2×7. These magnets, of course, energize and lock in the order specified and shortly thereafter the locking circuit is again broken and the mechanical arrangements described, that is, the bail and detent levers 335 operate and assure that the accumulator gears are properly positioned.

During the first half rotation of the commutator occurring while these circuits are set up, the numbers 2, 5, 8, 4, 0, 4 are added in the hundreds, thousands, ten thousands, hundred thousands, millions and ten millions order wheels of the accumulator, thus adding to the wheels the following figures:

Units order_____ 0.0
Tens order_____ 0.0
Hundreds order_____ 2.00
Thousands order_____ 5.20
Ten thousands order_____ 8.520
Hundred thousands order_____ 4.8520
Millions order_____ .48520
Ten millions order_____ 4.048520

Since the wheels already stood at units 4, tens 10.4, hundreds 11.4, thousands 12.104, ten thousands 2.2104, hundred thousands 8.22104, millions .822104, ten millions at .0822104 and hundred millions at .01822102, they now stand at Units _____ 4.0
Tens _____ 0.4
Hundreds _____ 3.04
Thousands _____ 7.304
Ten thousands_____ 0.7304
Hundred thousands_____ 3.07304
Millions _____ 2.307304
Ten millions_____ 4.2307304
Hundred millions_____ .42307304

It will be understood, of course, that the multiples of ten are discarded since the position of the accumulator wheel with respect to its zero stop is the same no matter how many full rotations of the wheel are to be considered.

Now, during the second half rotation of the commutator shaft, the following numbers will be added to the accumulators:

Units order_____ 0.0
Tens order_____ 0.0
Hundreds order_____ 0.0
Thousands order_____ 4.000
Ten thousands order_____ 3.4000
Hundred thousands order_____ 2.34
Millions order_____ 1.234
Ten millions order_____ .1234
Hundred millions order_____ 1.01234 after which the wheels will stand respectively at

Units _____ 4
Tens _____ 0.4
Hundreds _____ 3.04
Thousands _____ 1.304
Ten thousands_____ 4.1304
Hundred thousands_____ 5.41304
Millions _____ 3.541304
Ten millions_____ 4.3541304
Hundred millions_____ 1.43541304

This means that the wheels now stand respectively: units—.4 of a turn or 4 units from its zero point; tens—.04 turn; hundreds—0.304 turn; thousands—0.1304 turn; ten thousands—0.41304 turn; hundred thousands—0.541304 turn; millions—0.3541304 turn; ten millions—

0.43541304 turn; and hundred millions—0.143541304.

Shortly after the deenergization of the locking circuit to the various magnets 298H through 298M, commutator 618 again reaches a point at which the circuit for operating the magnet 320 over conductor 522 is completed. The magnet 230 operates and then releases, moving all the wipers to their eighth contact points. With the wipers in this position, no circuits are completed through the contact stacks 178D—178J of the multiplier decoding unit, since no pins 219 have been elevated.

As a result of this, no circuits are completed through relays 531 through 539 and, consequently, relay 520 is deenergized and breaks two circuits leading respectively to the clutch control magnet 263 and to the relay 510. The release of magnet 263 releases the arm 249 and stops disc 239, thereby releases clutch 240 and stops commutator shaft 230.

As was described above the seven plugs from the left in the multiplier section were inserted in the "1–7" jack of the lower level which are associated with the blank or unrelated data columns of the card. The seventh plug is connected by conductor 652 to the eighth contact of bank 310B. A circuit is, therefore, closed from battery, winding of stepping magnet 320, contacts 330, first contact and strap 502, wiper 317A, eighth contact of bank 310A, conductors 653 and 654, "7" jack of the lower level, plug and conductor 652, eighth contact of bank 310B, wiper 317B, strap 550, first contact to ground, thereby operating magnet 320. This circuit is opened through contacts 330, causing the wipers 317 to move to the ninth contact. Due to the fact that the eighth and ninth contacts of bank 310B are strapped together this circuit is again effective to step the wipers to the tenth contact. Another circuit is now closed through the "6–1" jacks of the lower level, stepping the wipers 317 over the contacts to twenty-second contact. In short, the steps of the rotary switch from the sixth to the twenty-second contact are made in rapid succession, the whole movement occupying only a fraction of a second.

If the field of the card covered by the first seven places of the multiplier unit is blank, these seven plugs 189 could be inserted in the upper jacks 188 with the same effect as above described. The circuits would then be like that described for the tens place of the multiplier, which, in the instance given, is not punched, said circuits leading through the break contacts of the decoding stacks. But those seven columns of the card may not be blank, but may be used for some other purpose such, for example, as for punching designation members. In that case, these seven sets of stacks or some of them may have been operated. By plugging these seven circuits into the lower plugs, the circuits to those extra stacks are broken, and direct circuits established to commutator 310A and thence to magnet 320. The lower jacks 188 enable a portion of the card under the multiplier decoding unit to be punched for other purposes than for multiplication factors. A similar thing is true of the plugs 189 for the multiplicand.

With the wipers on the twenty-second contact, a circuit is completed as follows: From battery winding of stepping magnet 320, contacts 330, first contact, strap 502, and wiper 317A and twenty-second contact of bank 310A, conductor 656, left-hand contact of the half cent carry switch 650 (the operation of which will be discussed hereinafter) conductor 657 to ground, operating magnet 320 which releases through contact 330, stepping the switch to the twenty-third contact. Due to the twenty-second and twenty-third contacts being strapped together the same circuit is again effective, stepping the wipers 317 to the twenty-fourth contacts.

With the switch in this position, a number of circuits are completed as follows:

From battery (Fig. 46) through conductor 514 to the winding of trip magnet 141, thence through conductor 515, brush 516 and commutator 517 (since this commutator now presents a conducting segment to the brush), brush 518, conductor 519 to the twenty-fourth contact of the switch bank 310B, and through its wipers, 317A, strap 502, first contact, to ground.

At this time, due to the energization of the magnet 141, clutch 135 for the main sensing shaft 127 is operated, permitting the shaft to rotate 90°. During this 90° of rotation, a new card is fed to the sensing chamber and positioned for sensing. Also the bail 341 (Figs. 5 and 29) is elevated, and the sectors 267 are elevated and caused to mesh with the accumulator gears 331 and the bail or restoring bar 413 is moved out of the path of the sectors. Due to the elevation of the bail and the movements of the sectors and the restoring bar the accumulator wheels are permitted to move to their zero stops in the manner described under the heading "Accumulator zeroizing mechanism."

The 90° of rotation mentioned is under control of the clutch tripping lever 140 which it will be recalled restores to its normal position almost immediately after operation, due to the fact that the circuit to the magnet 141 is broken very shortly after the rotation of the shaft 127 begins, since it is led through commutator 517; also shortly after the release of the shaft 127 for its 90° of rotation, a circuit is completed through commutator 524 for energizing the stepping magnet 320. This circuit leads from battery through the winding of magnet 320 and thence over conductor 522 (Figs. 46, 43 and 42) to brush 523, and thence through the commutator 524 to brush 525 and ground.

This circuit is completed momentarily and the impulse due thereto causes the stepping magnet to energize and deenergize, stepping the wipers to their twenty-fifth contact points.

When wipers 317 reach their twenty-fifth contact, a circuit is prepared for energizing the clutch magnet 141 to permit the shaft 127 to rotate through the next 270°. This circuit, however, is not completed until the contacts 439 and 440 are closed.

It will be remembered that these contacts are controlled by the zero stop arm 343 of the highest denominational order so that it will be at the time that the last stop arm is released that this circuit is completed. When completed, the circuit may be traced from battery through the conductor 514 (Fig. 46) and the winding of the tripping magnet 141, thence over conductor 515, then through the brushes 516 and 518 and conducting segment of the commutator 517 to conductor 519 (Figs. 46, 45 and 42), and thence through the contacts 439 and 440 to conductor 526 and through the twenty-fifth contact and wiper of switch bank 310B, strap 550, first contact to ground. This energizes the clutch magnet 141 to connect shaft 127 for its second period of rotation during which it rotates through 270° and causes restoration of the various bails of the totaling mechanism to normal and likewise punching of the product in the card from which the factors were read.

It will be understood that when the accumulator wheels are permitted to rotate to zero they allows the sectors and associated racks to move proportional amounts to position the code bars above the punch gags to govern the correct punching of the product.

A short time ago the amounts standing on the accumulator wheels were set forth and it will be understood from the discussion of the accumulators and the zeroizing means therefor that the carry from the lower order wheels is removed from the higher order wheels as the accumulators come to zero. Therefore, the proper punch gags will be set to punch as a total or product the following number 143,541,304, which will be seen to be the product of the two assumed numbers 202,456 and 709.

Near the end of the 270° rotation of the main sensing shaft 127, a circuit is completed through the commutator 600 (Fig. 46) which commutator is mounted on the shaft 406 which, as has been stated, is geared to shaft 127 with a 1 to 1 ratio.

This circuit is traced from ground (Fig. 46) brush 603 of commutator 600, brush 602, conductor 661, inner make contact of relay 510 (which is held operated by commutator 600 after relay 520 is deenergized), conductors 599 and 657, through commutator 656, conductor 522 (Figs. 46, 43 and 42) to battery through the winding of magnet 326, causing the magnet to operate and step the wipers to their normal or start position and open the circuit for relay 510.

The circuit is now in condition for controlling the computation of factors from another card.

*Half cent carry*

At times it is desirable to record only a portion of the product, checking the answer to the nearest figure; for example, a three digit figure might be multiplied by a two digit figure, which would normally give five digits in the product, but it might be desirable to record but three digits checking the last or units one of these three to the nearest figure. To be more specific, let us assume that the figure 20367 is a product and that it is desirable to record only the three highest denominational order digits thereof, in which case the figure to be recorded would be 204.

Means are provided for automatically checking to any number of significant figures. To use this equipment the circuits are made up as before by proper plugging, etc., and the carriage of the machine is as before set in the desired position, then, if the third figure is the one to be checked, as in the assumed example, the units and tens latches 384 (see Fig. 5) are depressed to prevent punching in the units and tens positions. Thereafter, the plug 660 is inserted in the jack 661 of the group designated "Half cent carry" (see Fig. 14) as well as wiring diagram (Fig. 43). The half cent carry switch 650 is rotated counter-clockwise. This prepares a circuit which leads through the "Significant figure carry" commutator 661, which carries a conducting segment (see form, Fig. 22) at a point identical to that on the 5×1 segment of commutator 5A so that whenever this commutator is connected in circuit it causes a 5 to be registered in the associated wheel. Connected to the twenty-second and twenty-third contact points of the switch bank 310B (Fig. 42) is a conductor which leads through a relay to ground in such manner that a circuit may be completed through its contacts to cause energization of a proper clutch magnet at the proper time.

Now the twenty-second and twenty-third contact points are reached by the wiper of switch bank 310B only after all the digits of the multiplier have controlled the completion of circuits to the clutch magnets and, therefore, only after all of the normal figures of the total have been accumulated. When the significant figure carry mechanism is connected in circuit by the operation of switch 650, there will be a delay in the release of the accumulator wheels until a 5 is added to a selected wheel.

Assuming now that the figure 20367 has been registered in the proper wheels and that the switch wipers have been stepped ahead by the vibrating circuit of the magnet 286 until they reach their twenty-second contact points, it will be seen that at this time a circuit is completed from battery to the relay 520, conductor 560, outer contact of relay 510 (Fig. 46), conductor 663, through the winding of the significant figure carry relay 530, over conductor 664 and through the significant figure carry switch 650, conductor 665, and thence to the strapped twenty-second and twenty-third contacts of the bank 310B and through the wiper 317B, strap 550, first contact, to ground. This will cause energization of the relays 520 and 530 in series and the operation of relay 520 will complete a circuit from ground over conductor 596 and through the commutator 597, conductor 598 to the magnet 263, thus causing release of the commutator shaft 230 in the same manner as described before. Energization of the relay 530 will prepare a circuit from battery through conductor 505 to the winding of magnet 298P, and thence over conductors 444 and 662, jack 661 (Fig. 43) of the significant figure group, plug 660, conductor 666 through commutator 661, conductor 67, contacts of relay 530, conductor 604 and ground. This causes energization of the magnet 298P which then registers a 5 on the associated accumulator wheel in addition to the number already registered therein.

As the commutator shaft rotates the various control circuits are made and broken in the same manner as under normal operation and ultimately wipers of the stepping switch are moved to their twenty-sixth contact points. It will be seen that the total registered in the wheels and prepared for punching in the cards is thus 20417. Since the first two, that is, the units and tens code bars, are prevented from operating, the figure 204 is actually punched in the card which is the five digit product checked to three figures as desired.

The circuits herein described are exemplary only, but it will be understood similar circuits are utilized in the solution of any problem.

It will be remembered that even though there were no punchings in certain columns of the cards, the stepping switch would continue to step until the twenty-third contact was reached. It would stop here, however, if the half cent carry switch 650 was operated. From there on the switch would be under control of the half cent carry circuit. If, however, due to failure of the card feeding mechanism, no card was fed to the sensing mechanism, the relay 520 would fail to operate and, therefore, relay 510 would remain unoperated. This operation closes a circuit from ground on the outer break contact of relay 510, conductors 668, and 656, to the twenty-second and twenty-third contacts of switch bank 310A, wiper 317A, strap 502, first contact to battery through contacts 330 and winding of stepping magnet 320. The contacts 330 open and close causing the switch to step to the twenty-fourth contact. From this point on the control is the same as that described above.

Timing diagram

As has already been disclosed, the main shafts 127 and 406 are rotated in two stages to complete a full revolution. The first stage is from normal or zero position to the 90° mark. Then, after certain operations have taken place, the main shafts are again actuated to complete the remaining 270°.

Fig. 53 shows the relative motions of the main operating mechanisms as compared to the angular position of the main shafts. It shows that during the first 90° rotation of the shafts, the sensing pins 118 are lowered slightly and the sensing card stop 204 is closed awaiting the arrival of the next data card. The card punch remains stationary during this period and the punch card stop 444 remains closed holding the previous card in place. The accumulator segments 267 are placed in mesh with the accumulator wheels 331 by the actuating cam 417 since the multiplying and rectifying process has already been finished on the previously sensed card. The rack locks 390 are raised so as to allow the product to be transferred to the punch gags 375 and just after the racks 370 are free, the bail 349 is raised to permit the lowering of stops 345 (see Fig. 5) thereby permitting all the accumulator wheels to be zeroized.

The segment restoring bail 413 does not start releasing the segments until the 20° point has been reached and the rack locks and trip bail have been cleared. The bail 413 turns in a clockwise direction (as seen in Fig. 5) and releases all the wheels during 30° of rotation of the main shaft, i. e., at 50° all racks are free. As has been described hereinbefore, the detent wheel 300 is cammed away from the accumulator wheels to allow them to be normalized more easily. The detent levers 304 free the star wheels 287 at about 22° of the main shaft rotation and hold them clear until about 140°. The retract cam 702 releases the previously set up sensing retaining pins 147 at about 45° of the main shaft to prepare the basket for retaining data from the next card.

At the 90° mark the main shafts stop and the accumulator wheels are zeroized from the position they assumed after the multiplying operation of the previous card which is now in the punch chamber. As soon as the zeroizing and translating operation is completed, the contacts 439—440 are closed and the second or 270° rotation of the shafts is started.

During the second or 270° rotation the next card is sensed (140°), the sensing card stop being kept closed for almost the entire period. The card which was sensed in the previous cycle is now in the punch chamber and the punch gags have been set. The punches enter the card at 135° and punching is complete at 180°. At 215° the punches leave the card and soon thereafter (220°) the punch card stop is opened and the card is ejected into the rear basket.

The accumulator segments 267 are pulled out of mesh at 220° to prepare the accumulator wheels for the multiplying action which will start at the conclusion of this period. The rack locks 390 again engage the racks at 130°, the trip bail 349 restores the stops 345 at 290°, and the detent lever 304 locks the accumulators through star wheels 287 at 140°, thus placing these devices in their normal or multiplying position. The segment restoring bail 413 (see Fig. 5) slowly returns the segments and racks 370 to their zero position at 350°. This action obviously starts after (220°), the card having been punched since the punch gags are returned to normal with the racks. The retract cam 702 shown in Fig. 4 is withdrawn to its non-operative position before the sensing pins start setting up the sensing retaining pins for the new factors. Total withdrawal occurs at about 120°.

At the finish of the cycle or at the point 360° point, the main shafts 127 and 406 stop and the multiplying action begins. The pause at 360° depends entirely on the numbers to be multiplied together. If a ten digit multiplier and a ten digit multiplicand are used, the action may take as long as six seconds, but if only one or two are used the time consumed may be only one-half second.

As soon as the multiplying action is finished, the stepping switch returns to its zero position and starts the machine on another cycle.

Summary

It is obvious that the above described machine is adapted to sense cards having factors punched therein in a 90-column code, to multiply these factors together and to record the product in the same card from which the factors are sensed.

While I have described what I consider to be a highly desirable embodiment of my invention, it is obvious that many changes in form could be made without departing from the spirit of my invention, and I, therefore, do not limit myself to the exact form herein shown and described, nor to anything less than the whole of my invention as hereinbefore set forth, and as hereinafter claimed.

What I claim as new, and desire to secure by Letters Patent, is:

1. In a calculating machine, means for controlling the carrying of significant digits over five, comprising; an accumulator; clutch magnets for each individual accumulator wheel; a rotary switching mechanism adapted to control the entering of numerals of the product into said accumulator in proper denominational order; a commutator for causing the entry of the digit five in an accumulator wheel; a selective connecting means for preselecting the significant digit accumulator; and a relay under control of said switching mechanism adapted to close a circuit through said commutator, connecting means and clutch magnet to cause the entry of five in the significant digit accumulator after the product has been entered.

2. In a calculating machine, means for controlling the carrying of significant digits over five, comprising: an accumulator; clutch magnets for each individual accumulator wheel; a rotary switching mechanism adapted to control the entering of numerals of the product into said accumulator in proper denominational order; a commutator for causing the entry of the digit five in an accumulator wheel; a plug board for pre-selecting a circuit to the significant digit accumulator; and a relay under control of said switching mechanism adapted to close said circuit through said commutator, plug board and clutch magnet to cause the entry of five in the significant digit accumulator after the product has been entered.

3. In a machine of the class described, contact stacks controlled by a sensing mechanism for reading multiplication factors in a pre-punched card; a portion of said stacks being adapted to be controlled in accordance with the multiplicand and the remainder in accordance with the multiplier; commutators rotated by said machine under control of a rotary switching mechanism and connected to said multiplicand contact stacks; a plurality of digital relays connected to said multiplier contacts; a plurality of clutch magnets for controlling accumulator wheels to accumulate the product of said factors, said magnets being connected to said rotary switching mechanism; a stepping magnet adapted to rotate said switching mechanism to complete circuits from said relays through said commutators and successive contact stacks to operate said magnets in denominational order groups, thereby registering the product of said factors, said stepping magnet being operable upon the completion of each successive circuit to step the switch to its next contact; a connection board containing means for connecting a control contact bank of the stepping switch to a multiplier contact bank of the stepping switch, thereby causing the operation of said stepping magnet to step the switch to normal position when a part only of the contact stacks are effective.

4. In a machine of the class described, a pair of contact stacks adapted to be controlled in accordance with a multiplier and multiplicand sensed from a punched card; a rotary switching mechanism having a plurality of sets of contacts for sequential switching; a stepping magnet for rotating contact arms of said switching mechanism; an accumulator, a multiplying means for registering the product of a digit of the multiplier by the multiplicand during a machine sub-cycle; magnetic means sequentially controlled by said switching mechanism for entering partial products in said accumulator; circuit means, also controlled by said switching mechanism, for switching from one order of contacts to another in the multiplier stack after each sub-cycle, thereby accumulating the product of the sensed multiplicand by all the digits of the multiplier; and a group of circuits and pre-settable switches therein for connecting one or more control contacts of the switching mechanism to similarly aligned multiplier contacts of the switching mechanism, said stepping magnet operated by each of said circuits to step the switching mechanism regardless of the data sensed by the multiplier contact stack.

HAROLD P. MIXER.

Certificate of Correction

Patent No. 2,214,029 September 10, 1940

HAROLD P. MIXER

It is hereby certified that error appears in the printed specification of the above numbered patent requiring correction as follows:

Page 18, second column, line 72, for "310B'" read *310B*; page 21, first column, line 20, before the word "break", first occurrence, insert *to*;

and that the said Letters Patent should be read as corrected above, so that the same may conform to the record of the case in the Patent Office.

Signed and sealed this 7th day of November, A. D. 1950.

[SEAL]

THOMAS F. MURPHY,
*Assistant Commissioner of Patents.*